US012664913B2

(12) United States Patent
Erol et al.

(10) Patent No.: US 12,664,913 B2
(45) Date of Patent: Jun. 23, 2026

(54) WEARABLE BIRTHING SIMULATORS

(71) Applicant: Avkin, Inc., Wilmington, DE (US)

(72) Inventors: Amy Bucha Erol, West Grove, PA (US); Jessica Monteleone, Franklinville, NJ (US); Amy Cowperthwait, Bear, DE (US); Andrew Taylor, Newark, DE (US); Olivia Smith, Wilmington, DE (US); Christopher Wells, Newark, DE (US)

(73) Assignee: Avkin, Inc., Wilmington, DE (US)

( * ) Notice: Subject to any disclaimer, the term of this patent is extended or adjusted under 35 U.S.C. 154(b) by 796 days.

(21) Appl. No.: 17/985,232

(22) Filed: Nov. 11, 2022

(65) Prior Publication Data

US 2023/0154354 A1 May 18, 2023

Related U.S. Application Data

(60) Provisional application No. 63/278,580, filed on Nov. 12, 2021.

(51) Int. Cl.
*G09B 23/28* (2006.01)
*G06F 3/01* (2006.01)
(Continued)

(52) U.S. Cl.
CPC ........... *G09B 23/281* (2013.01); *G06F 3/016* (2013.01); *G09B 23/303* (2013.01)

(58) Field of Classification Search
CPC ...... G09B 23/281; G09B 23/303; G06F 3/016
See application file for complete search history.

(56) References Cited

U.S. PATENT DOCUMENTS

| | | | |
|---|---|---|---|
| 2,551,433 A | 5/1951 | Graves | |
| 3,797,130 A | 3/1974 | Knapp et al. | |
| | (Continued) | | |

FOREIGN PATENT DOCUMENTS

| | | |
|---|---|---|
| CN | 209785386 U | 12/2019 |
| EP | 2229670 A2 | 9/2010 |
| | (Continued) | |

OTHER PUBLICATIONS

Gaumard Scientific Company, Super OB Susie User Manual, 2017 (Year: 2017).*

(Continued)

*Primary Examiner* — Jay Trent Liddle
*Assistant Examiner* — Jose Angeles
(74) *Attorney, Agent, or Firm* — Buchanan Ingersoll & Rooney PC

(57) ABSTRACT

A wearable birthing simulator and method of operating thereof are disclosed. The simulator includes a housing that is securable to a subject and the housing defines an opening. Positioned within the housing is a uterus simulator and a removable fetal model contained therein. Coupled to the uterus simulator is a birth canal simulator. A birthing device comprises an actuator assembly in communication with the controller for automatically moving the fetal model towards the birth canal simulator. One or more sensors are mounted to the housing and are electrically connected to the controller for detecting movement of the fetal model by the birthing device. The feedback device is configured to provide the haptic feedback to the subject in response the movement of the fetal model toward the birth canal simulator. The disclosed simulator may be used to simulate a variety of childbirth scenarios.

21 Claims, 57 Drawing Sheets

100

(51) Int. Cl.
    *G09B 23/30*     (2006.01)
    *G09B 23/32*     (2006.01)

(56) References Cited

U.S. PATENT DOCUMENTS

| | | | |
|---|---|---|---|
| 6,673,453 B2 * | 1/2004 | Beavers | A61L 29/085 |
| | | | 427/407.1 |
| 7,651,332 B2 | 1/2010 | Dupuis et al. | |
| 7,811,090 B2 | 10/2010 | Eggert et al. | |
| 7,976,313 B2 | 7/2011 | Eggert et al. | |
| 8,128,413 B2 | 3/2012 | Lynch | |
| 8,939,770 B2 | 1/2015 | Quinones et al. | |
| 8,951,047 B2 | 2/2015 | Eggert et al. | |
| 9,437,117 B2 | 9/2016 | Carvajal et al. | |
| 9,852,658 B2 | 12/2017 | Lavigueur et al. | |
| 9,870,720 B2 | 1/2018 | Eggert et al. | |
| 9,972,219 B2 | 5/2018 | Garvik et al. | |
| 9,984,592 B2 | 5/2018 | Schaefer et al. | |
| 10,964,231 B2 | 3/2021 | Eggert et al. | |
| 2007/0105083 A1 | 5/2007 | Riener et al. | |
| 2013/0004926 A1 | 1/2013 | Klemp | |
| 2016/0328997 A1 | 11/2016 | Perone | |
| 2016/0372009 A1 * | 12/2016 | Eggert | G16Z 99/00 |

FOREIGN PATENT DOCUMENTS

| | | |
|---|---|---|
| JP | 5806229 B2 | 11/2015 |
| WO | 0201536 A1 | 1/2002 |
| WO | 2003041034 A1 | 5/2003 |

OTHER PUBLICATIONS

Guamard, "Noelle S550—Maternal Care Patient Simulator with OMNI", downloaded from the internet Feb. 22, 2023, https://www.gaumard.com/s550, 2023, 5 pages.

Guamard, "Obstetric MR—Mixed Reality Enhanced Learning System", downloaded from the internet Feb. 22, 2023, https://www.gaumard.com/obstetricmr, 2023, 13 pages.

Guamard, "Victoria S2200—Advanced Obstetric Patient Simulator", downloaded from the internet Feb. 22, 2023, https://www.gaumard.com/s2200-victoria-childbirth-simulator, 2023, 16 pages.

Laerdal Medical, "MamaNatalie Birthing Simulator", downloaded from the internet Feb. 22, 2023, https://laerdal.com/us/products/simulation-training/obstetrics-pediatrics/mamanatalie/, 2023, 8 pages.

Laerdal Medical, "PROMPT Flex Birthing Simulator", downloaded from the internet Feb. 22, 2023, https://laerdal.com/us/products/simulation-training/obstetrics-pediatrics/prompt-flex/, 2023, 12 pages.

International Search Report and Written Opinion for International Application No. PCT/US2022/049652, mailed Mar. 13, 2023, 13 pages.

\* cited by examiner

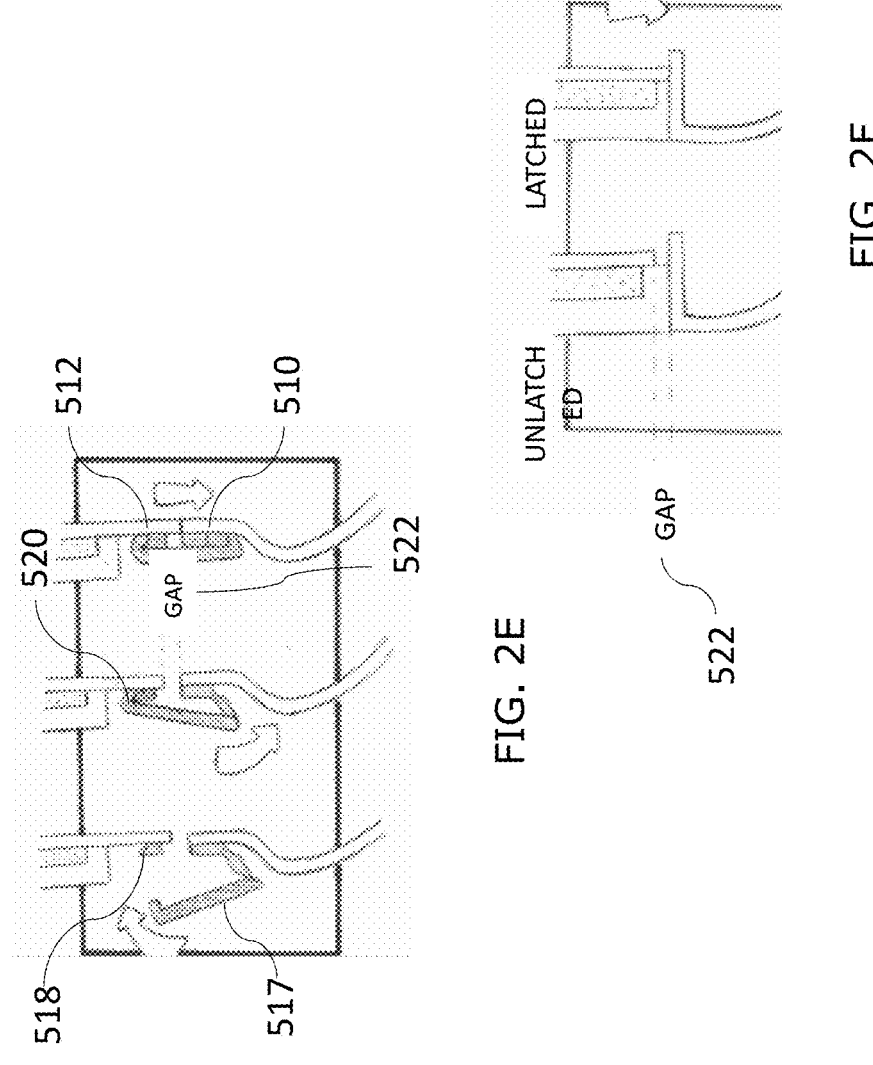
FIG. 2E
FIG. 2F
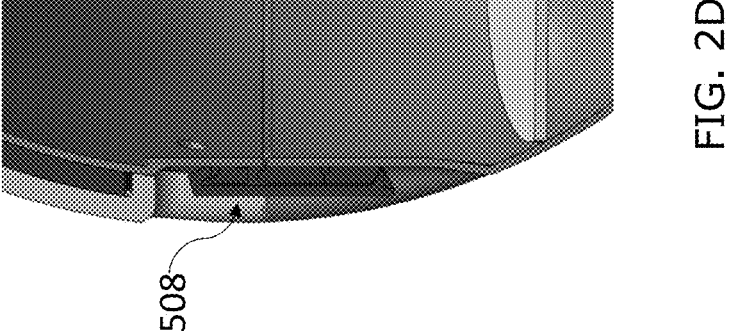
FIG. 2D

124

118

130

134

132

122

122

126

146

566

580

574

582

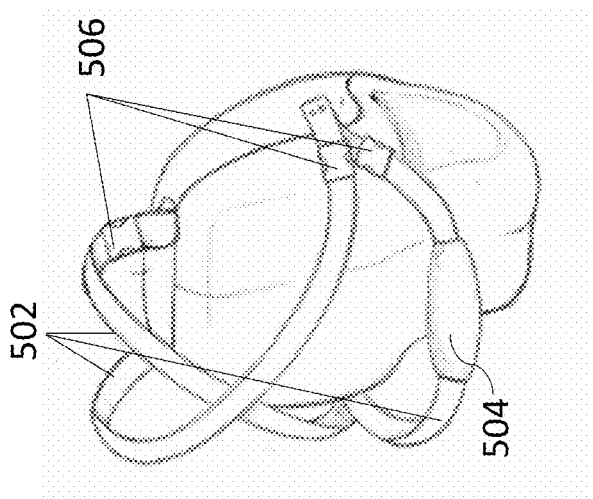
FIG. 18B
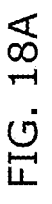
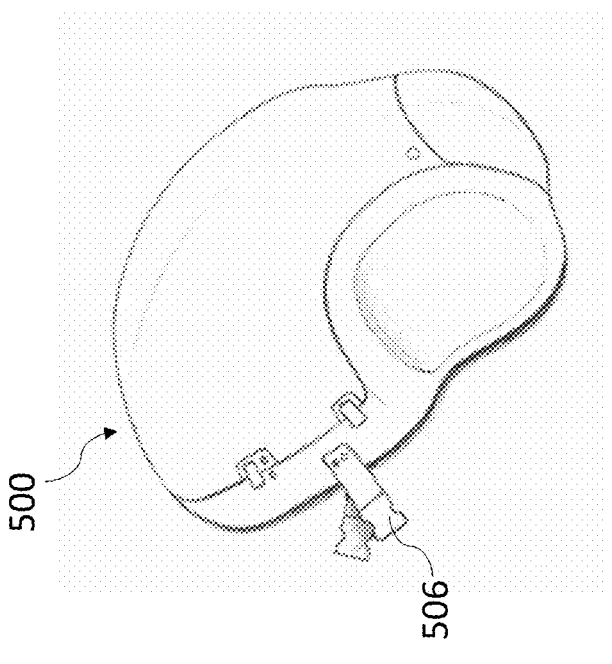
FIG. 18A

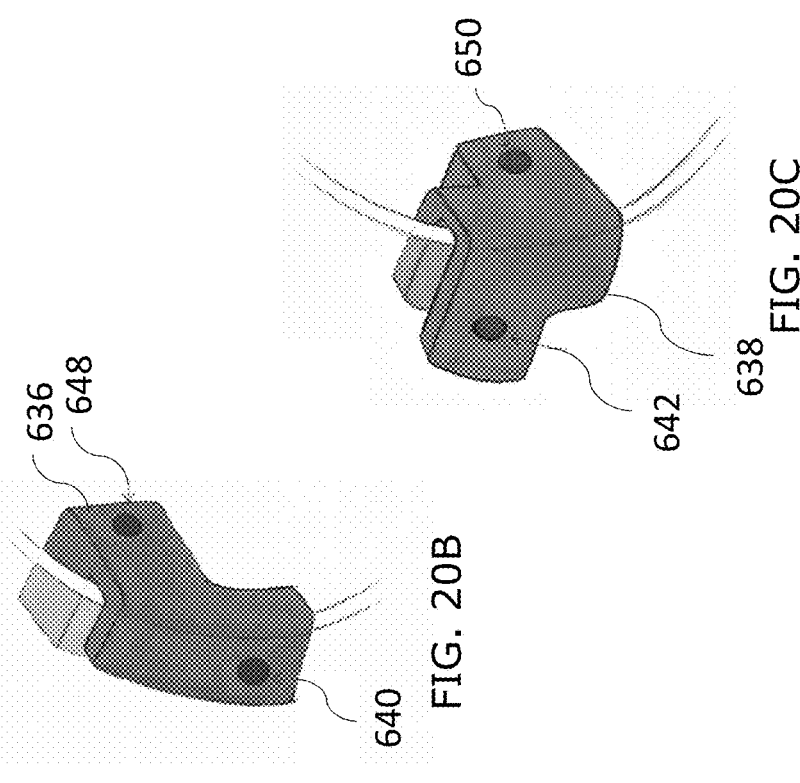
FIG. 20B
FIG. 20C
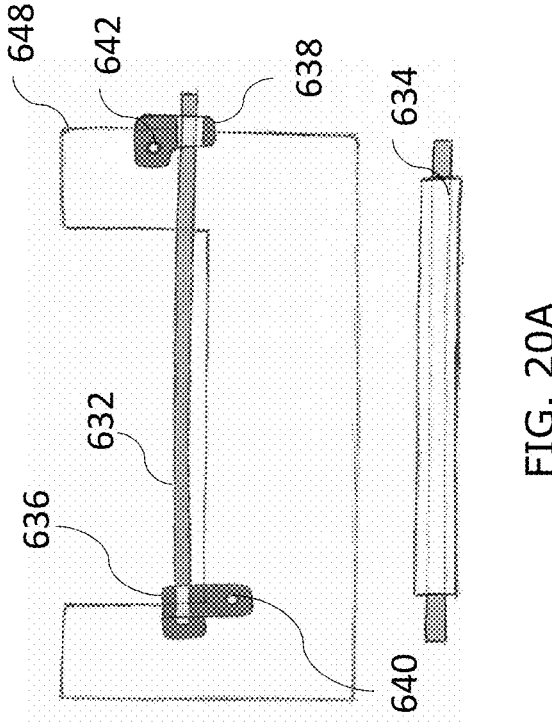
FIG. 20A

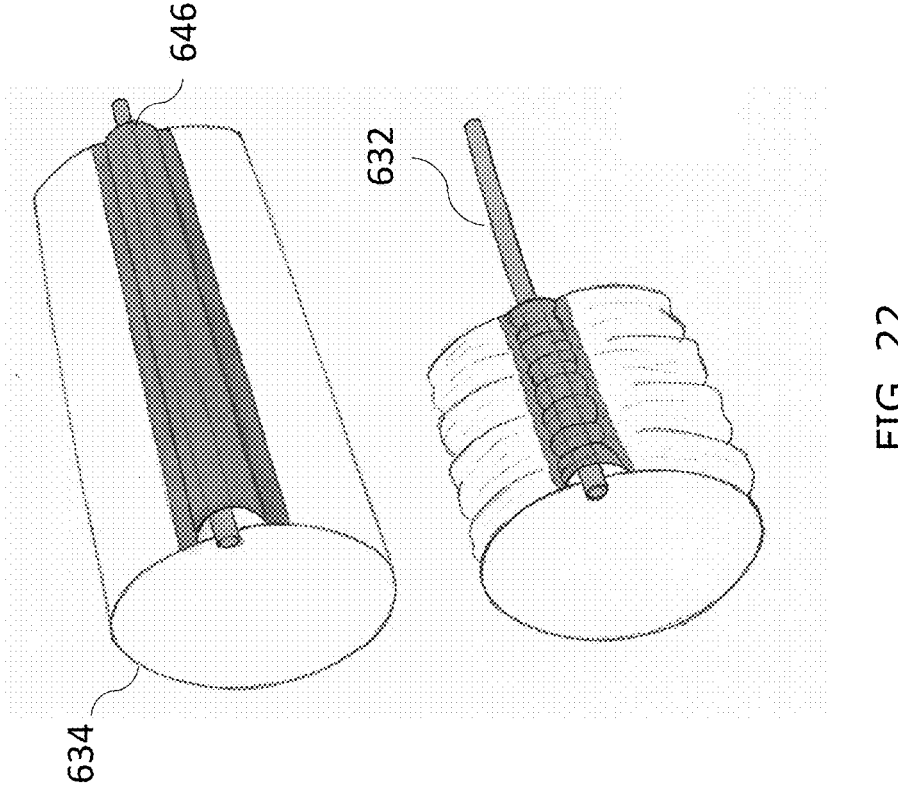
FIG. 22

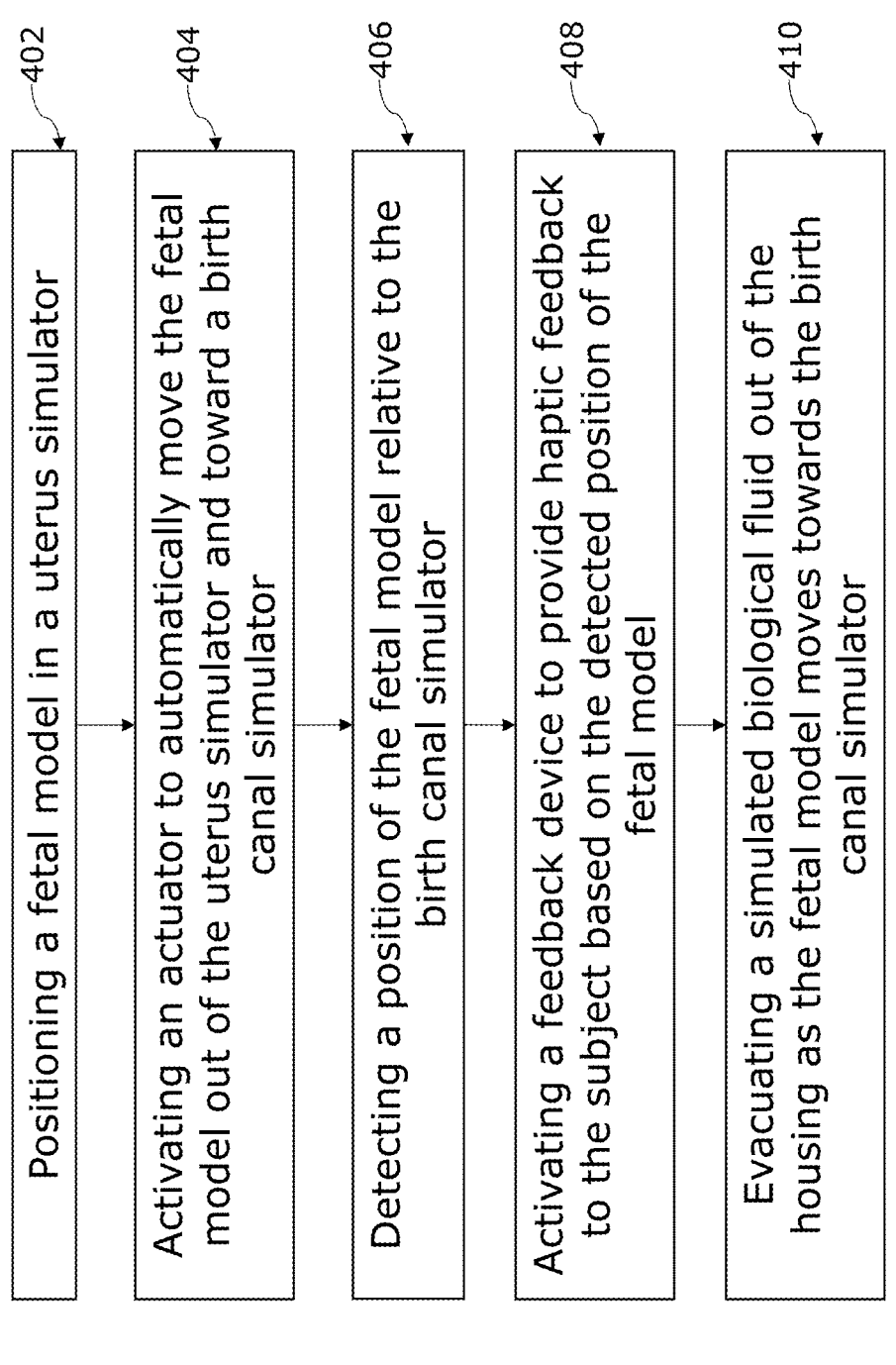

Positioning a fetal model in a uterus simulator — 402

Activating an actuator to automatically move the fetal model out of the uterus simulator and toward a birth canal simulator — 404

Detecting a position of the fetal model relative to the birth canal simulator — 406

Activating a feedback device to provide haptic feedback to the subject based on the detected position of the fetal model — 408

Evacuating a simulated biological fluid out of the housing as the fetal model moves towards the birth canal simulator — 410

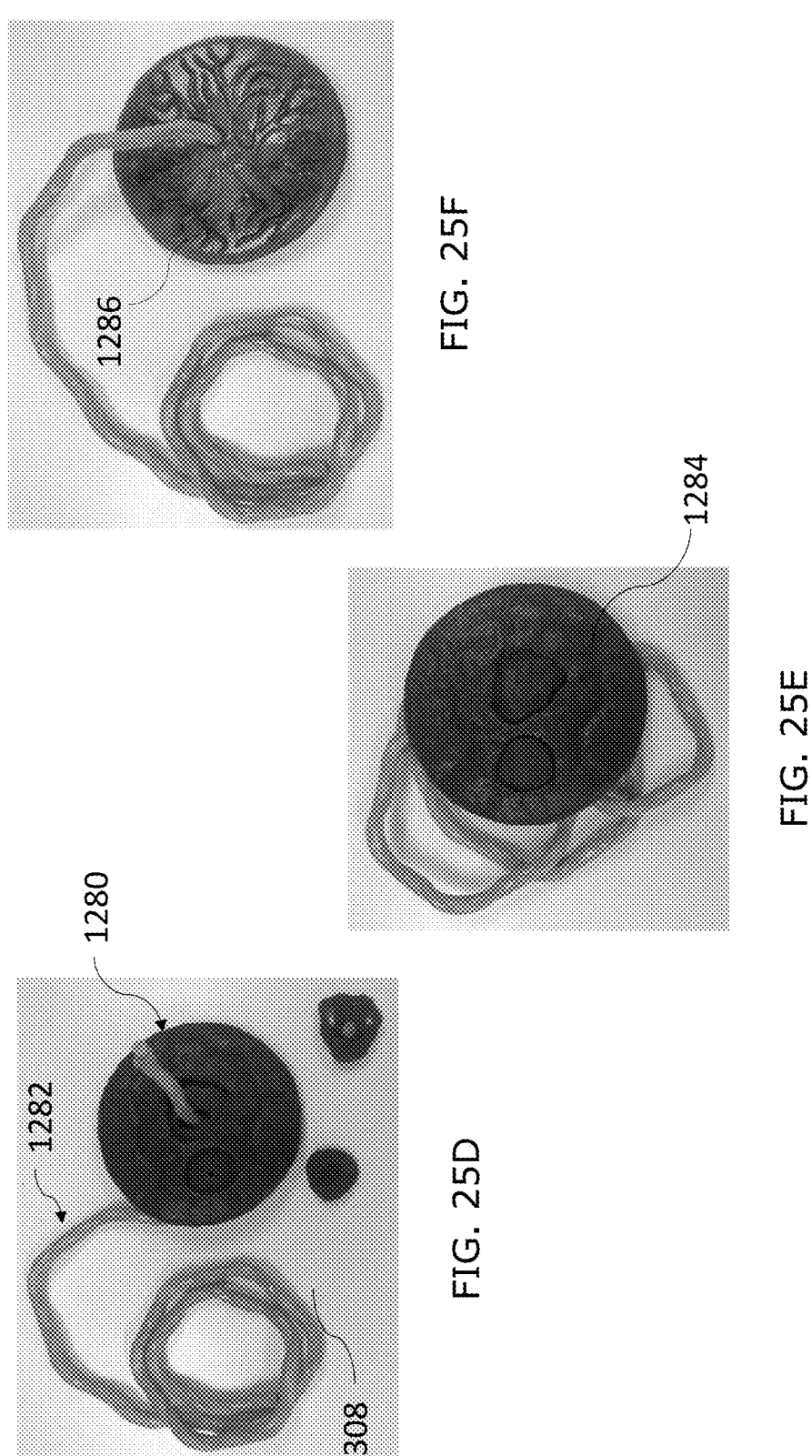

1280

1282

1306a

1308a

1314

1312

1310

1316

1306a

1306a

1308a

1306

1308

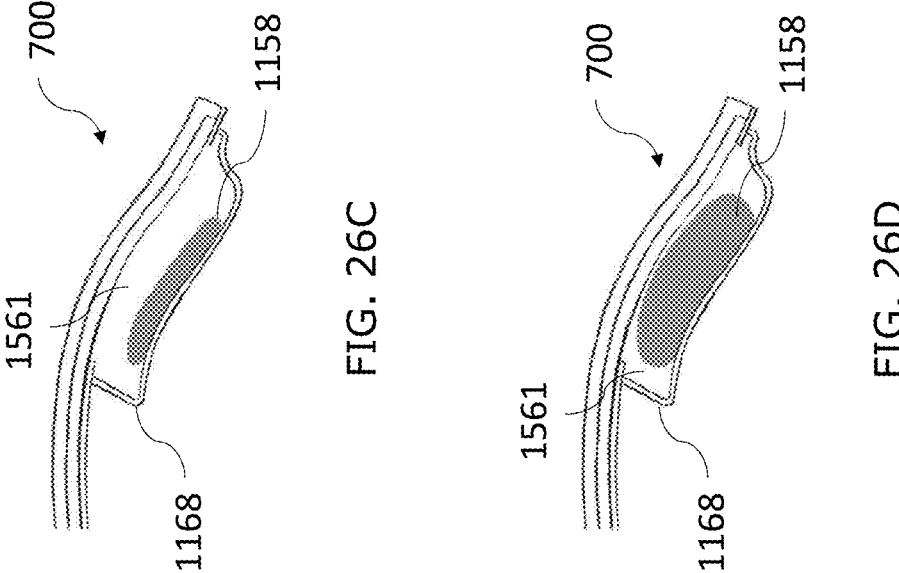
FIG. 26C
FIG. 26D
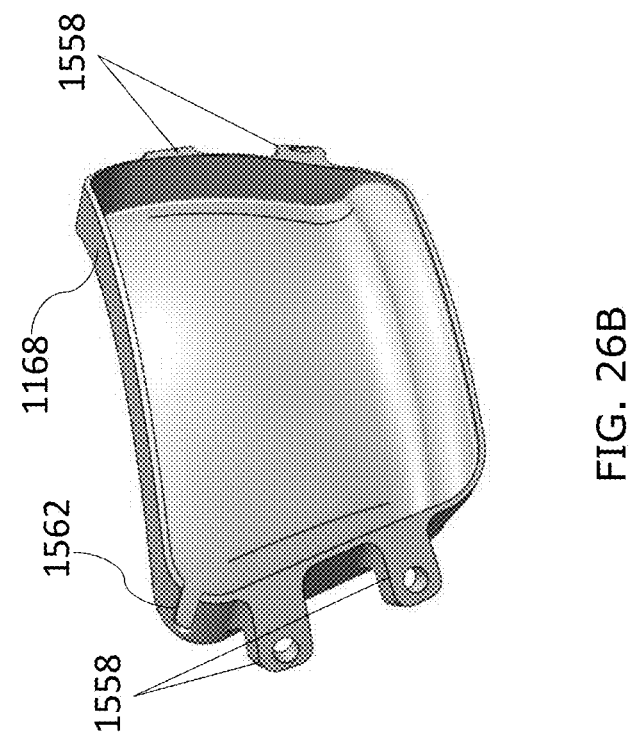
FIG. 26B

WEARABLE BIRTHING SIMULATORS

CROSS REFERENCE TO RELATED APPLICATIONS

This application claims priority from U.S. Provisional Application Ser. No. 63/278,580, titled "WEARABLE BIRTHING SIMULATORS," filed Nov. 12, 2021, incorporated herein by reference in its entirety for all purposes.

FIELD OF THE INVENTION

The present invention relates generally to medical simulations, and more particularly, to simulation devices for training care providers to manage basic and advanced situations relevant to various stages of pregnancy, labor, and delivery.

BACKGROUND OF THE INVENTION

Conventionally, the training process for nursing or medical students related to patient care and treatment may employ mannequins or static models that do not simulate realistic conditions or provide realistic patient feedback. This lack of realistic conditions and feedback makes it difficult for nursing or medical students to gain the education and experience needed to perform proper care or interventions when working with actual patients. Accordingly, improved systems and devices are desired for training medical care providers to manage basic and advanced situations relevant to the stages of pregnancy and childbirth, as well as provide care to maternal and fetal patients.

SUMMARY OF THE INVENTION

Aspects of the present invention are directed to birthing simulation systems and devices.

In accordance with one aspect of the present invention, a wearable birthing simulator is disclosed. The birthing simulator includes a housing that is configured to be secured to a subject and the housing defines an opening and an outer layer. Positioned within the housing is a uterus simulator, which is configured to contain a removable fetal model. Also positioned within the housing is a birth canal simulator, which is configured to be coupled to the uterus simulator. The birthing simulator further comprises a controller and a birthing device configured to move the removable fetal model towards the birth canal simulator. The birthing device comprises an actuator assembly in communication with the controller for automatically moving the fetal model towards the birth canal simulator. One or more sensors are mounted to the housing and are electrically connected to the controller. The one or more sensors are configured to detect movement of the fetal model by the birthing device. A feedback device is in communication with the controller and is configured to provide haptic feedback to the subject. The controller is configured to activate the feedback device to provide the haptic feedback to the subject in response to sensing the movement of the fetal model toward the birth canal simulator.

In accordance with yet another aspect of the present invention, a method for using a wearable birthing simulator is disclosed. The method includes the step of positioning a fetal model in a uterus simulator, which is positioned within a housing configured to be securable to a subject. The method further includes the step of activating an actuator to automatically move the fetal model out of the uterus simulator and toward a birth canal simulator, which is coupled to the uterus simulator. The method comprises the step of detecting a position of the fetal model relative to the birth canal simulator. Based on the detected position of the fetal model, a feedback device is activated to provide haptic feedback to the subject. The method also includes the step of evacuating a simulated biological fluid out of the housing as the fetal model moves towards the birth canal simulator.

BRIEF DESCRIPTION OF THE DRAWINGS

The invention is best understood from the following detailed description when read in connection with the accompanying drawings, with like elements having the same reference numerals. When a plurality of similar elements is present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures:

FIGS. 2D-2F are diagrams illustrating an exemplary latch;

FIGS. 18A-18B depict exemplary straps attached to the housing for securing the wearable birthing simulator to the subject;

FIG. 20A-20C depict the support structure, showing one or more rails;

FIG. 22 depicts another exemplary uterus simulator;

FIG. 24 depict an exemplary method of operating the wearable birthing simulator;

FIGS. 25A-25J depict another exemplary simulated umbilical cord connected to an exemplary simulated placenta; and FIGS. 26A-26D depict an exemplary boggy uterus simulator.

DETAILED DESCRIPTION OF THE INVENTION

Figure 1B:
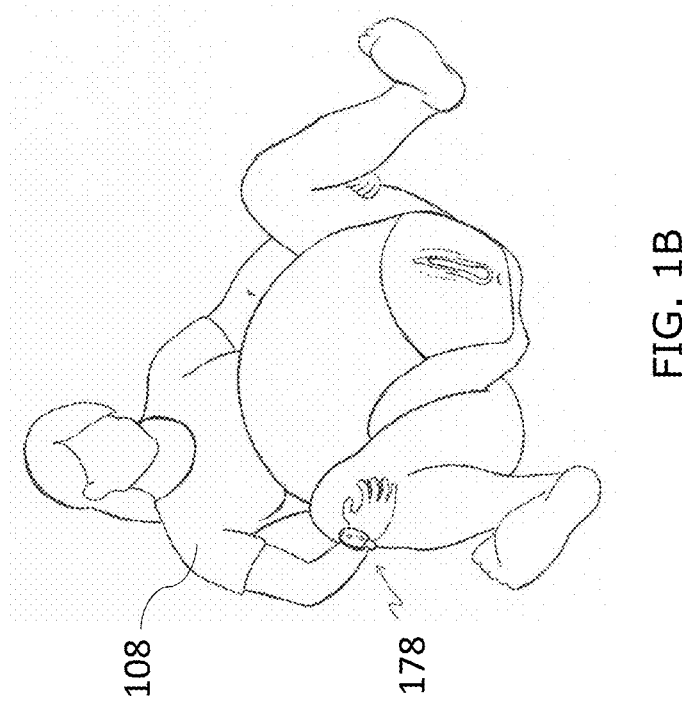
FIG. 1B depicts the wearable birthing simulator configured to be secured to a subject.
Figure 1A:
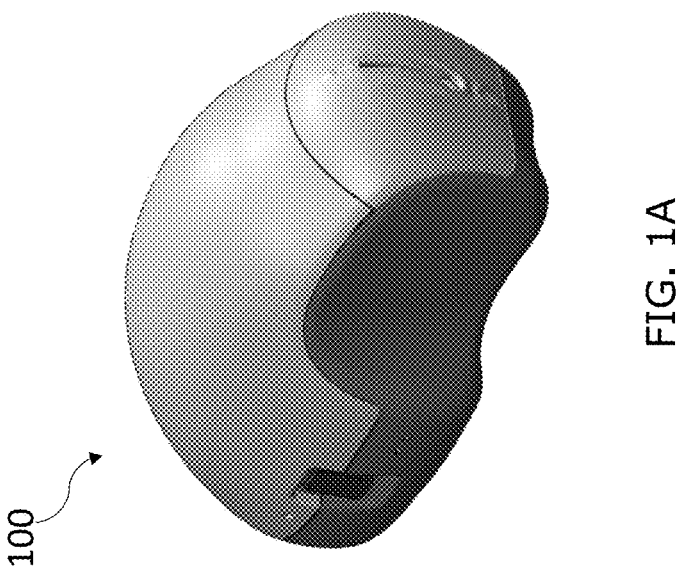
FIG. 1A depicts an exemplary wearable birthing simulator in accordance with aspects of the present invention.

Aspects of the invention are described herein with reference to simulating specific care and management of maternal and fetal patients during various stages of pregnancy, labor and delivery, including any complications related thereto. It will be understood by one of ordinary skill in the art that the example devices described herein may be used to simulate care and management of a variety of medical situations relevant to pregnancy and childbirth, and are not limited to any particular situation disclosed herein. Other medical situations suitable for simulation with the disclosed devices will be known to one of ordinary skill in the art from the description herein.

The example devices disclosed herein may be particularly suitable for providing an enhanced level of realism and/or feedback to the subject and the treatment provider relative to conventional training devices. Haptic feedback may be provided to the simulated subject, such as a simulated maternal patient, during the simulated medical situation in order to encourage the subject to mimic realistic patient reactions, and thereby reinforce proper care techniques and establish realistic expectations of the various stages of labor and delivery. Likewise, this feedback may be provided to correct errors that the care provider may otherwise struggle to detect during the simulated medical situation. The provision of feedback using the example device of the present invention may desirably improve the ability of care providers to comfortably and effectively manage the care of maternal and fetal patients, without risking harm or injury to the maternal or fetal patient.

It will be appreciated that throughout this specification the term treatment or care provider is to be broadly construed to include any provider of care, management or treatment related to pregnancy and childbirth. The term may include trainees and professionals in the field of medicine, particularly in the fields of obstetrics, midwifery, nursing, and emergency medical services, as well as non-health care professionals. Further, mentions of a fetus, organs, and other segments of human anatomy are intended to refer to anatomical models simulating or emulating functions or responses of their biological counterparts.

The term childbirth scenario includes all situations relevant to various stages of labor and delivery. As non-limiting examples, the term encompasses the following simulated medical situations: normal delivery (without complications), abnormal delivery (with complications), breech delivery, shoulder dystocia, postpartum hemorrhage (PPH), retained placental fragments (RPF), complete or incomplete placenta, uterine contraction, and blood loss.

With reference to the drawings, FIGS. 1A-1D illustrate an example birthing simulator 100 in accordance with aspects of the present invention. Simulator 100 is usable to train medical care providers to treat maternal and fetal patients by enabling the performance of one or more simulated childbirth scenarios. The simulator 100 can be adjusted to simulate realistic conditions of childbirth scenarios in various environments (e.g. hospital or other sterile settings, trauma or critical care sites, etc.). In general, simulator 100 can include a housing 102, a birthing device 104, and a fetal model 106. Additional details of simulator 100 are described below.

Housing 102 houses components which simulate the one or more childbirth scenarios, including the birthing device 104 and the removable fetal model 106. In an example, as seen in FIGS. 1A-1D, the housing 102 has a size and shape that is intended to simulate a protruding belly, upper abdomen, or stomach of a subject 108, such as a patient simulating pregnancy. In some examples, housing 102 incorporates or is connected to a number of separate components designed to best simulate a realistic childbirth scenario.

Figure 1C:
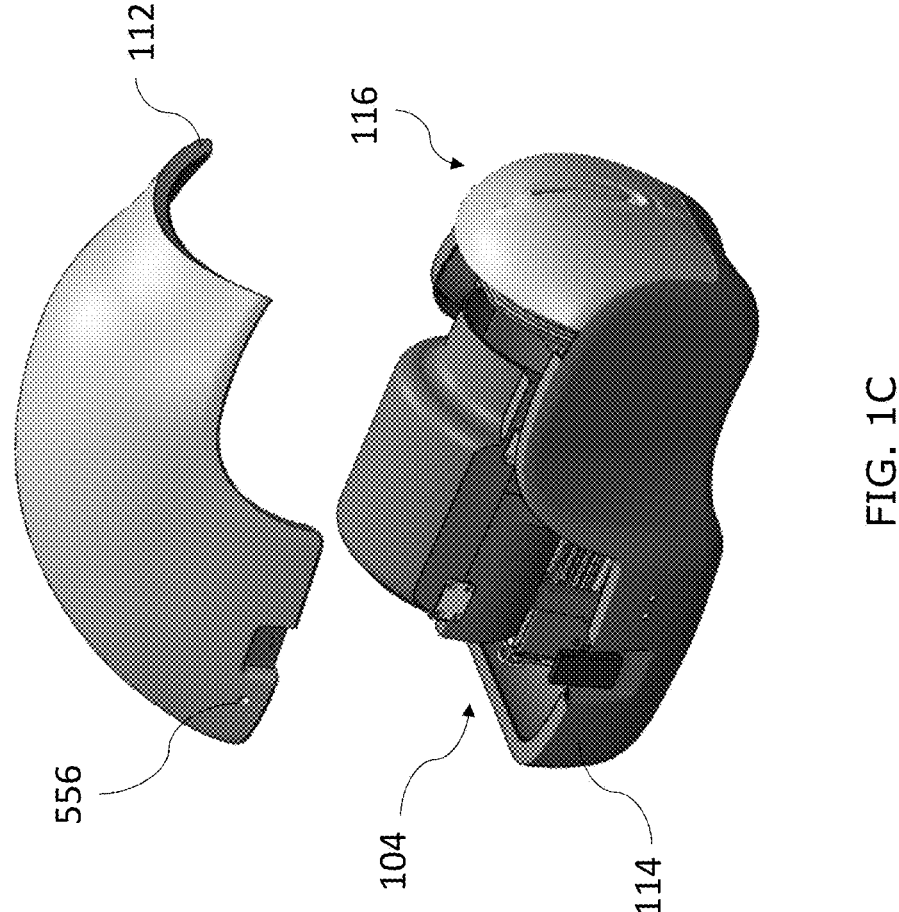
FIG. 1C is a partially exploded view of the wearable birthing simulator.

As shown in FIGS. 1A-1D, the housing 102 can be formed from one or more structures which together define a cavity or space 110, with the birthing device 104 and the fetal model 106 being positioned within the space 110 in the housing 102. Specifically, the housing 102 includes multiple structures which together define a cavity or space 110, including a top portion 112 and a bottom portion 114, as shown in FIGS. 2B and 2C. As seen in FIG. 1C, the operational components of the simulator (e.g. fluidics, controller, etc.) are provided or positioned within this cavity or space 110 of the housing 102, thereby providing protection for at least these components and concealing wiring and other items that may detrimentally impact realism of the medical treatment simulation. Additional details of these operational components are discussed further below. Although the housing 102 is illustrated as being comprised of separate components, e.g. top portion 112 and bottom portion 114, one of ordinary skill in the art would understand from the description herein that the housing 102 may be integrally formed as a single body of unitary construction.

In an exemplary embodiment, the top portion 112 and the bottom portion 114 are each made of more durable or rigid material 516 (e.g. carbon fiber), and the top portion 112 additionally includes an overlay 514 comprising material intended to mimic the patient's skin. The more rigid material 516 (e.g. carbon fiber) is intended to provide support and/or a mounting structure for the components of the simulator 100. In an alternative embodiment, the top portion 112 may be made of material intended to mimic the patient's skin, whereas the bottom portion 114 may be made of more durable material. The bottom portion 114 may be formed from a more rigid material intended to provide support and/or a mounting structure for the components of the simulator 100. Although FIGS. 1A-1D and 2B-2C illustrate that the top portion 112 and the bottom portion 114 are made of different materials, it would be understood from the description herein that optionally, the top portion 112 and bottom portion 114 may comprise the same material. The top portion 112 is useful to conceal components of simulator 100, such as the birthing device 104 and the fetal model 106, and thereby increase the realistic appearance of simulator 100. The material of top portion 112 or overlay 514 of the top portion 112 is customizable in coloring and texturing to match a variety of skin tones. In one example, the material of the top portion 112 or overlay 514 of the top portion 112 is selected to simulate the look and feel of a patient's skin. This material may comprise an elastic material such as silicone. Other suitable materials for use in simulating a patient's skin will be generally known to one of ordinary skill in the art from the description herein.

Further, as shown in FIGS. 2A-2F, the top portion 112 and the bottom portion 114 may be secured together via at least one latch 508 moveable between unlatched and latched states, each latch 508 comprising a handle portion 517 and a locking surface 518. The handle portion 517 is moveable between an unlocked position and a locked position. When the handle portion 517 is in the unlocked position, the latch 508 is in the unlatched state. Conversely, when the handle portion 517 is in the locked position, the latch 508 is in the latched state, thereby securing the top portion 112 and the bottom portion 114 of the housing 102 together.

Figure 2A:
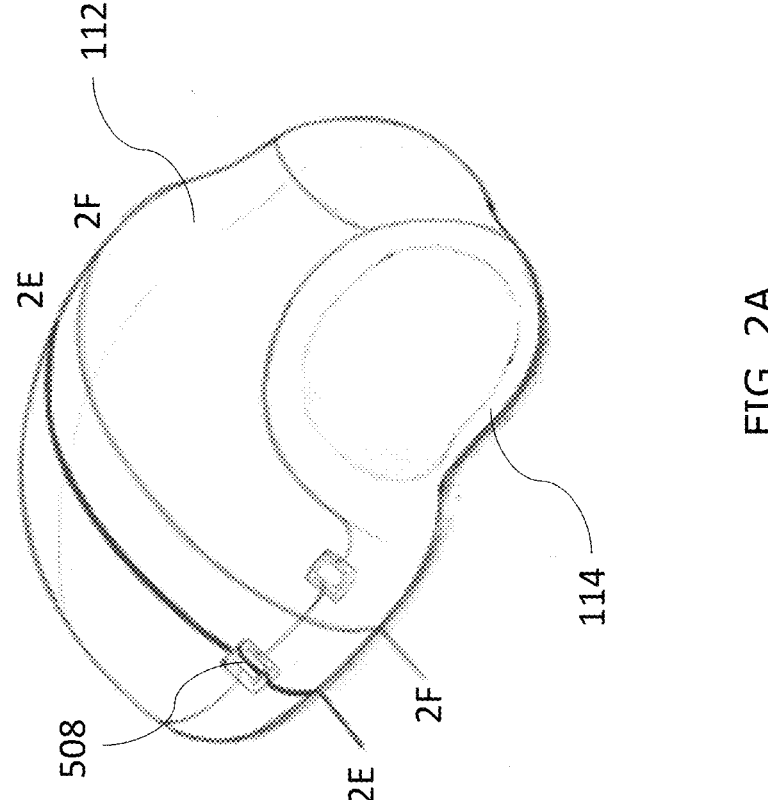
FIG. 2A is a perspective view of an exemplary housing.

As best shown in FIG. 2E, which is a cross-section view taken along line 2E-2E of the housing 102 shown in FIG. 2A, when the handle portion 517 is in the unlocked position, the handle portion 517 is disengaged from the locking surface 518. The handle portion 517 is disengaged from the locking surface 518 for example, when the handle portion 517 is positioned obliquely relative to the housing 102. Conversely, when the handle portion 517 is in the locked position, the handle portion 517 is engaged with the locking surface 518. When the handle portion 517 is engaged with the locking surface 518, the handle portion 517 is positioned flush against a surface of the housing 102. In one example, the handle portion 517 is positioned flush against the surface defined by a recess 510 of the bottom portion 114 and a corresponding recess 512 of the top portion 112, the surface comprising a pocket formed when the recesses 510 and 512 are aligned. This alignment between the top portion 112 and the bottom portion 114 may be facilitated by one or more magnets disposed within a respective interior surface of both the top portion 112 and the bottom portion 114.

It should be understood that although FIGS. 2D-2F illustrate a latch 508 positioned within the pocket formed when recesses 510/512 are aligned, an identical latch 508 may additionally or optionally be disposed in other portions of the housing 102, such that the at least one latch 508 are positioned opposite of each other. For example, an identical recess 510a may be positioned opposite recess 510b of the bottom portion 114, as shown in FIGS. 2B-2C. Thus, an identical latch 508 may be disposed within the pocket defined by recess 510b and/or another identical recess 512.

In operation, as illustrated in FIGS. 2E and 2F, when the latch 508 is in the unlatched state, the top portion 112 and the bottom portion 114 are not secured together, such that a gap 522 may exist between at least the recesses 510 and 512. An application of force or pressure to the handle portion 517 moves the handle portion 517 toward engagement with the locking surface 518 for closing the gap 522. In particular, engagement between the handle portion 517 and the locking surface 518 causes recess 510 to be positioned flush against recess 512. Specifically, at least the curved portion 520 of the handle portion 517 is moved toward the locking surface 518 until at least the curved portion 520 of the handle portion 517 engages the locking surface 518. When the locking surface 518 is engaged by the handle portion 517, the gap 522 between the recesses 510 and 512 is reduced or eliminated, thereby securing the top portion 112 and the bottom portion 114 together. As shown in FIG. 2F, which is a cross-section view taken along line 2F-2F of the housing 102 shown in FIG. 2A, when the gap 522 between the recesses 510 and 512 is reduced or eliminated by movement of the latch 508 toward the latched state, the top portion 112 and the bottom portion 114 are thereby secured together.

In one non-limiting example, the housing 102 is configured to rest overtop or on top of the subject 108, who is playing the role of the maternal or pregnant patient. As seen in FIG. 1B, the housing 102 is configured to be positionable between the thighs and legs of the subject 108, such that the bottom portion 114 and the top portion 112 may have a size and shape that accommodate the lower limbs of the subject 108. Specifically, the position of the simulator 100 relative to the subject is intended to mimic a maternal patient 108 in a birthing position, such as a semi-reclined position. However, various modifications may be made in the size and shape of the housing 102 without departing from the invention, such that the simulator 100 may be positioned relative to the subject 108 in any number of birthing positions, including but not limited to a sitting position, a squatting position, and a birthing ball position.

In another example, as illustrated in FIGS. 18A-18B, the housing 102 may be configured to be secured to the subject 108. In another non-limiting example, the housing 102 includes one or more attachment mechanisms, including but not limited to straps 502 configured to encircle one or more of the torso or limb(s) of the subject 108. Straps 502 may be usable to secure simulator 100 to the subject 108 during the simulated childbirth scenario, such that the simulator 100 is wearable and/or movement of simulator 100 relative to the subject 108 is restricted or eliminated. Straps 502 are further configured to be adjustable to accommodate different sizes of subject 108. In particular, straps 502 may be separate components relative to simulator 100, such that buckles 506 that are coupled to the housing 102 can be used to secure simulator 100 to subject 108 using straps 502. In this configuration, straps 502 are removeable relative to the housing 102 via disengagement from buckles 506.

However, one of ordinary skill in the art would understand from the description herein that the straps 502 and housing 102 may be integrally formed as a single body of unitary construction. It should be also understood that the illustrated locations of connection points for the straps 502 to housing 102 (via buckles 506) in FIGS. 18A-18B are not intended to be limiting. Additionally or optionally, the straps 502 may further provide at least one of lumbar support and shoulder support for the subject 108 during the simulated childbirth scenario. Still further, one or more pads 504 comprising elastomeric material may provide additional cushioning to maintain or increase comfort of the subject 108 during the simulated childbirth scenario.

Figures 2B, 2C:
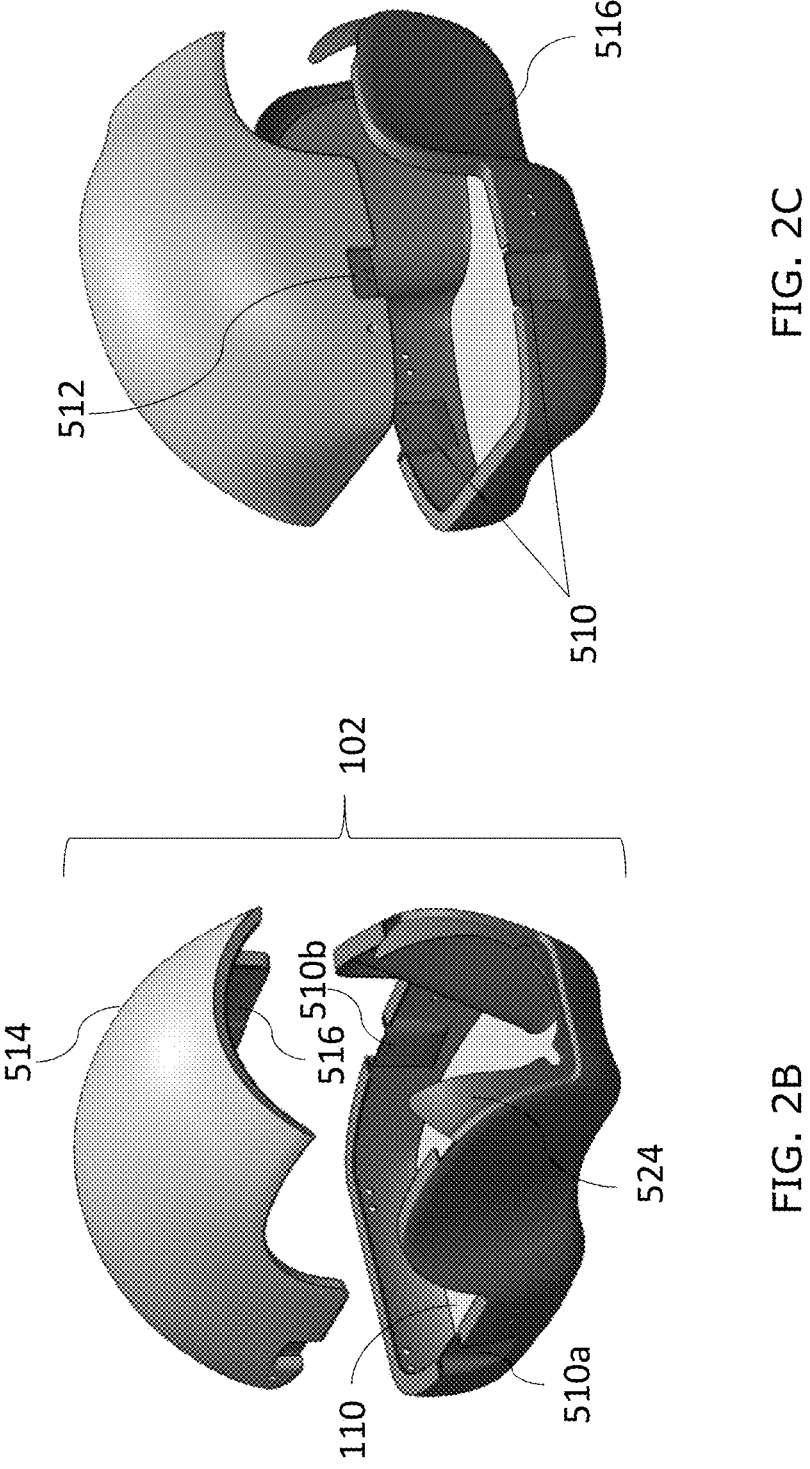
FIGS. 2B-2C depict exploded views of the housing.
Figure 3B:
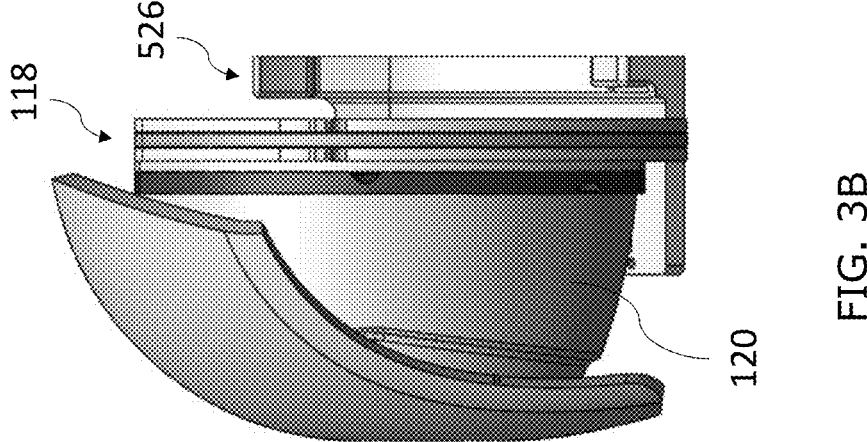
FIGS. 3A-3B depict an exemplary birth canal simulator.
Figure 3A:
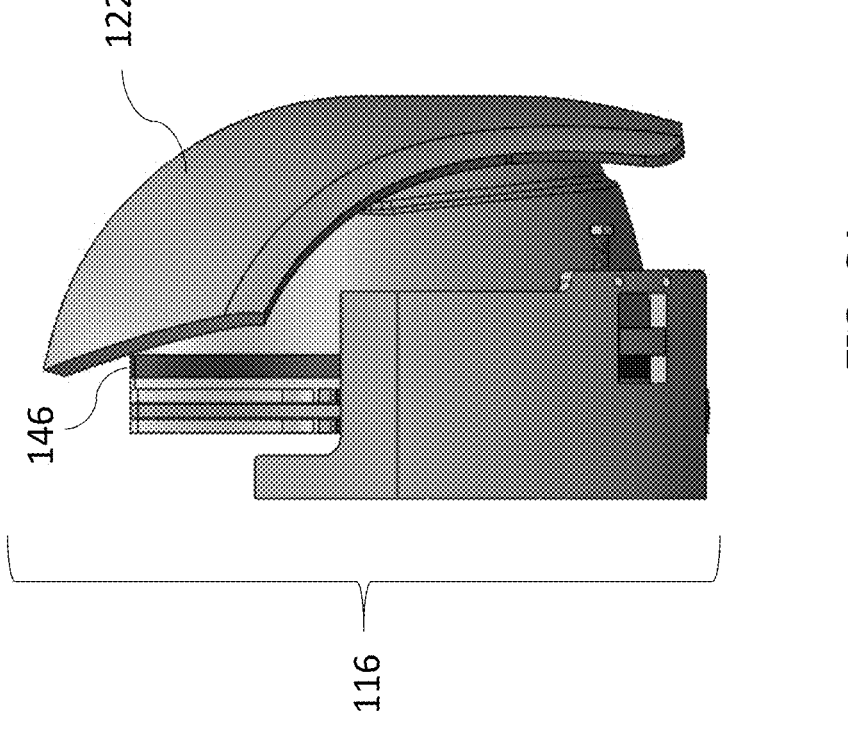
Figure 4A:
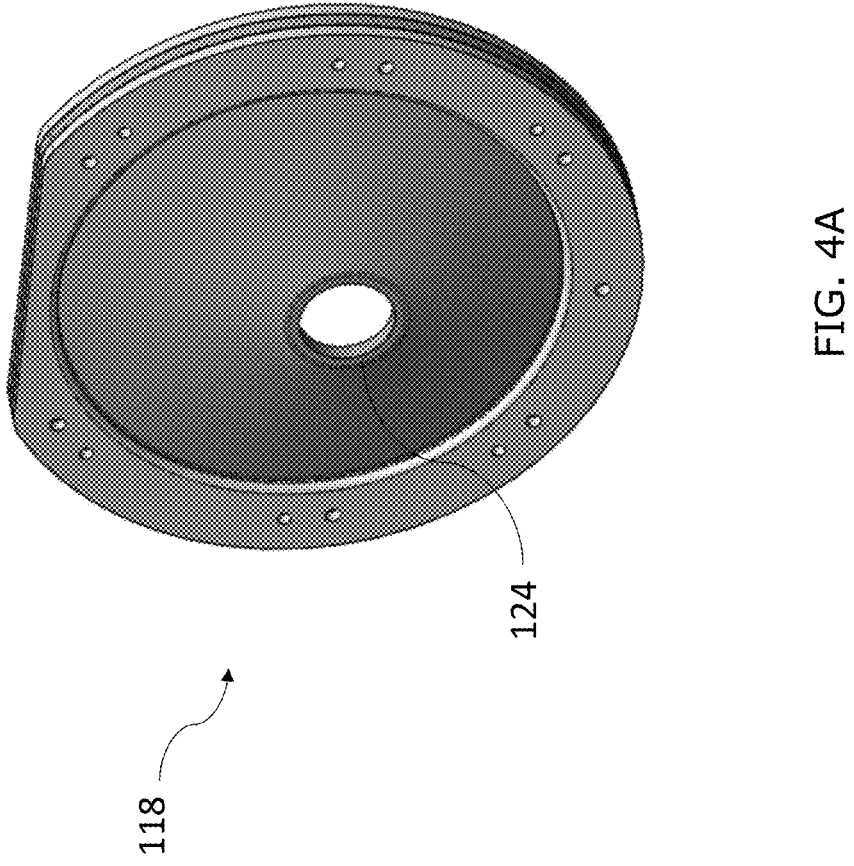
FIGS. 4A-4E depict an exemplary simulated cervix of the birth canal simulator.
Figure 4B:
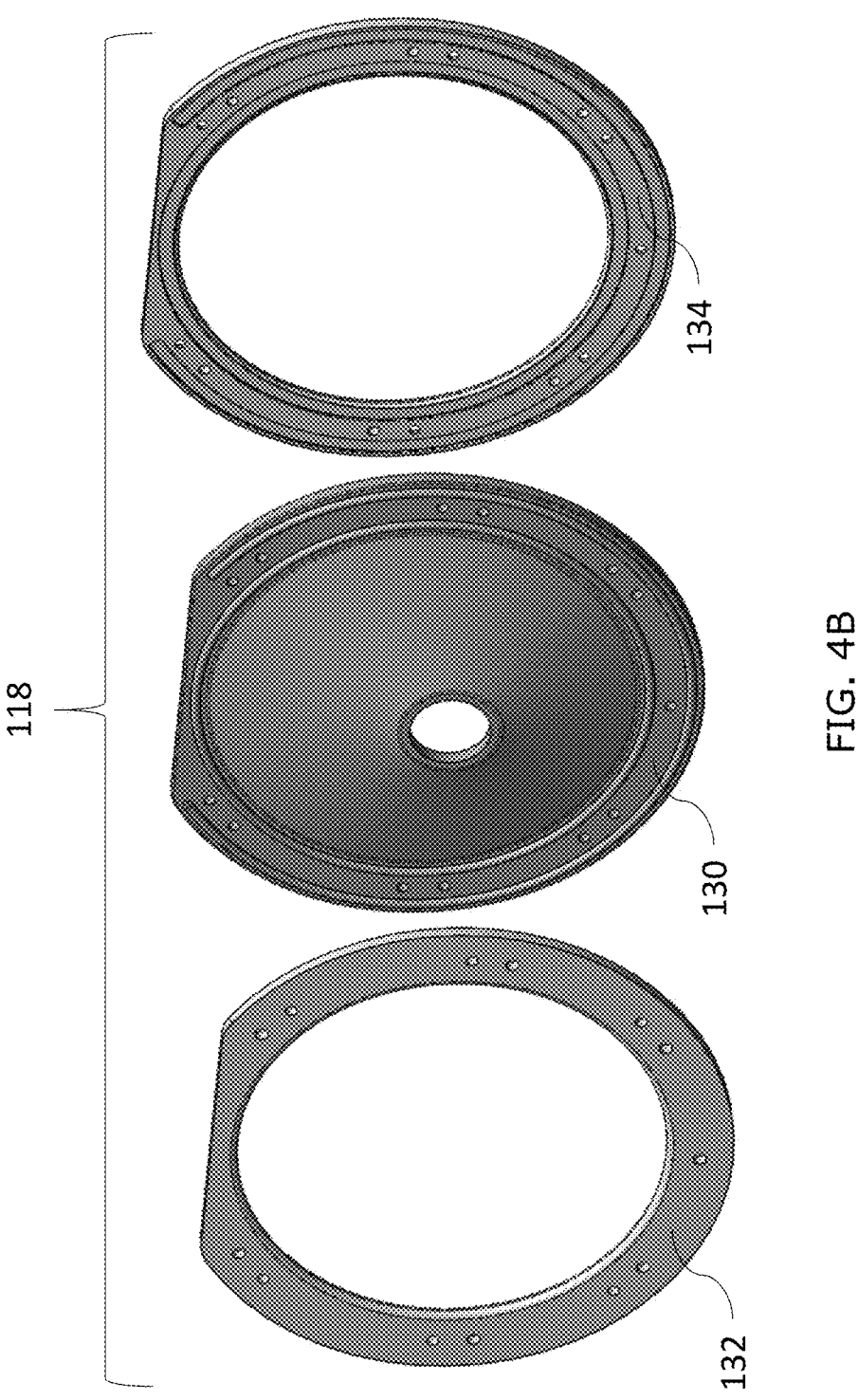
Figure 4D:
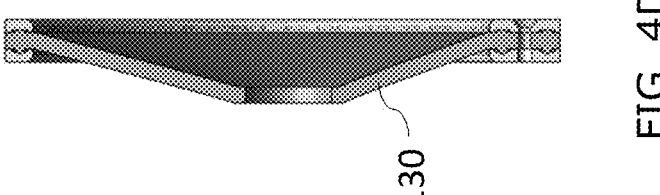
Figure 4C:
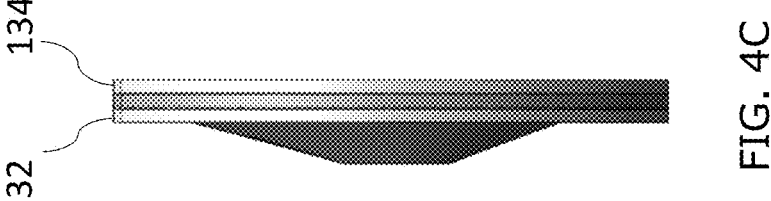
Figure 4E:
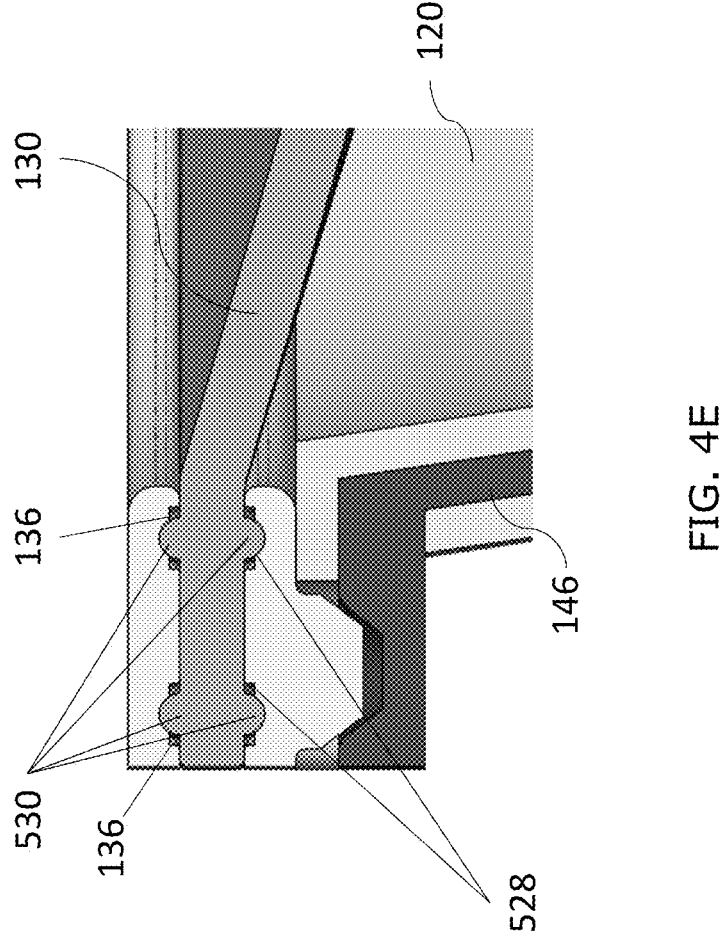

The housing 102 is configured to receive a removable birth canal simulator 116. In one embodiment, as shown in FIG. 1C, the birth canal simulator 116 is configured to be partially enclosed by the top portion 112 and bottom portion 114 of the housing 102. The bottom portion 114 includes a mounting surface 524 (FIG. 2B) configured to receive and/or secure at least a portion of the removeable birth canal simulator 116. In one example, as illustrated in FIGS. 3A-3B, the birth canal simulator 116 comprises a simulated cervix 118, a simulated birth canal 120, and a vise assembly 526 configured to attach the simulated cervix 118 to at least the simulated birth canal 120. Additionally or optionally, the birth canal simulator 116 further comprises a simulated genitalia 122 that is coupled to the simulated birth canal 120. Alternatively, simulated genitalia 122 and simulated birth canal 120 are integrally formed as a unitary piece. Individual components of the birth canal simulator 116 will now be discussed further below.

In one example, the simulated cervix 118 is configured to be removable relative to the simulated birth canal 120 and/or housing 102. This simulated cervix 118 is intended to be removable relative to the simulated birth canal 120 for simulating various stages of labor based on the degree of cervix dilation. Having a simulated cervix 118 that is removable may be desirable to allow for easy removal, cleaning, and replacement of one or more simulated cervixes 118 of varying sizes and shapes over the course of a childbirth scenario or over the course of one or more training or educational sessions. In an example, the simulated cervix 118 simulates a full dilation of the cervix. In another example, the simulated cervix 118 simulates a lesser degree of dilation. The variation in degrees of dilation of the cervix may be indicated by a variation in the size of opening 124. Accordingly, the size and shape of the simulated birth canal 120, through which the simulated cervix 118 is configured to extend when the birth canal simulator 116 is fully assembled, may also vary in size based on degree of cervix dilation during various stages of labor.

The simulated cervix 118 is illustrated in FIGS. 4A-4E. In this illustrated example, the simulated cervix 118 comprises an elastic material 130, such as silicone. The elastic material 130 is intended to stretch and/or deform to accommodate passage of the fetal model 106 for simulating vaginal delivery. Other suitable elastic materials will be generally known to one of ordinary skill in the art from the description herein. The simulated cervix 118 further comprises at least one ring 132, 134 comprising durable or reinforced plastic material. In a non-limiting example, ring 132 defines a groove 136 and the other of the at least one ring 134 defines a corresponding groove 528 that together define a cavity when ring 132 and ring 134 are aligned. Portions 530 of the elastic material 130 are configured to be clamped between the ring 132 and 134, and more specifically, clamped within the cavity. In this way, the silicone material 130 of the simulated cervix 118 is secured in place relative to one or more components of the simulator, such as the simulated birth canal 120.

Figure 5B:
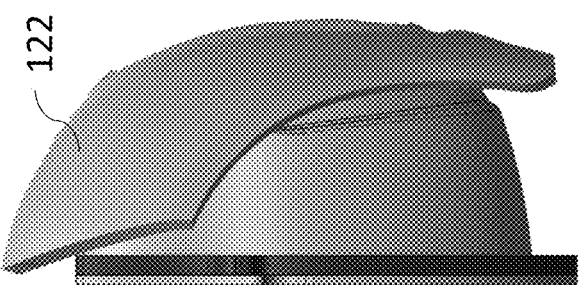
FIGS. 5A-5E depict an exemplary simulated birth canal, an exemplary pelvic ring, and an exemplary simulated genitalia.

Referring now to FIGS. 5A-5E, the material of the simulated birth canal 120 is an elastic material that is intended to stretch and/or deform to accommodate passage of the fetal model 106 for simulating vaginal delivery. In one example, the simulated birth canal 120 comprises silicone. Other suitable elastic materials will be generally known to one of ordinary skill in the art from the description herein. Preferably, as best illustrated in FIG. 5B, the simulated birth canal 120 and the simulated genitalia 122 may be integrally formed as a single body of unitary construction that is separate from the simulated cervix 118. An advantage of this exemplary configuration is that this creates a closed system wherein the simulated birth canal 120 and the simulated genitalia 122 expand in concert, thereby mitigating the creation of a gap or hole for the fetal model 106 to fall through during the course of the simulated childbirth scenario. Further, this exemplary configuration would require fewer components for the simulator 100, thereby decreasing unnecessary complexity in manufacture and assembly thereof. Optionally, the simulated birth canal 120 and the simulated genitalia 122 are separate components. An advantage of this exemplary configuration is that it provides ease and flexibility with respect to cleaning and replacing the separate components, in case of individual wear and tear.

Figure 5A:
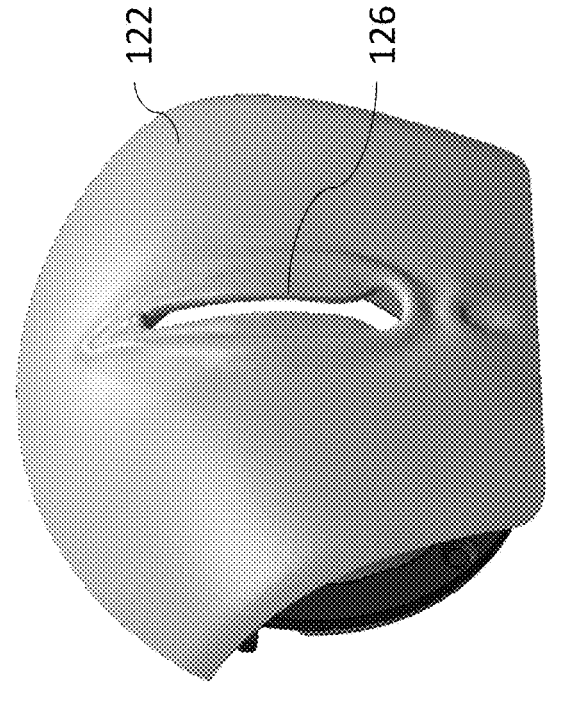

As stated above, the simulated birth canal 120 may be coupled to simulated genitalia 122. The material of the simulated genitalia 122 is an elastic material that is intended to stretch and/or deform to accommodate passage of the fetal model 106 for simulating vaginal delivery. As shown in FIG. 3B, the material of the simulated genitalia 122 and the material of simulated birth canal 120 may be the same, or may comprise different materials during various simulated stages of labor and delivery. Further, as shown in FIG. 5A, simulated genitalia 122 defines an aperture 126 that corresponds to the opening 124 of the simulated cervix 118, such that the fetal model 106 passes through opening 124 of the simulated cervix 118 and subsequently, through the aperture 126 of the simulated genitalia 122 during the simulation of a childbirth scenario. One of ordinary skill in the art would understand from the description herein that the size and shape of the aperture 126 may vary depending on the childbirth scenario to be simulated.

Figure 5D:
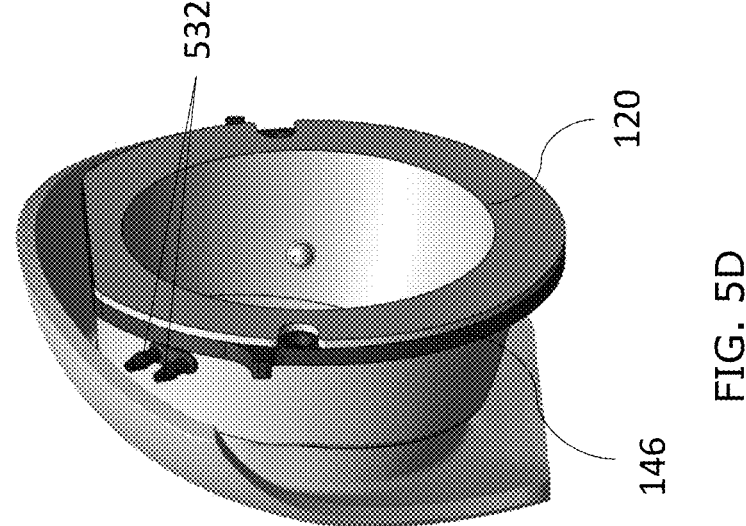
Figure 5C:
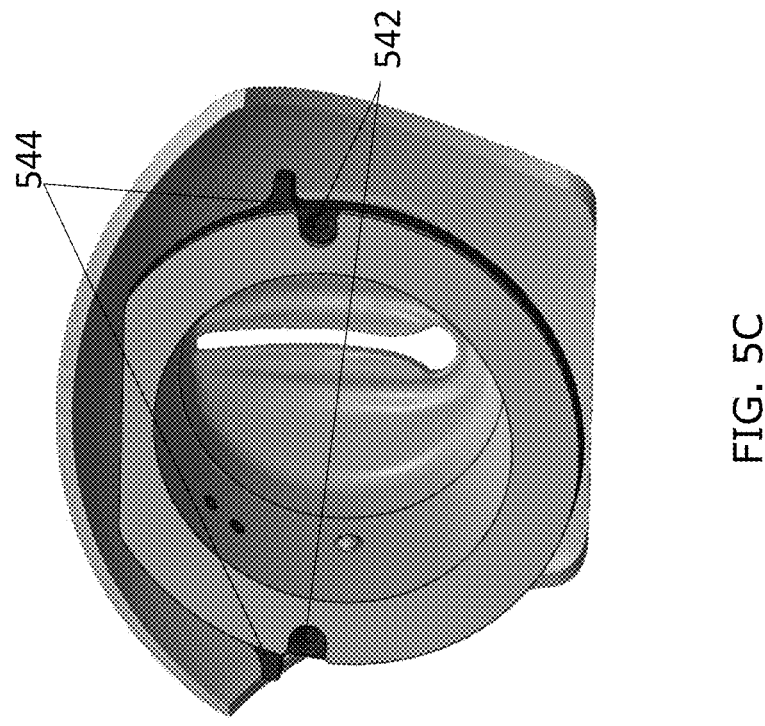
Figure 5E:
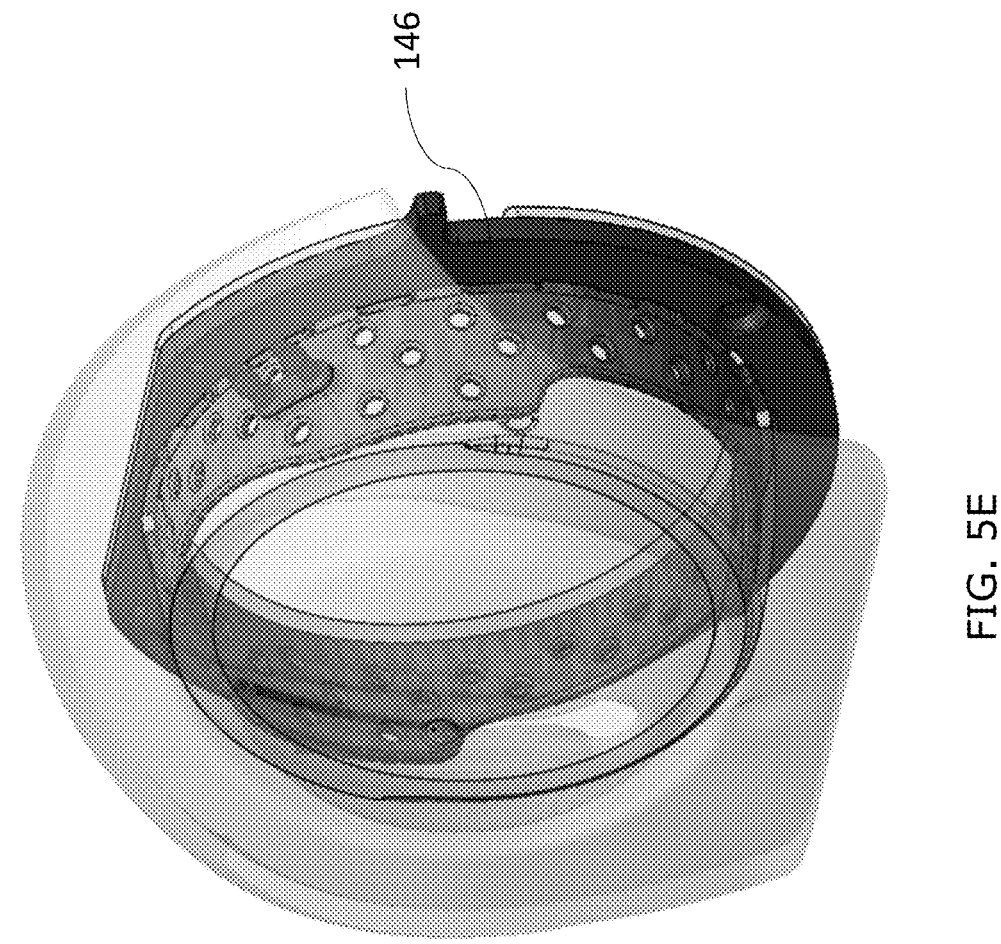

Turning now to FIG. 5E, the simulated birth canal 120 may comprise a pelvic ring 146. The pelvic ring 146 is intended to simulate the shape of the pelvis and may include accurate anatomical landmarks, such as a pelvic bone. A person of ordinary skill in the art would understand that the pelvic ring 146 may vary in diameter from what is illustrated in FIG. 5E, for example, based on the size and shape of simulated birth canal 120 and/or the simulated cervix 118. Elastic material (e.g. silicone) is overmolded over pelvic ring 146 and this elastic material is integrally formed with the elastic material of the simulated birth canal 120. Although FIGS. 5A-5E show that the pelvic ring 146 and the simulated birth canal 120 are integrally formed as a single body of unitary instruction, one of ordinary skill in the art will understand that this component may be a separate component from the simulated cervix 118 and/or the simulated birth canal 120. Further, the pelvic ring 146 may optionally be integrally formed with other components of the simulator 100, including but not limited to a uterus simulator 128 (discussed further below).

Figure 6B:
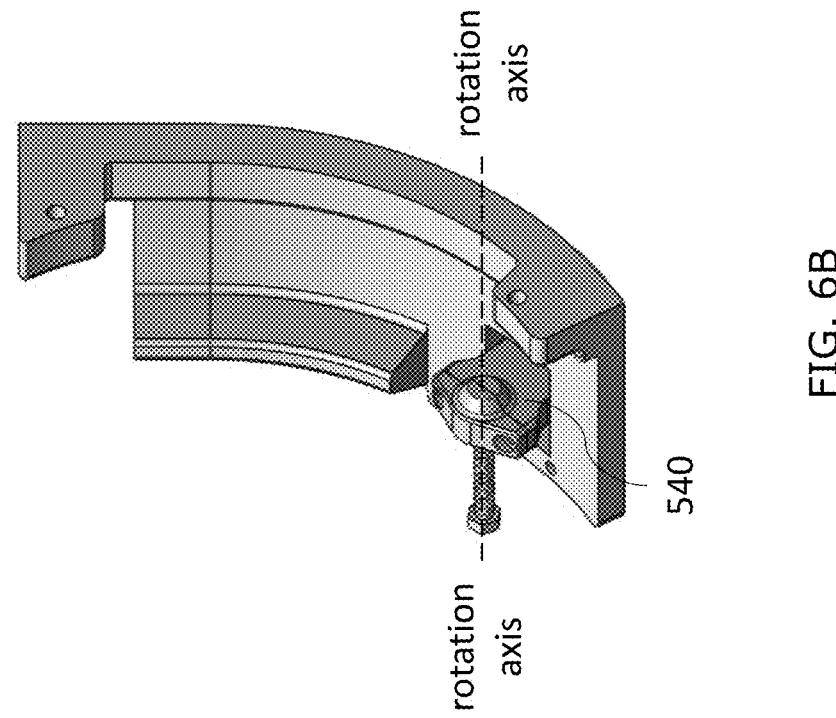
FIGS. 6A-6B depict an exemplary vise assembly.
Figure 6A:
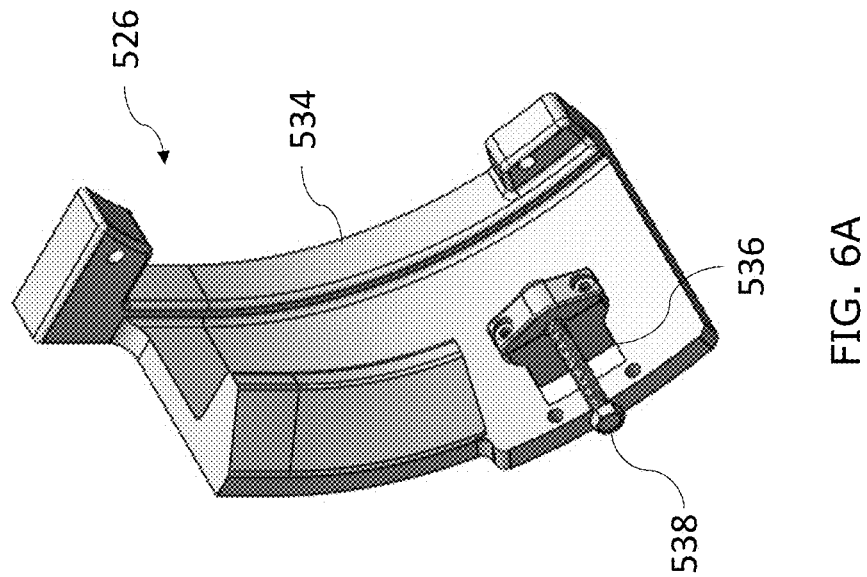
Figure 7B:
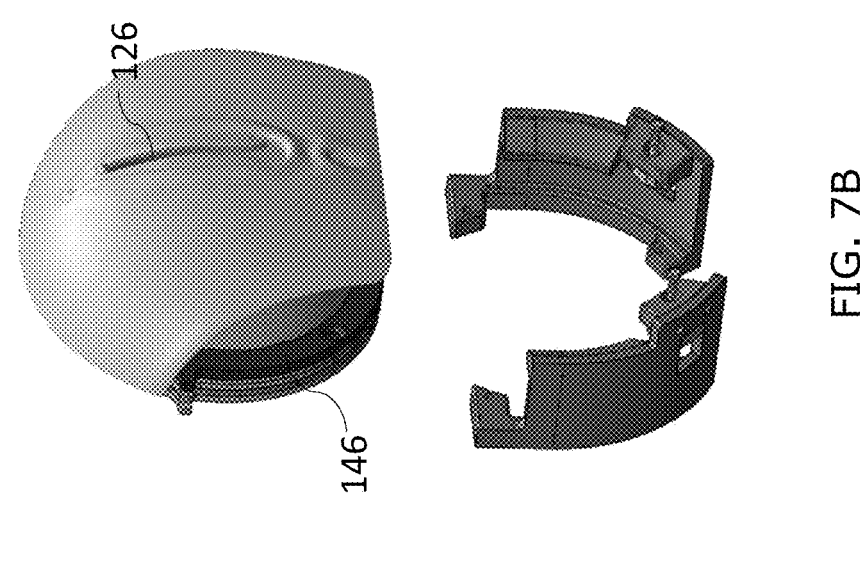
FIGS. 7A-7F depict components of the birth canal simulator.
Figure 7A:
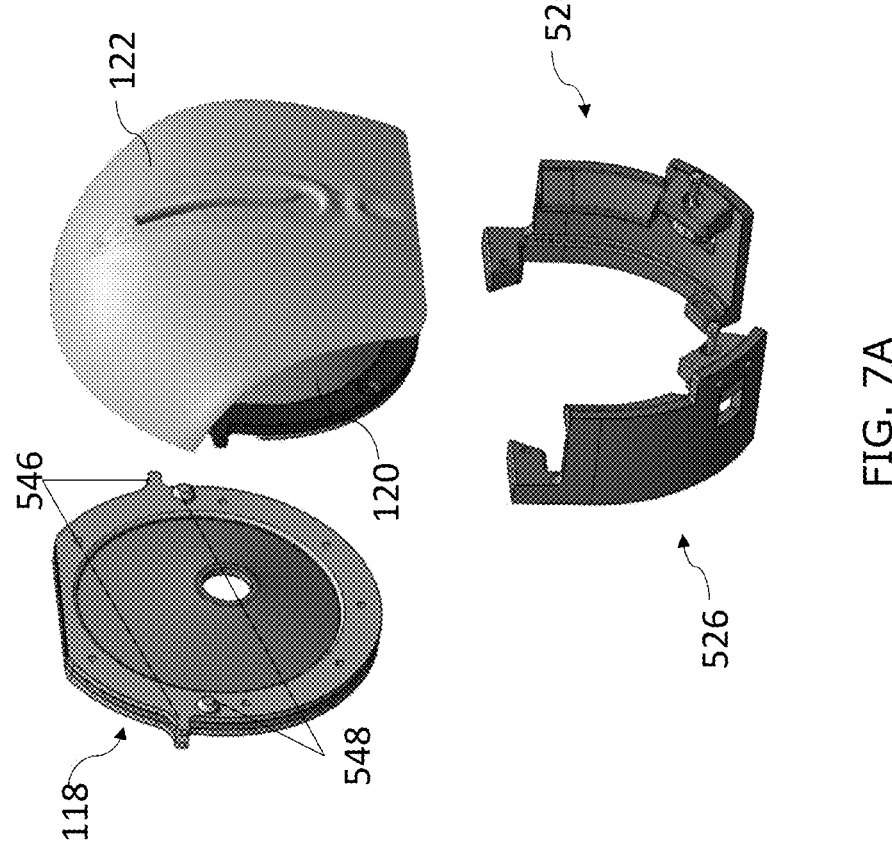

Referring now to FIGS. 6A-6B, the birth canal simulator 116 includes the vise assembly 526. The vise assembly 526 comprises a body 534 made of more durable or rigid material to provide support and/or a mounting structure for one or more components of the birth canal simulator 116. The body 534 has an arc-like shape and geometry, such that the body 534 may conform to a portion of one or more components of the birth canal simulator 116. For example, as shown in FIG. 7A (which will be discussed below), a pair of vise assemblies 526 having a pair of bodies 534 may extend circumferentially around one or more components of the birth canal simulator 116, such as the simulated cervix 118 and/or the simulated birth canal 120. The vise assembly 526 further includes a blocking surface 550 and an opening 536, which extends through an entire thickness of the vise assembly. Extending through the blocking surface 550 and the opening 536 is a fastening mechanism, such as screw 538, which defines a rotation axis. Moveable within the opening 536 is a fastening surface 540 which extends along a direction that is perpendicular to the rotation axis of the screw 538. The fastening surface 540 is further moveable between a locked state and an unlocked state. When the fastening surface 540 is in the unlocked state, the fastening surface 540 is positioned flush against blocking surface 550. Conversely, when the fastening surface is in the locked state, the fastening surface 540 is positioned away from the block surface 550 and moved toward the pelvic ring 146.

In operation, as illustrated in FIGS. 7A-7F, the vise assembly 526 is configured to attach the simulated cervix 118 to at least the simulated birth canal 120. As shown in FIG. 7A and as stated above, the birth canal simulator 116 comprises the simulated cervix 118, the simulated birth canal 120, and the vise assembly 526. As illustrated in FIG.

7B, the simulated cervix 118 is attached to the simulated birth canal 120 via the pelvic ring 146. The locating features 544 of the pelvic ring 146 and respective locating features 546 of the rings 132, 134 of the simulated cervix 118 are configured to facilitate this attachment. In particular, alignment of the locating features 544 and the locating features 546 allows for the securing features 548 positioned on ring 132 to be received by apertures 542 (FIG. 5C) of the simulated birth canal 120. Other suitable attachment mechanisms, such as for example, straps, hook-and-loop fasteners, anchors, adhesives, or double-sided tape, or combinations thereof will be known to one of ordinary skill in the art from the description herein.

Figure 7D:
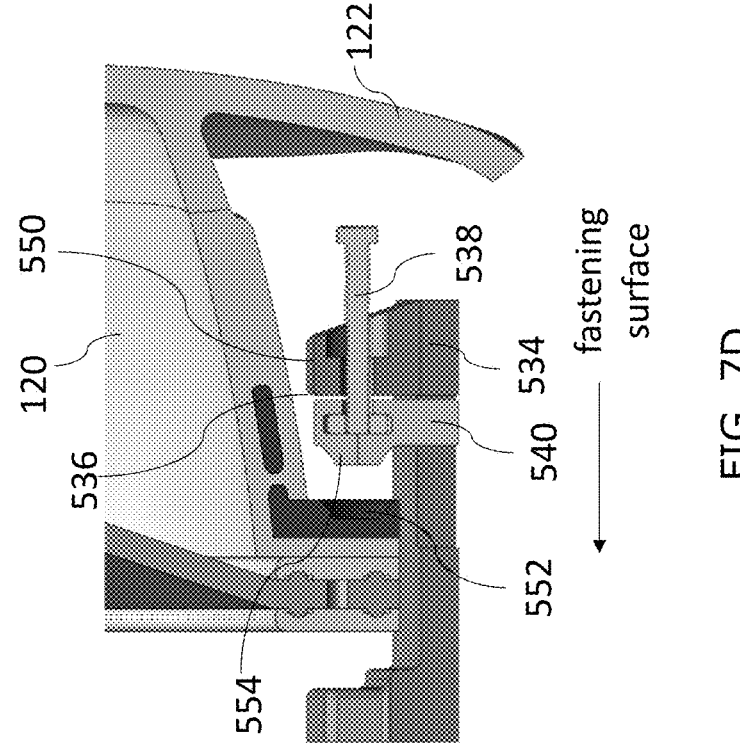
Figure 7C:
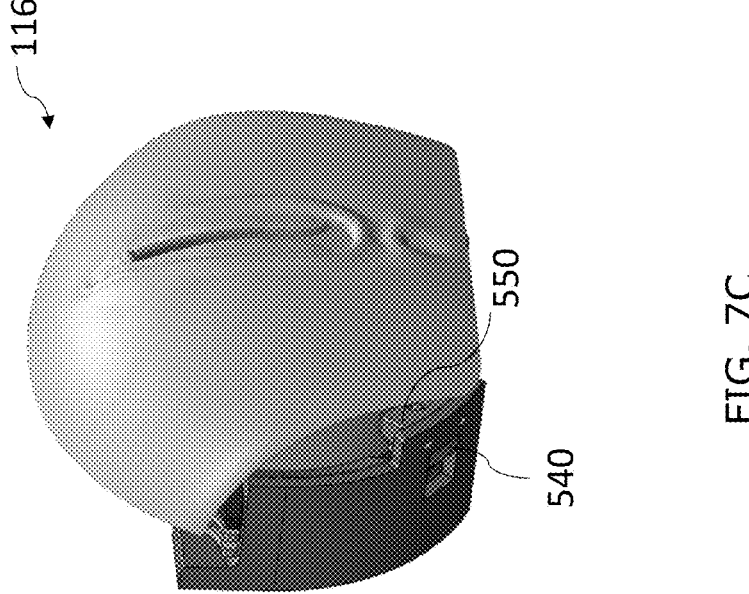
Figure 7F:
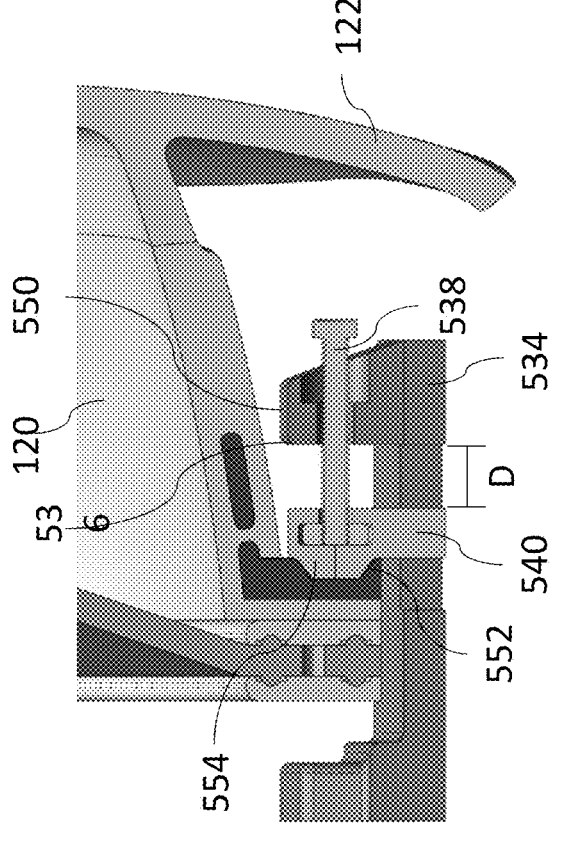
Figure 7E:
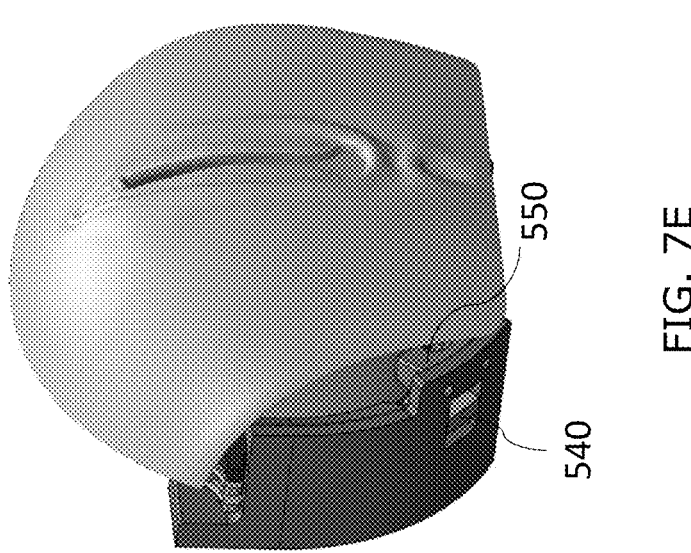

Turning now to FIGS. 7C-7F, the engagement between securing features 548 and the apertures 542 allows for the vise assembly 526 to secure the simulated cervix 118 and simulated birth canal 120 together. FIG. 7D, which is a cross-section view of a portion of the birth canal simulator 116 of FIG. 7C, illustrates the unlocked state of the fastening surface 540, wherein the fastening surface 540 is positioned flush against the blocking surface 550. In order to secure the simulated cervix 118 and the simulated birth canal 120 together, the fastening surface 540 is moved away from the blocking surface 550 by actuation of the screw 538. Actuation of the screw 538 pushes the fastening surface 540 toward the pelvic ring 146 until a mating portion 554 of the fastening surface 540 is received by a corresponding groove 552 of the pelvic ring 146. As shown in FIG. 7F, which is a cross-section view of a portion of the birth canal simulator 116 of FIG. 7E, the fastening surface 540 is in the locked state because the fastening surface 540 is moved for a distance (D) away from the blocking surface 550, or toward the groove 552 of the pelvic ring 146. When the fastening surface 540 is in the locked state, the simulated cervix 118 is secured to the simulated birth canal 120 by the vise assembly 526.

In yet another embodiment of the birth canal simulator 116, the birth canal simulator 116 includes similar components to that described above, but may differ in one or more of the following respects. For example, the birth canal simulator 116 comprises the simulated birth canal 120 and the simulated cervix 118, both of which are discussed in detail below.

The simulated cervix 118 is configured to be coupled to a portion of the uterus simulator 128 (FIG. 9), which is further discussed below. The simulated cervix 118 further comprises at least one ring 132/134 comprising durable or reinforced plastic material. One of the at least one ring 132 defines a groove and the other of the at least one ring 134 defines a pin or protrusion configured to be received by the groove. In this way, the silicone material of the simulated cervix 118 is secured by the at least one ring 132/134.

The simulated birth canal 120 is positionable adjacent to an opening defined by the top portion 112 and/or bottom portion 114 of the housing 102. Additionally or optionally, the simulated genitalia 122 may be positionable adjacent to the opening. Further, the simulated genitalia 122 may define an aperture 126 that corresponds to the opening. One of ordinary skill in the art would understand that the size and shape of the opening generally corresponds to the size and shape of the simulated genitalia 122, such that the size and shape of the opening may vary depending on the childbirth scenario to be simulated. Further, the simulated birth canal 120 comprises an elastic material, such as silicone. An exterior surface of the simulated birth canal 120 defines one or more connection points comprising plastic material.

Figure 9:
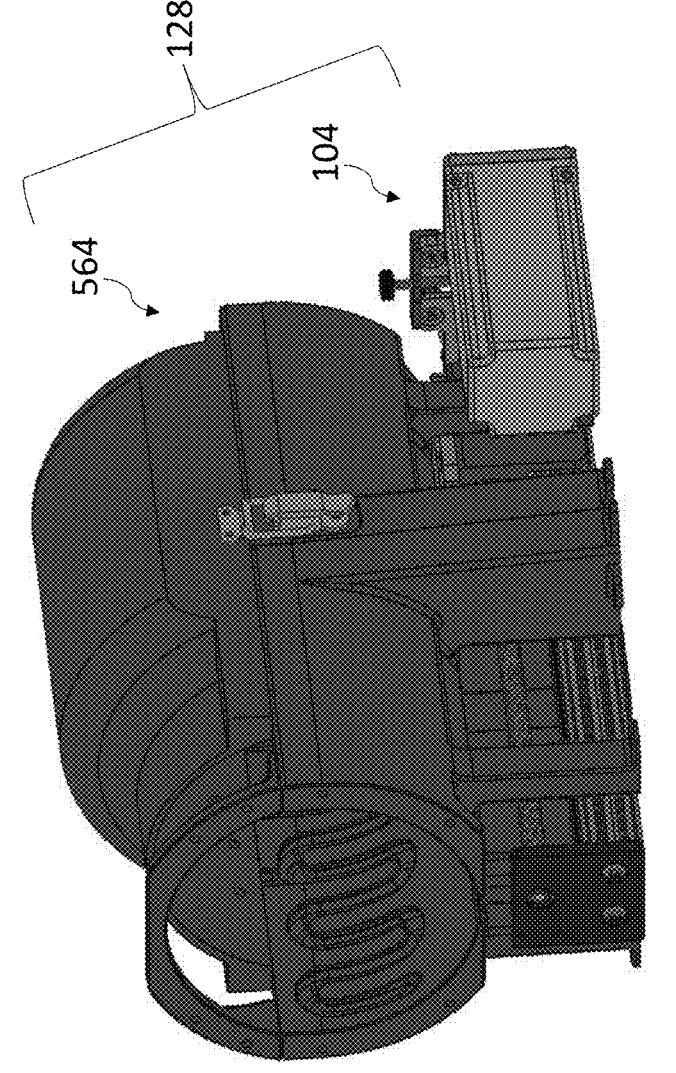
FIG. 9 depicts an exemplary uterus simulator.

The connection points are configured for attachment to the pelvic ring 146. The pelvic ring 146 may be a separate component from the simulated cervix 118 and the simulated birth canal 120, but one of ordinary skill in the art would understand from the description herein that the pelvic ring 146, the simulated cervix 118, and the simulated birth canal may optionally be integrally formed as a single body of unitary instruction. Further, the pelvic ring 146 may optionally be integrally formed with other components of the simulator 100, including but not limited to the uterus simulator 128 (FIG. 9).

The simulated cervix 118 and the simulated birth canal 120 are configured to be attached to one another via the pelvic ring 146. In particular, the simulated birth canal 120 is configured to receive the simulated cervix 118 within a cavity or space defined therein. The simulated birth canal 120 and the simulated cervix 118 may be attached, for example, by fastening mechanisms such as screws. More specifically, screws are configured to extend through one or more apertures defined by the at least one ring 132/134 of the simulated cervix 118, the pelvic ring 146, and the exterior surface of the simulated birth canal 120. Additionally or optionally, the screws may extend through one or more corresponding apertures defined by the elastic material of the simulated birth canal 120 and a plurality of securing features of the simulated birth canal 120. Other suitable attachment mechanisms, such as for example, straps, hook-and-loop fasteners, anchors, adhesives, or double-sided tape, or combinations thereof will be known to one of ordinary skill in the art from the description herein.

Figure 1D:
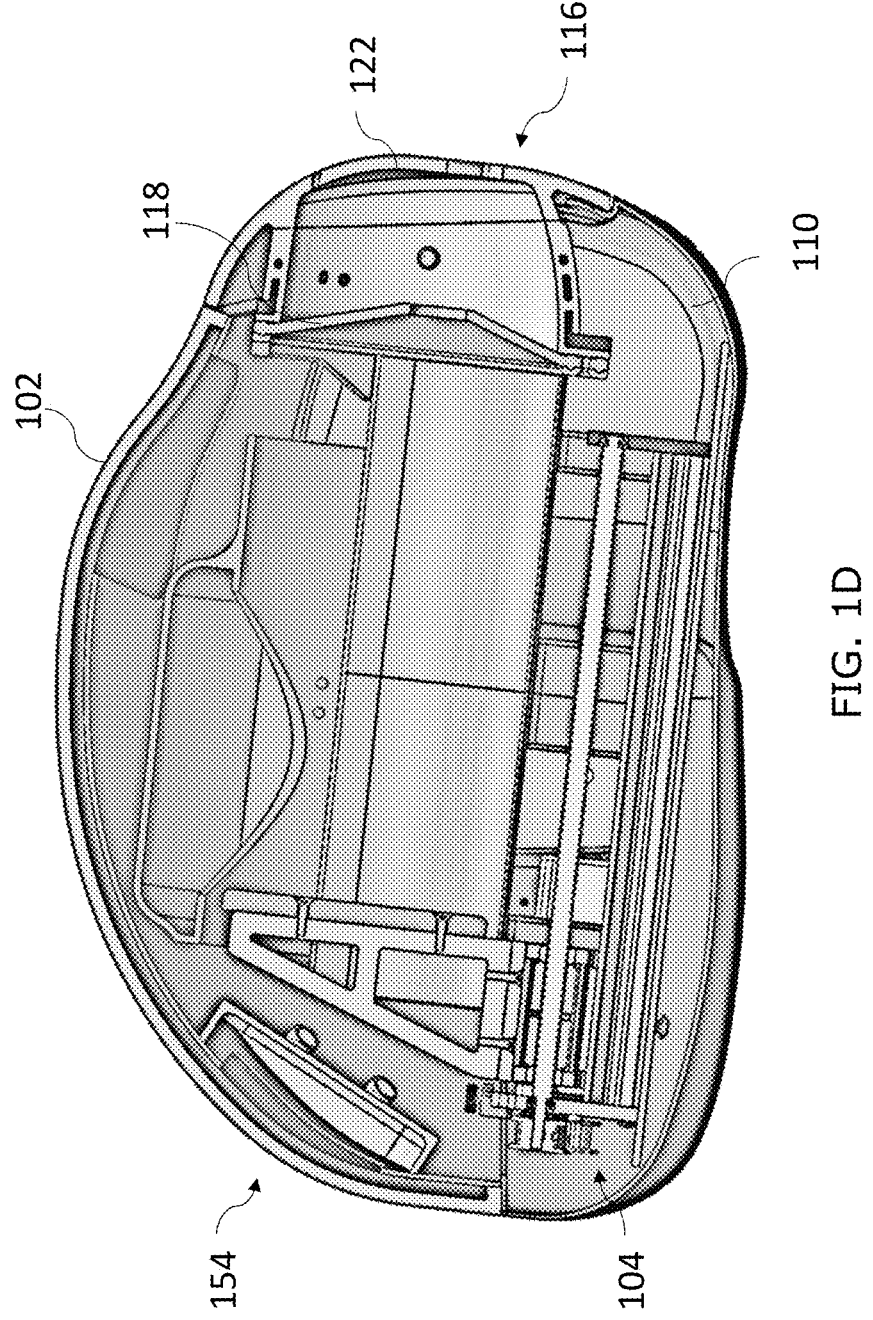
FIG. 1D is a cross-sectional view of the wearable birthing simulator.
Figure 8B:
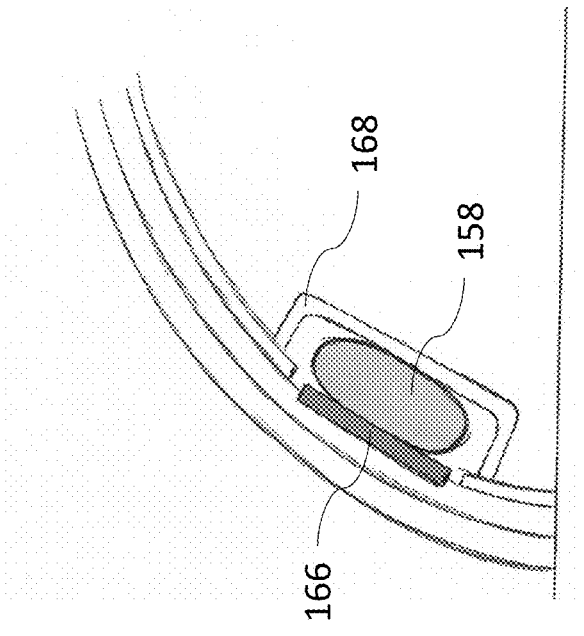
FIGS. 8A-8E depict an exemplary contraction simulator.
Figure 8A:
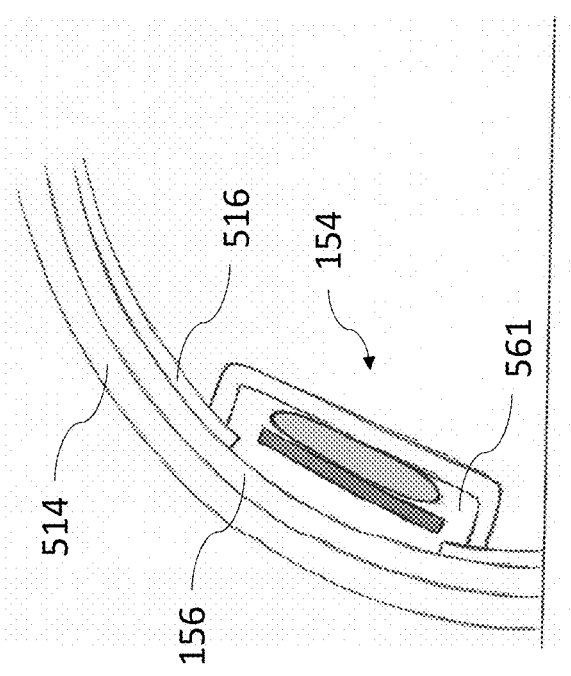

Referring now to FIGS. 1D and 8A-8E, the birthing simulator 100 comprises a device 154 configured for simulating uterine contractions during various stages of labor in a maternal patient. As seen in FIGS. 1D and 8A, the device 154 is positionable within the housing 102 and adjacent to the top portion 112 of the housing 102. As illustrated in FIGS. 8A-8B, the device 154 comprises a rigid platform layer 166 configured to generate a tactile difference perceptible through human touch of an outer surface or overlay 514 (FIG. 1C) of the top portion 112 of the housing 102. The tactile difference is intended to indicate to the care provider that the subject is experiencing a simulated labor contraction. The tactile difference is perceptible to the care provider when overlay 514 or the outer surface of the top portion 112 of the housing 102 is palpated, for example.

The perceptibility of this tactile difference is facilitated by an inflatable bag 158 disposed underneath the platform layer 166. The inflatable bag 158 has an inflated state and a deflated state. A pump 160 (FIG. 8C) facilitates the movement of the inflatable bag 158 between the inflated and deflated states. Although FIG. 8C illustrates that the pump 160 is connected to the inflatable bag 158 positioned within the housing 102 via at least one port 556 defined in the top portion 112 for manual operation by the maternal subject, it would be understood from the description herein that other structures may be utilized in connection with the inflatable bag 158 to cause the inflatable bag 158 to move between the inflated and deflated states. Additionally, pump 160 may be positioned interior of the housing 102, for automatic or electronic operation.

In operation, when the inflatable bag 158 is in the inflated state (FIG. 8B), the inflatable bag 158 expands, thereby causing the platform layer 166 to be pressed against overlay 514 itself and/or a foam layer 156 underlying the overlay 514, forming a relatively more rigid section of the top portion 112 that can be palpated to indicate a labor contraction to the care provider. Conversely, when the inflatable bag 158 is in the deflated state (FIG. 8A), the platform layer 166 is positioned away from the foam layer 156, such that the platform layer 166 is therefore not perceptible through the overlay 514 of the housing 102.

Figure 8D:
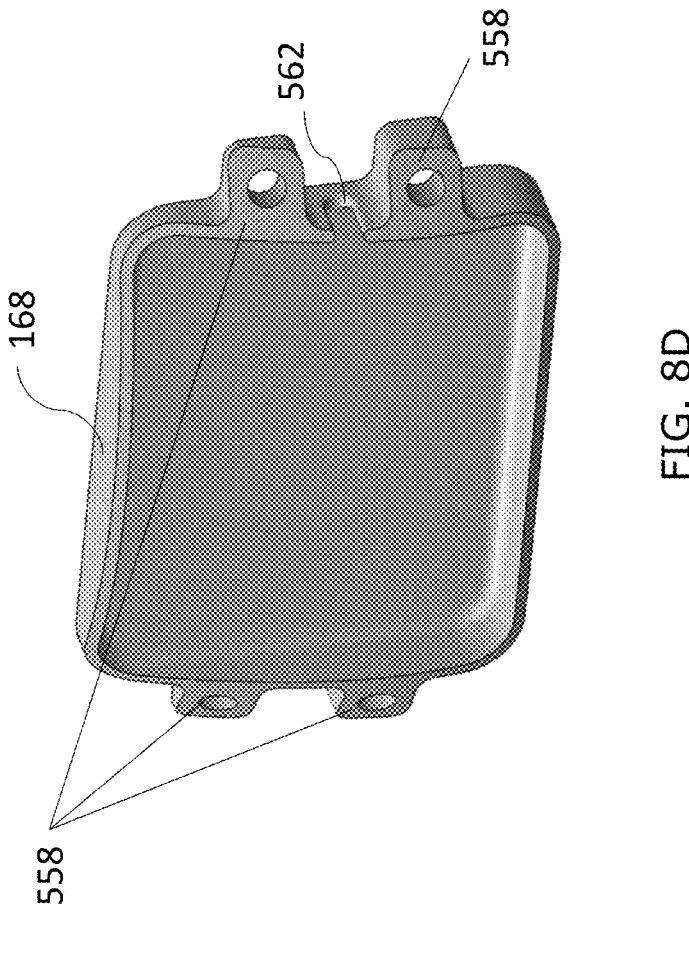
Figure 8C:
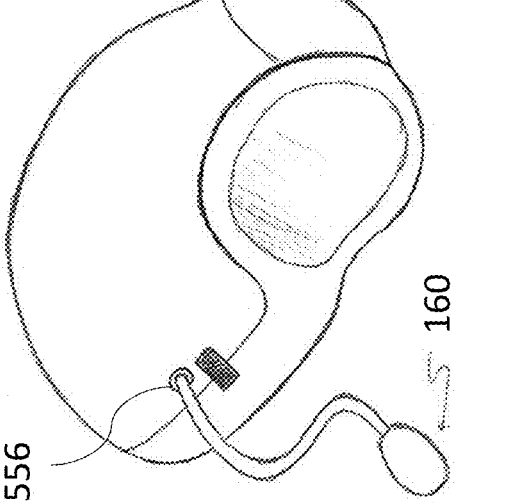
Figure 8E:
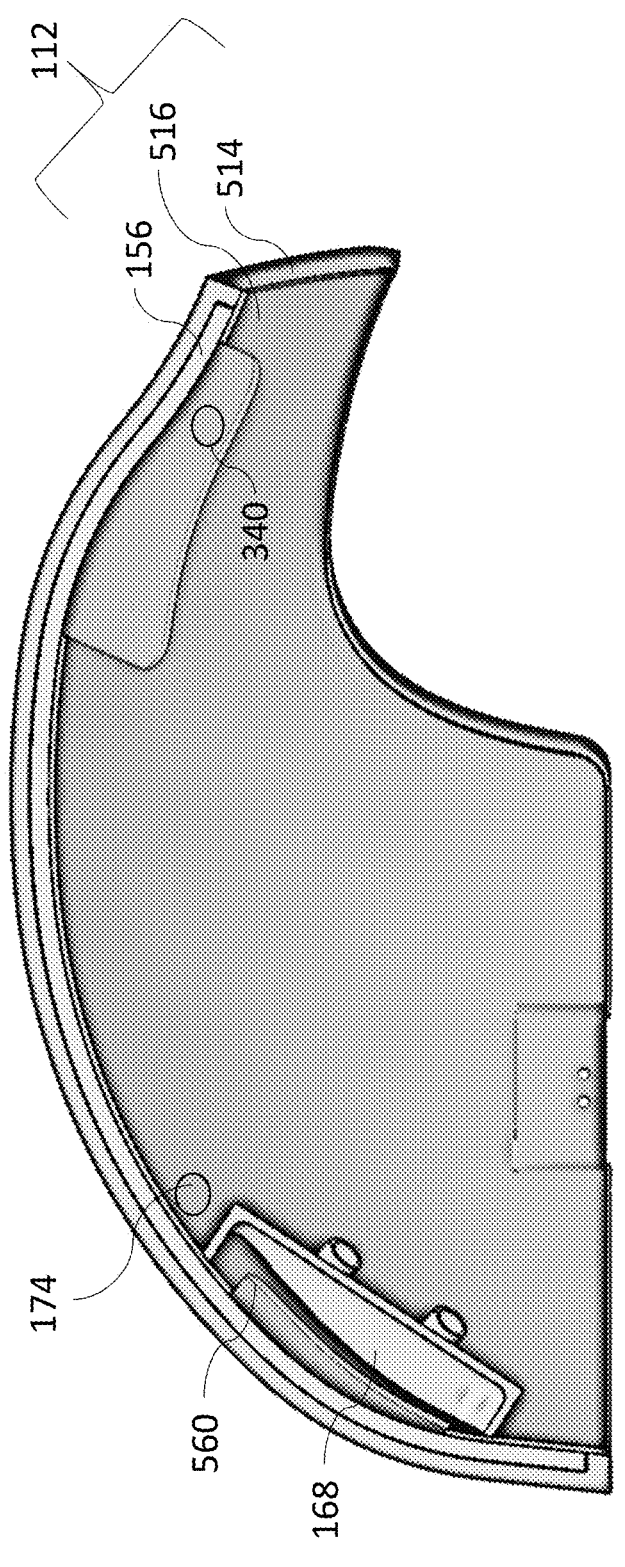

As seen in FIGS. 8D-8E, the rigid platform layer 166 and the inflatable bag 158 are positioned on or against a plate 168. In one non-limiting example, the plate 168 comprises plastic material. The plate 168 includes a plurality of connection points 558 disposed around a perimeter of the plate 168 for attaching the plate 168 to the rigid material 516 of the top portion 112. Further, as shown in FIGS. 1D and 8E, the rigid material 516 of the top portion 112 includes a pocket 561 when the plate 168 is attached to the rigid material 516 (FIG. 8A). One or more components of the contraction device 154, such as the inflatable bag 158 and platform layer 166, may be disposed within the pocket 561. This configuration desirably allows for the separation of the device 154 from one or more components of the simulator 100, such as the birthing device 104. In this way the contraction device 154 may be protected as the fetal model 106 is moved through the uterus simulator 128 by the birthing device 104. The plate 168 may also define a groove 562, through which a tube for connecting the inflatable bag 158 to the pump 160 may extend. Finally, according to a childbirth scenario involving post-partum hemorrhaging (PPH), a simulated fundus 340 may be disposed within housing 102 and adjacent the birth canal simulator 116. In particular, the simulated fundus 340 may be disposed beneath foam layer 156 (FIG. 8E). One would understand from the description herein that placement of simulated fundus 340 as illustrated in FIG. 8E is not intended to be limiting, such that simulated fundus 340 may be positioned in another location (different from what is shown) within housing 102 and adjacent birth canal simulator 116.

In another embodiment of the device 154, configured for simulating uterine contraction, the device 154 includes similar components to that described above, but may differ in one or more of the following respects. For example, the device 154 comprises a foam layer configured to generate a tactile difference perceptible through human touch of the outer surface or layer of the top portion 112 of the housing 102. The perceptibility of this tactile difference is facilitated by the inflatable bag 158 disposed underneath the foam layer. The inflatable bag 158 has an inflated state and a deflated state. The pump 160 facilitates the movement of the inflatable bag 158 between the inflated and deflated states. The inflatable bag 158 may be connected to the pump 160, but it would be understood from the description herein that other structures may be utilized in connection with the inflatable bag 158 to cause the inflatable bag 158 to move between the inflated and deflated states. Additionally, pump 160 may be positioned interior of the housing 102, for automatic or electronic operation.

In operation, when the inflatable bag 158 is in the inflated state, the inflatable bag 158 expands, thereby causing the foam layer to extend through an opening defined by a rigid plastic layer disposed over the foam layer. Disposed over the rigid plastic layer is another foam layer having an opening that corresponds to the size and shape of at least one of the foam layer and the opening. During inflation, the foam layer extends through the respective openings and is pressed against the inner surface of top portion 112, forming a relative more rigid section that can be palpated to simulate a labor contraction. Conversely, when the inflatable bag 158 is in the deflated state, the foam layer does not extend through the respective openings and the foam layer is therefore not perceptible through the outer layer or surface of the housing 102. Another rigid platform layer may be disposed between the foam layer and the inflatable bag 158. The inflatable bag 158 may also be positioned on a plastic layer configured to provide support for one or more components of the device 154 and desirably allows for the separation of the device 154 from one or more moveable components of the simulator 100, such as the birthing device 104.

The embodiment described in FIGS. 1D and 8A-8E is generally similar to the birthing simulator 100 described in FIGS. 26A-26D, which additionally or optionally includes a boggy uterus simulator 700. One would understand from the description herein that placement of boggy uterus simulator 700 as illustrated in FIGS. 26A-26D is not intended to be limiting, such that boggy uterus simulator 700 may be positioned in another location (different from what is shown) within housing 102 and adjacent birth canal simulator 116. As used herein and throughout the specification, "boggy uterus" refers to a hypotonic uterus, which is an obstetrical condition that may cause postpartum infection and PPH.

Figure 26A:

As illustrated in FIGS. 26A-26D, an inflatable bag 1158 is positioned on or against a plate 1168. In one non-limiting example, the plate 1168 comprises plastic material. The plate 1168 includes a plurality of connection points 1558 disposed around a perimeter of the plate 1168 for attaching the plate 1168 to the rigid material 516 of the top portion 112. Further, as shown in FIG. 26A, the plate 1168 forms a pocket 1561 when the plate 1168 is attached to the rigid material 516 of top portion 112. One or more components of the boggy uterus simulator 700, such as the inflatable bag 1158, may be disposed within the pocket 1561. This configuration desirably allows for the separation of the boggy uterus simulator 700 from one or more components of the simulator 100, such as the birthing device 104. In this way, the boggy uterus simulator 700 may be protected as the fetal model 106 is moved through the uterus simulator 128 by the birthing device 104. The plate 1168 may also define a groove 1562, through which a tube for connecting the inflatable bag 1158 to a pump may extend (discussed below).

According to a childbirth scenario involving PPH, the inflatable bag 1158 may be disposed beneath foam layer 156 (FIGS. 26C-26D) in order to generate a tactile difference perceptible through human touch of an outer surface or overlay 514 of the top portion 112 of the housing 102. The tactile difference is intended to indicate to the care provider that the subject 108 has a certain simulated condition, such as a firm uterus or a boggy uterus. The tactile difference is perceptible to the care provider when overlay 514 or the outer surface of the top portion 112 of the housing 102 is palpated, for example.

To facilitate the perceptibility of this tactile difference, the inflatable bag 1158 has an inflated state and a deflated state. A pump facilitates the movement of the inflatable bag 1158 between the inflated and deflated states. The pump for inflatable bag 1158 may be connected in a similar manner as pump 160 is connected to the inflatable bag 158 described above. The pump may be configured for manual operation by the subject 108, and/or other structures may be utilized in connection with the inflatable bag 1158 to cause the inflatable bag 1158 to move between the inflated and deflated states. Additionally, the pump may be positioned interior of the housing 102, for automatic or electronic operation.

In operation, when the inflatable bag 1158 is in the inflated state (FIG. 26D), the inflatable bag 1158 expands, thereby causing the inflatable bag 1158 to be pressed against overlay 514 itself and/or a foam layer 156 underlying the overlay 514, thereby forming a relatively more firm or rigid section of the top portion 112 that can be palpated to indicate a firm uterus. Conversely, when the inflatable bag 1158 is in the deflated state (FIG. 26C), the inflatable bag 1158 is positioned away from the foam layer 156, such that the inflatable bag 1158 is not perceptible through the overlay 514 of the housing 102. In this way, a boggy uterus condition may be simulated when the inflatable bag 1158 is in the deflated state.

As shown in FIG. 1B, a feedback device 178 may be secured to the subject 108 or optionally, may be coupled to the simulator 100. The feedback device 178 may be positioned in a location where feedback can be provided discretely to the subject 108 wearing the birthing simulator 100. The feedback device 178 is configured to provide haptic (e.g. vibration) feedback to the maternal subject 108.

Haptic feedback may be provided to the subject 108 via the feedback device 178, using one or more actuator or vibrating motors provided on a band of the feedback device 178, which is disposed in contact with the maternal subject 108 (as shown in FIG. 1B). In an exemplary embodiment, a portion (e.g. the band) of the feedback device 178 includes a wireless transceiver configured to transmit/receive wireless signals to/from an external device 332 (FIG. 17) via a network communication interface for communication over a network (e.g. WiFi or Bluetooth®). The band may be worn by subject 108 and the care provider, and may provide visual or tactile feedback indicative of a simulated labor contraction. Further, the type of haptic feedback provided by the band may correspond to various stages of labor based on the frequency, duration, and intensity of uterine contractions. In a non-limiting example, pulsed vibrations or feedback may indicate regular, longer, and/or stronger contractions whereas steady vibrations or feedback may indicate less regular, shorter, and/or weaker contractions. Additionally or optionally, the band of the feedback device 178 comprise visual indicators, at least one light emitting diode (LED), corresponding to predefined behaviors or medical conditions to be simulated or performed by subject 108 and/or care provider (e.g. fainting or passing out).

Suitable haptic feedback generators for use as feedback device 178 would be known from the description herein. Feedback device 178 may alternatively or additionally be configured to provide other types of feedback, such as auditory feedback and visual (e.g. LED) feedback. In operation, feedback device 178 receives and processes signals that are wirelessly received from an external device 332 (FIG. 17), which may be controlled by an instructor or a professional that is different from the care provider.

The feedback device 178 may preferably be positioned separately from the contraction device 154, with sufficient separation that the haptic feedback is not transmitted to the treatment provider, who may be performing uterine palpations during a simulated childbirth scenario, such that the treatment provider cannot sense that haptic feedback has been provided to the subject 108. In some examples, feedback device 178 may be positioned on or within a strap used to secure simulator 100 to the subject 108 (e.g. strap 502 illustrated in FIGS. 18A-18B).

In one example operation, a vibratory actuator used as feedback device 178 creates haptic feedback or vibration that can be felt by the subject 108 during the simulated childbirth scenario. Specifically, when the fetal model 106 is at a predetermined location within the housing 102 relative to the birth canal simulator 116, the instructor controls and activates the actuator 178 to provide haptic feedback to the subject 108 to provide realistic feedback based on the position of the fetal model 106 relative to the birth canal simulator 116. In one example, haptic feedback may indicate to the subject 108 to perform one or more predetermined actions or behavioral patterns that would be expected of a maternal patient undergoing a simulated contraction during labor and delivery. Additionally or optionally, the feedback device 178 creates haptic feedback or vibration that can be felt by another person who is in close proximity to the subject 108 during the simulated childbirth scenario, such as a support person who can provide cues or instructions to subject 108 to perform one or more predetermined actions or behavioral patterns (e.g. react in pain).

Additionally or optionally, the feedback device 178 is activated to provide haptic feedback to the subject 108 when the inflatable bag 158 is in the inflated state to indicate a simulated labor contraction, such that the subject 108 can provide realistic feedback during the simulated labor contraction. In one example, a simulated labor contraction may be indicated to a care provider by subject 108 activating a pump connected to the inflatable bag 158, such as an automatic pump, thereby moving the inflatable bag 158 toward the inflated state (i.e. indicate simulated labor contraction). During this operation of the automatic pump, feedback device 178 may be simultaneously activated to provide haptic feedback to the subject 108 for providing realistic feedback during the simulated labor contraction. In another example, haptic feedback may be adapted to discreetly provide instructions to subject 108, such as for subject 108 to manually inflate the inflatable bag 158 to the inflated state (i.e. indicate simulated labor contraction). Simultaneously, the fetal model 106 can be moved relative to the birth canal simulator 116 and toward delivery outside the housing 102.

In some alternative embodiments, the contraction device 154 may rely on manual action of the maternal subject 108 to indicate contractions. In these embodiments, the feedback device 178 may be activated to provide haptic feedback to the subject 108, the haptic feedback being adapted to indicate a simulated labor contraction to the subject 108 as well as instruct the subject 108 to manually inflate the inflatable bag 158 using pump 160, such as a hand pump, for presenting the simulated labor contraction to the care provider. Alternatively, the feedback device 178 may be activated to provide haptic feedback to another person who is in close proximity to the subject 108 during the simulated childbirth scenario, such as the support person who can manually inflate the inflatable bag 158 using pump 160 and provide cues/instructions to subject 108 for presenting the simulated labor contraction to the care provider.

The feedback device 178 may also be configured to provide visual feedback to the maternal subject 108. Visual feedback may be provided to the subject 108 via one or more light emitting diodes (LED) of various colors of the feedback device 178, which is disposed in contact with the maternal subject 108 (as shown in FIG. 1B). Each LED color may correspond to various stages of labor based on the frequency, duration, and intensity of uterine contractions. Additionally or optionally, each LED color may correspond to predefined behaviors or medical conditions to be simulated or performed by subject 108 and/or care provider. Similarly, the type of haptic feedback (e.g., pulsed or steady feedback, or predetermined series or sequence of pulses as feedback) may also correspond to various stages of labor based on the frequency, duration, and intensity of uterine contractions. In a non-limiting example, pulsed vibrations or feedback may indicate regular, longer, and/or stronger contractions whereas steady vibrations or feedback may indicate less regular, shorter, and/or weaker contractions.

In yet another embodiment of the feedback device 178, the feedback device 178 includes similar components to that described above, but may differ in one or more of the following respects. For example, the feedback device 178 may be disposed adjacent to the top portion 112 of the housing 102 or may be worn by the subject on a separate structure, such as on the user's torso or arms. In one example operation, a vibratory actuator used as feedback device 178 creates haptic feedback or vibration that can be felt by the subject 108 during the simulated childbirth scenario. Specifically, when the fetal model 106 is detected at a predetermined location within the housing 102 relative to the birth canal simulator 116, controller 176 controls actuator 178 to provide haptic feedback to the subject 108 to provide realistic feedback based on the position of the fetal model 106 relative to the birth canal simulator 116. Additionally or optionally, controller 176 communicates with and sends an instruction or signal to external device 332 (FIG. 17), which in turn activates or controls actuator 178. The position of the fetal model 106 may be optionally detected by one or more sensors (e.g. encoder, position sensors, movement sensors, force or pressure sensors, or other known types of sensor) disposed within the housing 102 and adjacent the uterus simulator 128.

Additionally or optionally, a controller 176, which is in communication the feedback device 178 and with one or more sensors, may facilitate operation of the feedback device 178. Controller 176 may store (e.g. in an associated memory) one or more items of information related to the size and shape of the fetal model 106 for use in controlling a feedback element, such as feedback device 178. Controller 176 processes the information detected by one or more sensors and sends signals to operate feedback device 178 to provide feedback to the subject 108 wearing simulator 100. In one example, when the fetal model 106 is detected at a predetermined location relative to the birth canal simulator 116, the controller 176 sends signals to feedback device 178 to provide feedback to the subject 108 wearing simulator 100. Additionally or optionally, the controller 176 is configured to activate the feedback device 178 to provide haptic feedback to the subject 108 when the inflatable bag 158 is in the inflated state to indicate a simulated labor contraction. Specifically, the controller 176 may be configured to indicate a simulated labor contraction to a care provider by activating the pump 160 connected to the inflatable bag 158, such as an automatic pump, thereby moving the inflatable bag 158 toward the inflated state. During this operation, controller 176 may simultaneously send a signal to activate the feedback device 178 to provide haptic feedback to the subject 108 for providing realistic feedback during the simulated labor contraction. Controller 176 may further send signals for operating the birthing device 104 to simulate the birthing process according to a predefined algorithm programmed in controller 176 or an associated memory.

In some alternative embodiments, the contraction device 154 may rely on manual action of the maternal subject to indicate contractions. In these embodiments, the controller 176 may be configured to activate the feedback device 178 to provide haptic feedback to the subject 108, the haptic feedback being adapted to indicate a simulated labor contraction to the subject 108 as well as instruct the subject 108 to manually inflate the inflatable bag 158 using pump 160, such as a hand pump, for presenting the simulated labor contraction to the care provider.

Controller 176 may employ a single feedback signal (e.g., based on a single position of the fetal model 106 relative to the birth canal simulator 116), or may utilize multiple signals, each associated with a different position of the fetal model 106 relative to the birth canal simulator 116 and/or a different simulated condition (such as a simulated labor contraction). When multiple signals are used, each signal being of a different type of feedback signal (e.g., pulsed or steady feedback, or predetermined series or sequence of pulses as feedback). In the example comprising multiple signals, the signals may also indicate various stages of labor based on the frequency, duration, and intensity of uterine contractions.

Figure 10A:
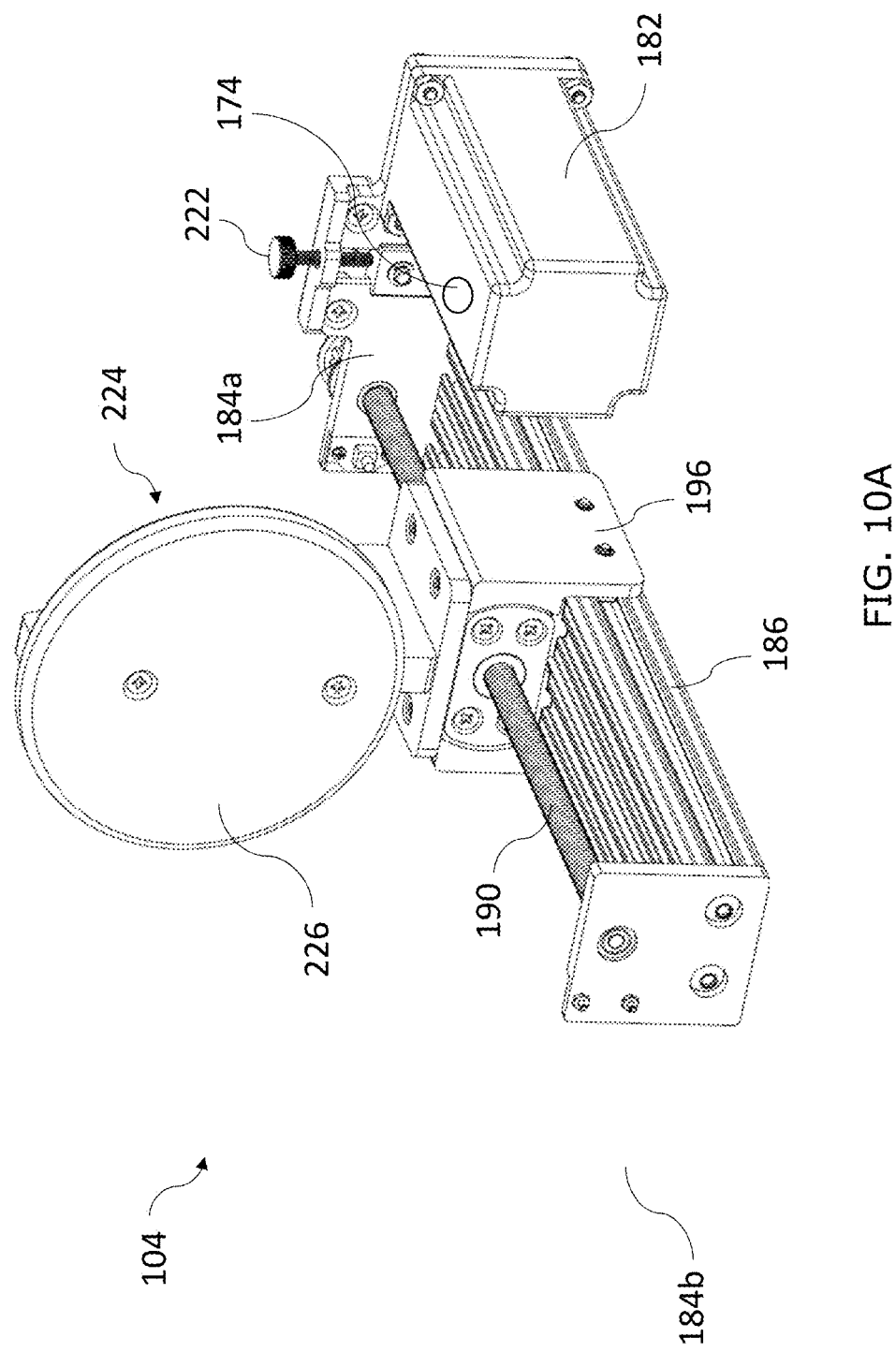
FIG. 10A-10D depict an exemplary birthing device of the uterus simulator.

One or more sensors 174 are disposed within the housing 102 and configured to be positionable adjacent to the uterus simulator 128 (further discussed below). One or more sensors 174 detect movement of the fetal model 106 within the housing 102. Specifically, one or more sensors 174 detect movement of the fetal model 106 by the birthing device 104 during a simulated childbirth scenario. In an exemplary embodiment, one or more sensors 174 comprise a motor encoder mounted to motor 182 (as illustrated in FIG. 10A) and configured to track the speed and/or position of a motor shaft to determine position of the fetal model 106. Additionally or optionally, one or more sensors 174 comprise time of flight (ToF) sensor(s) mounted in a location opposite (or away from) birth canal simulator 116 (as shown in FIG. 8E) and configured to measure distances using the time that it takes for photons to travel between two points. One skilled in the art would understand from the description herein that the locations of one or more sensors 174, as illustrated in FIGS. 10A and 8E, are not intended to be limiting. One or more sensors 174 may be positioned within housing 102 in order to determine position of fetal model 106 during a simulated childbirth scenario.

In an alternative embodiment, the one or more sensors 174 includes a proximity sensor electrically connected to a controller 176 and configured to detect the presence of the fetal model 106 in a predetermined location within the housing 102. Sensors 174 may be position sensors, movement sensors, force or pressure sensors, or any other known type of sensor. The locations of the one or more sensors 174 may be disposed in one or more predetermined locations within the housing 102, depending on a location of one or more components of simulator 100, e.g. fetal model 106. Suitable proximity sensors 174 for use as described above will be readily known or identifiable from the description herein. It will be understood that any combination of sensors may be used, and that additional types and locations of sensors may be used, without departing from the scope of the invention. Other possible sensors for use in simulator 100 would be known to one of ordinary skill in the art from the description herein.

Turning now to FIG. 9, the uterus simulator 128 is disclosed. The uterus simulator 128 comprises a tube assembly 564 and a birthing device 104, both of which are disposed within housing 102. A portion of the uterus simulator 128 may be coupled to the simulated cervix 118 of the birth canal simulator 116, such that the simulated cervix 118 may be removable relative to the uterus simulator 128 and/or the housing 102. Individual components of the tube assembly 564 and the birthing device 104 will now be discussed below.

Referring now to FIGS. 10A-10D, the birthing device 104 is configured to move the fetal model 106 towards the birth canal simulator 116. The birthing device 104 comprises an actuator assembly 180 in communication with the controller 176 for automatically moving the fetal model 106 towards the birth canal simulator 116. Controller 176 may store (e.g. in an associated memory) one or more items of information or algorithms related to the components of the actuator assembly 180 for controlling one or more components of the actuator assembly 180. In one example, controller 176 controls the activation of a motor 182 to cause one or more components of the actuator assembly 180 to move relative to the tube assembly 564 (further discussed below).

Figure 10B:
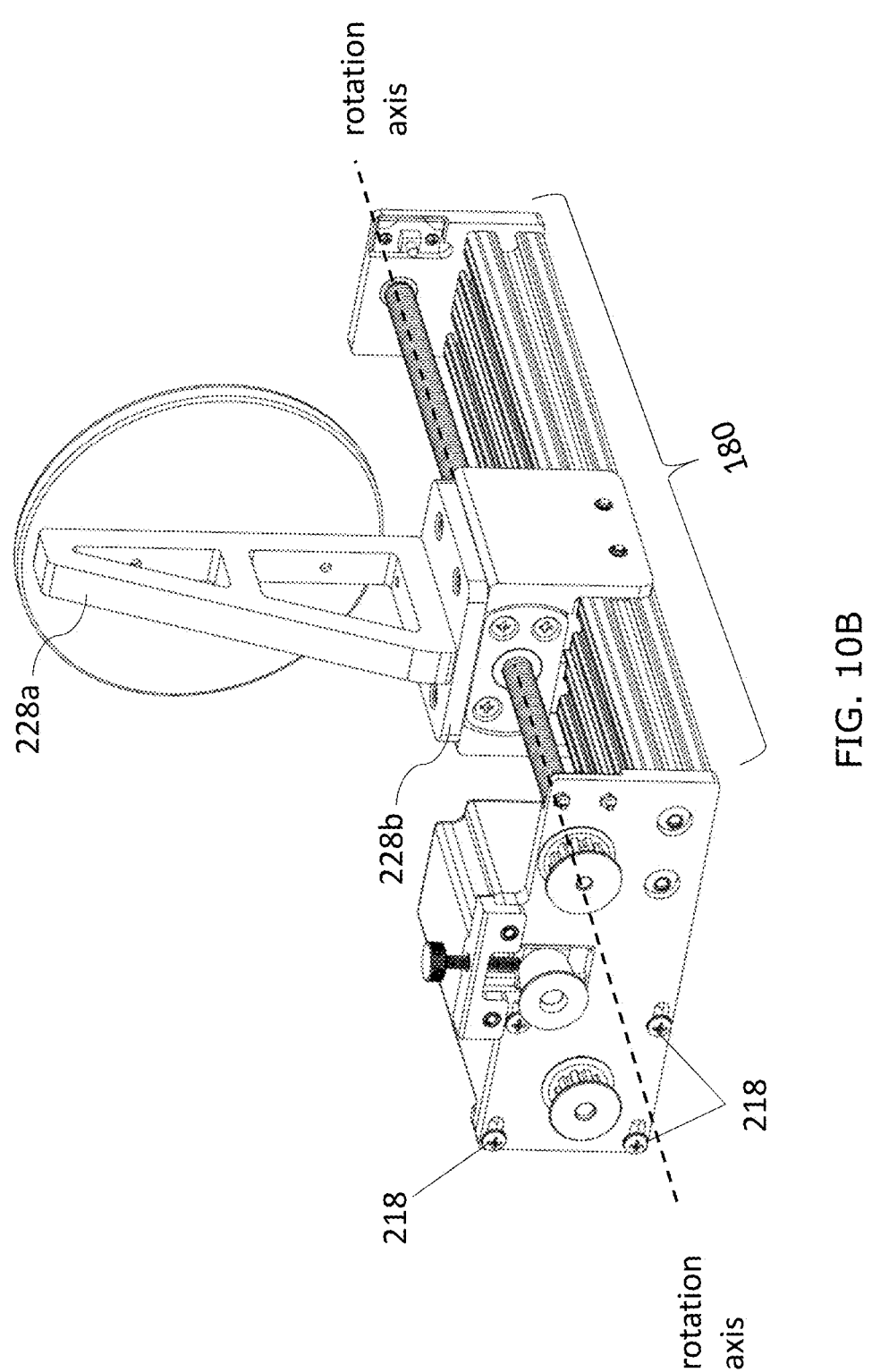
Figure 10C:
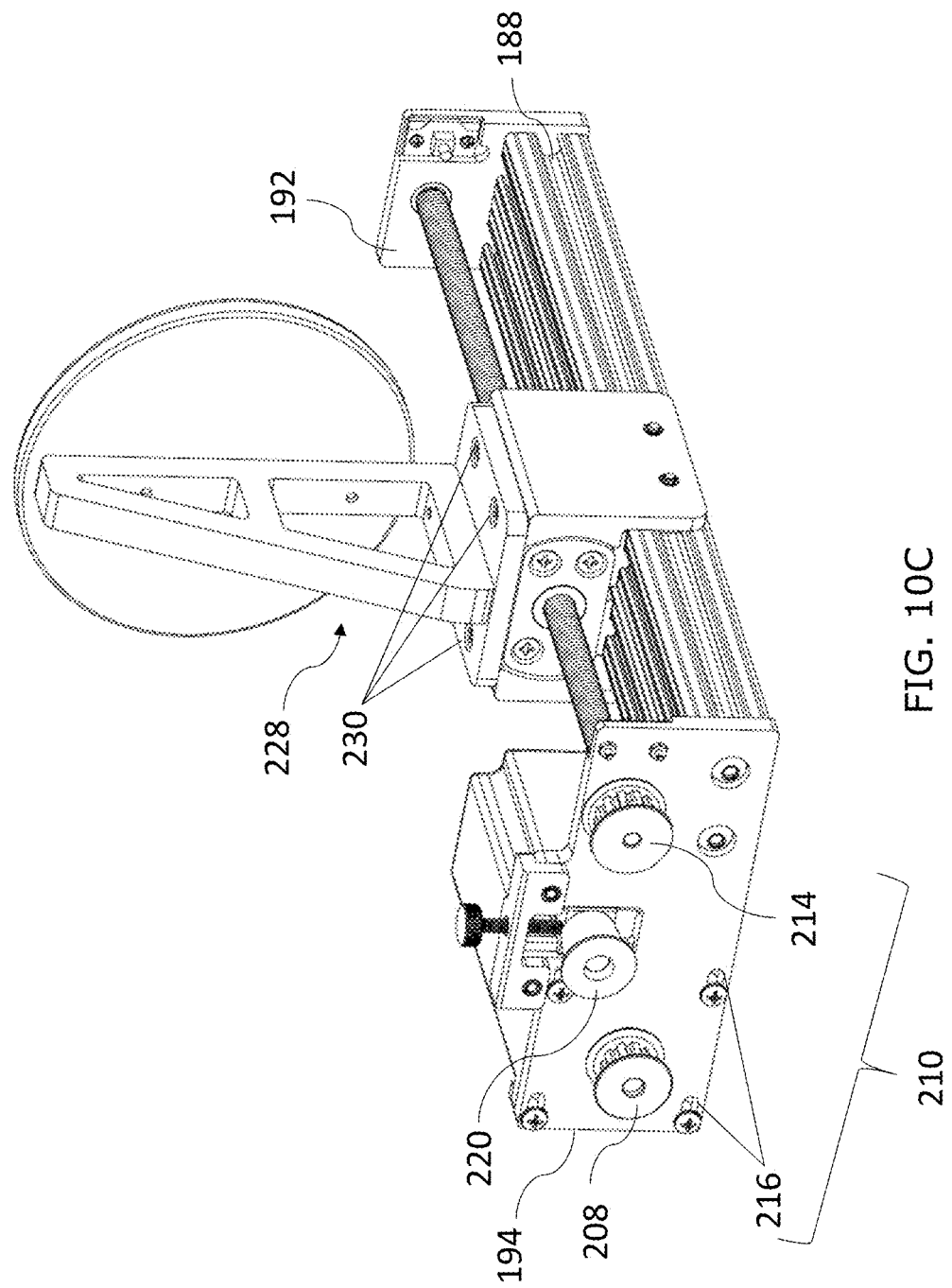

The actuator assembly 180 comprises a frame 184 positioned within the housing 102. As seen in FIG. 10C, the frame 184 comprises a first plate 192 disposed at one end and a second plate 194 disposed at an opposite end relative to the first plate 192. The first plate 192 and second plate 194 may be integrally formed as a single body of unitary construction, or may be separate components configured to be attached by known attachment mechanisms. In an example, the frame 184 is configured to be disposed within the housing 102 and secured adjacent the bottom portion 114 of the housing 102. Additionally or optionally, the actuator assembly 180 and the housing 102 may be integrally formed as a single body of unitary construction. Mounted to the frame 184 is at least one guide rail 186, preferably two parallel guide rails, each having grooves 188 (FIG. 10C) and an actuator 190, such as a linear actuator. The actuator 190 extends along a rotation axis (FIG. 10B) that is parallel to the at least one guide rail 186. In particular, the at least one guide rail 186 and the linear actuator 190 are disposed between the first plate 192 and second plate 194. Preferably, the at least one guide rail 186 comprises an 80/20 aluminum extrusion material.

Figure 10D:
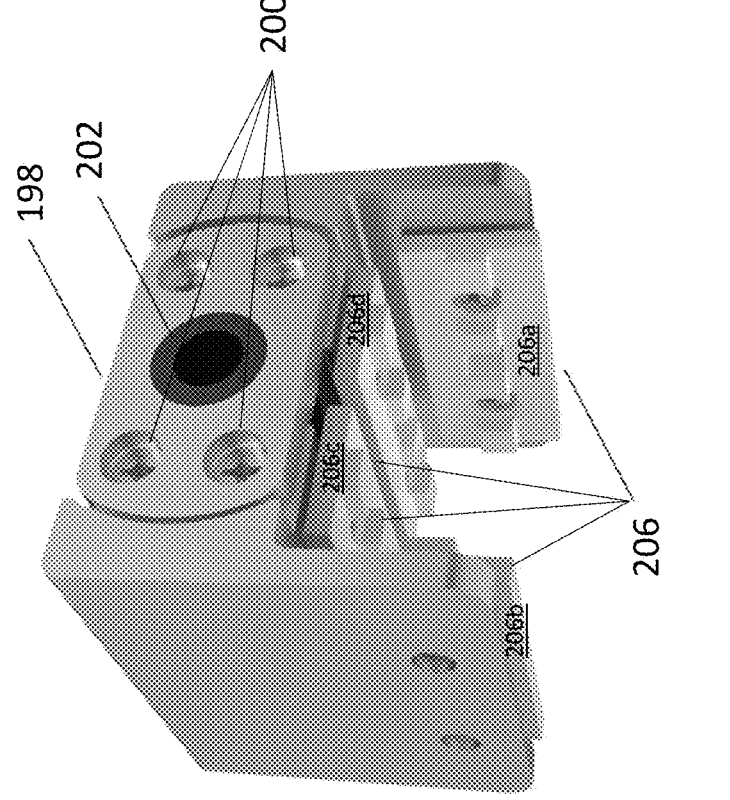
Figure 11A:
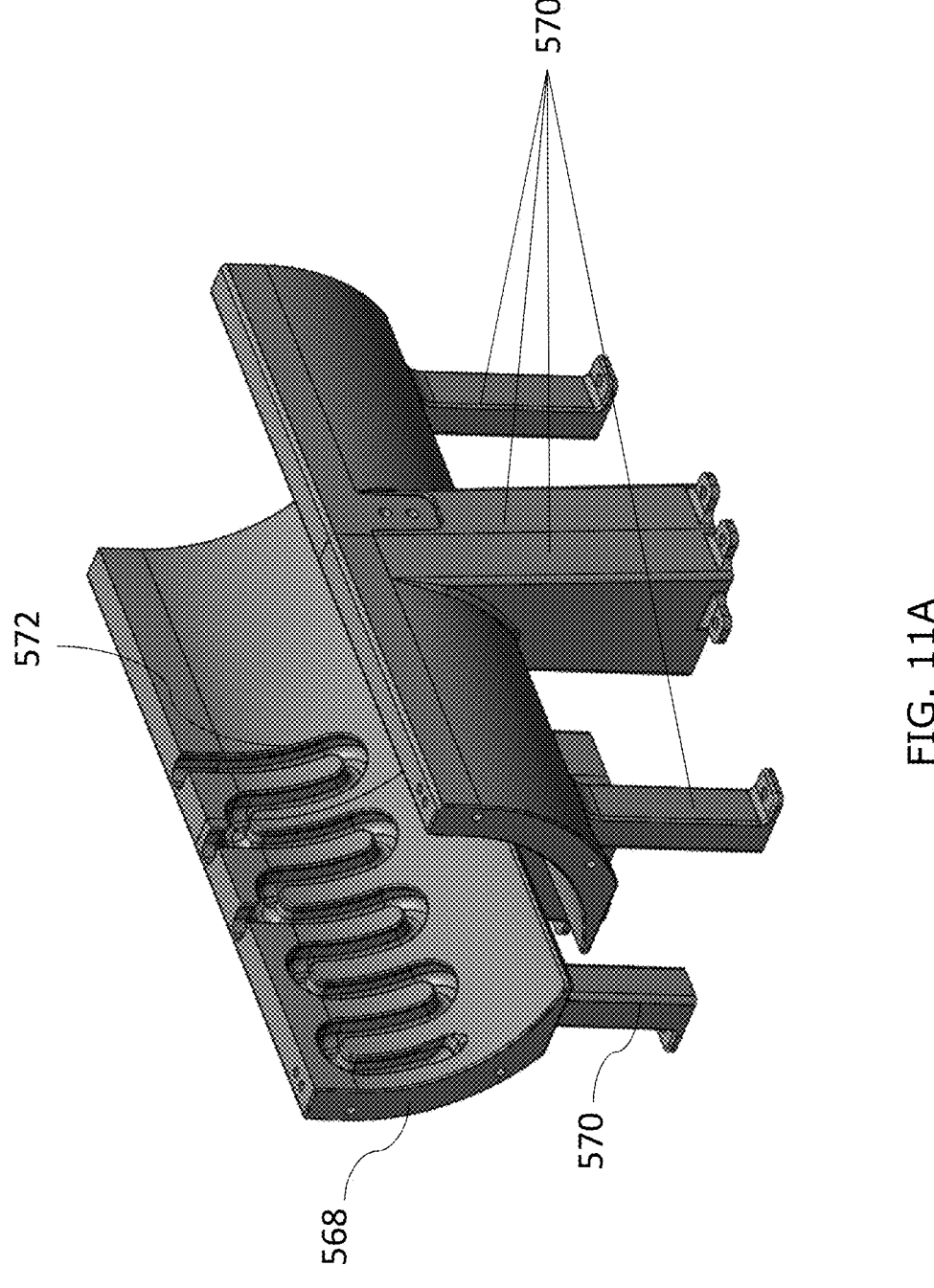
FIGS. 11A-11E depict an exemplary tube assembly.
Figures 11B, 11C:
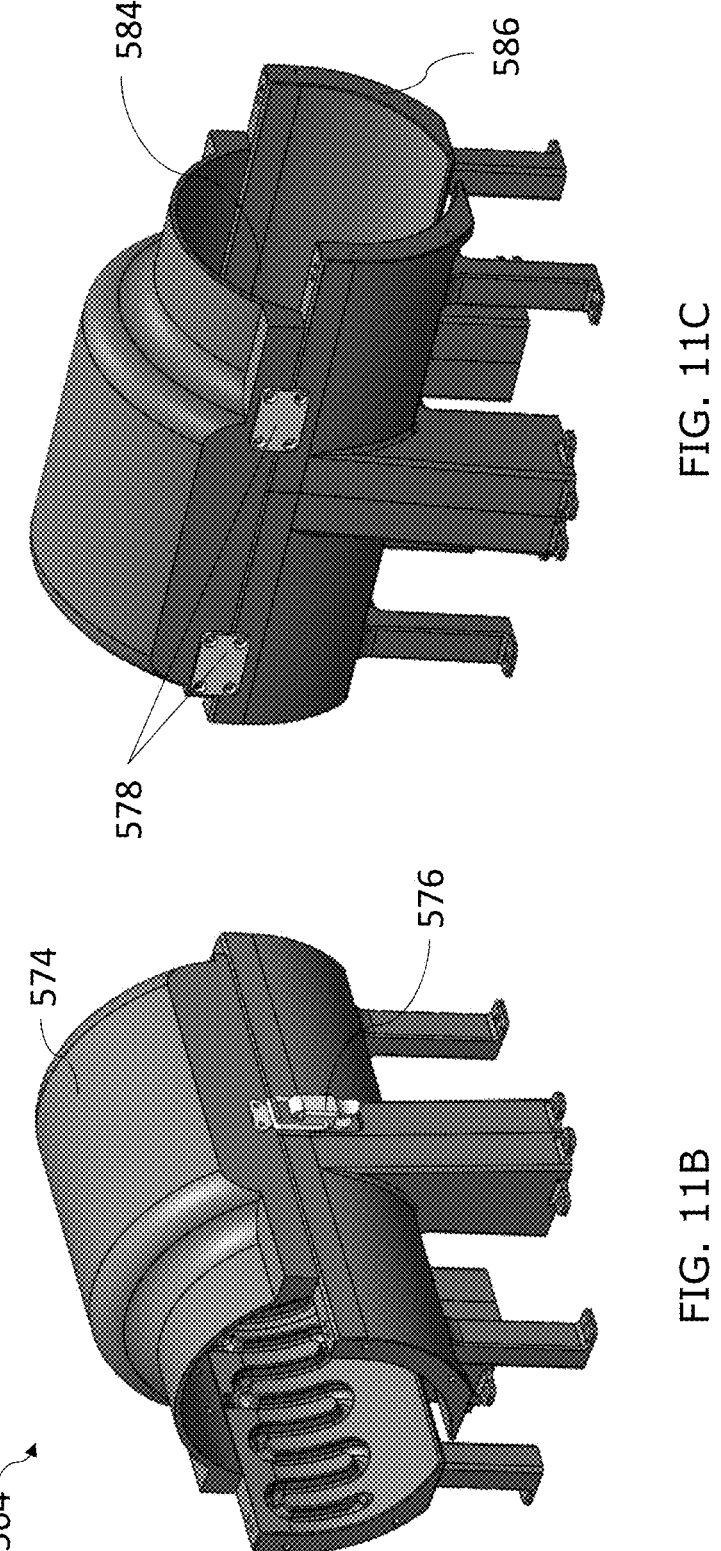
Figures 11D, 11E:
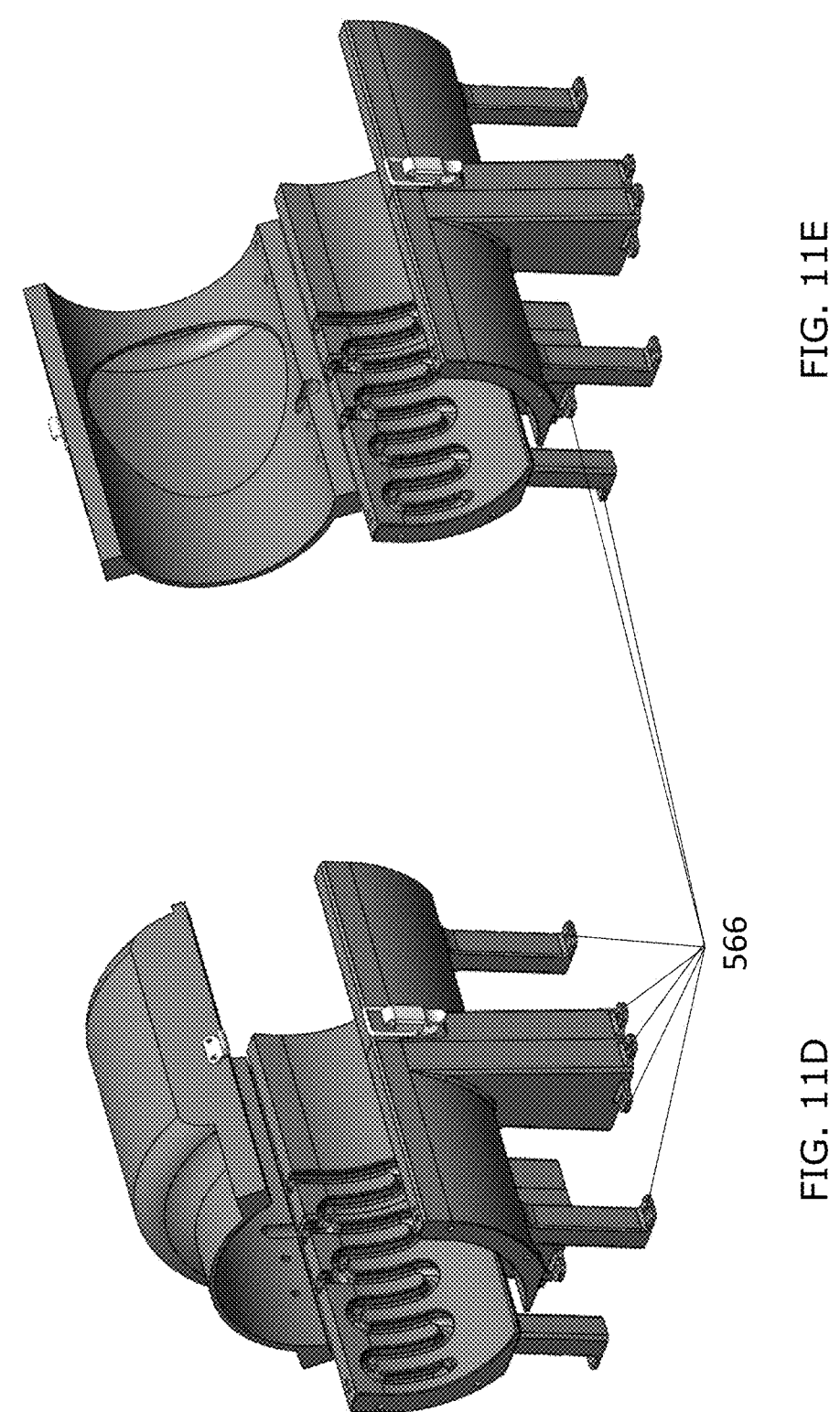
Figure 12B:
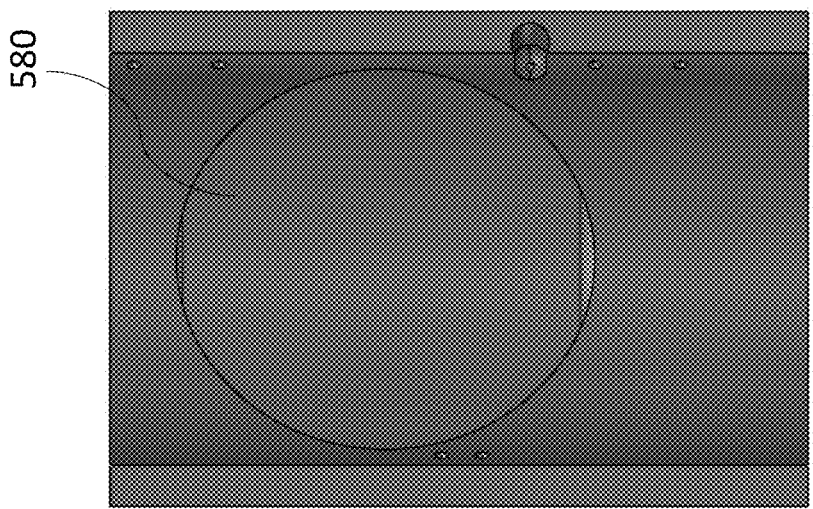
FIG. 12A-12C depict an exemplary cover, showing an exemplary placenta holder.
Figure 12A:
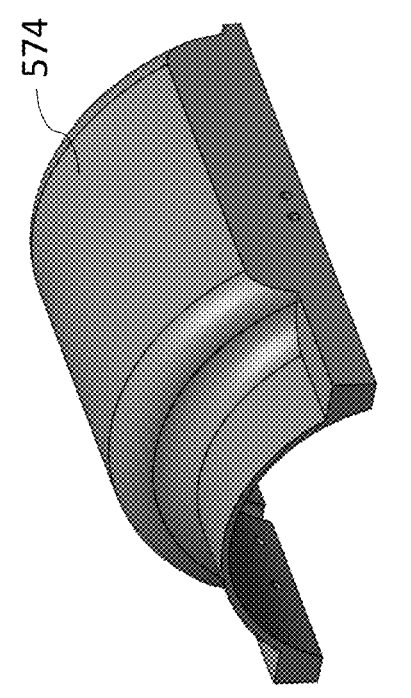
Figure 12C:
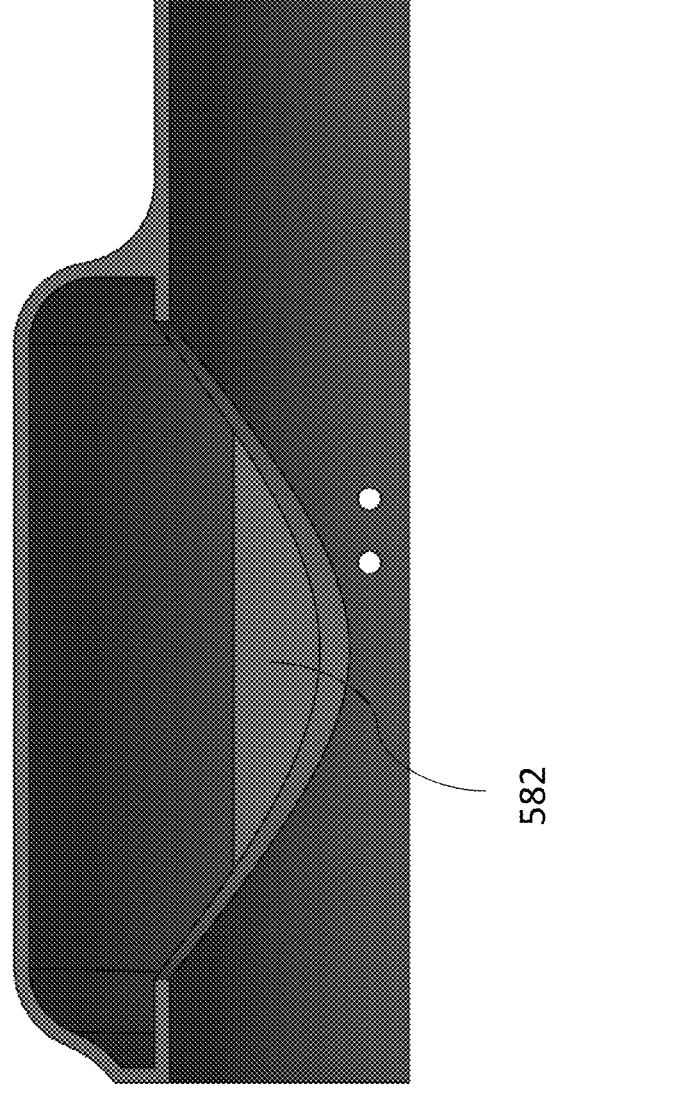

A sliding carriage 196 is coupled to the actuator 190 and the at least one guide rail 186. In an example, as shown in FIG. 10D, the sliding carriage 196 comprises a flange portion 198 which defines a plurality of openings 200 for attaching one or more ball nuts 202 to the sliding carriage 196. Fastening mechanisms, such as screws, are configured to extend through the plurality of openings 200 and secures the one or more ball nuts 202 to the sliding carriage 196 for securing the sliding carriage 196 to the actuator 190. Other suitable attachment mechanisms will be known to one of ordinary skill in the art. In an example, the one or more ball nuts 202 are oriented such that at least one of the respective end portions are each visible (as seen in FIG. 11D) from a surface of the carriage 196 and an opposite surface of the carriage 196.

The sliding carriage 196 comprises at least one linear bearing pad 206, each of which comprises UHMW plastic material, such as ultra-high molecular weight polyethylene. The material of the at least one linear bearing pad 206 is configured to define a surface that allows the sliding carriage 196 to slide along the at least one guide rail 186. Specifically, the surface of the at least one linear bearing pad 206 is configured to slide along the at least one guide rail 186 comprising 80/20 aluminum extrusion alloy. Further, the at least one linear bearing pad 206 may include a first linear bearing pad 206a positioned toward one (e.g., a right) side of the at least one guide rail 186, a second linear bearing pad 206b positioned toward the opposite (e.g., left) side of the at least one guide rail 186, and a third linear bearing pad 206c positioned above the at least one guide rail 186 and below the actuator 190. As shown in FIG. 10D, a fourth linear bearing pad 206d may be utilized when more than one guide rail 186 is used. This exemplary configuration allows the sliding carriage 196 to slide along the at least one guide rail 186 with relatively little friction, thereby allowing for a smoother automatic movement of the fetal model 106 by the actuator 190 of the birthing device 104 during a simulated childbirth scenario.

The birthing device 104 comprises a motor 182 configured to drive the actuator 190. As seen in FIGS. 10A-10B, the motor 182 is mounted parallel to the actuator assembly 180. In an example, motion of the actuator 190 is driven by the motor 182, such as a battery-powered DC motor. As illustrated in FIGS. 10A-10D, the motor 182 is mounted parallel to the linear actuator 190 to reduce the overall length of the birthing device 104, thereby allowing for a more economical size and efficient operation of the birthing simulator 100. In an exemplary embodiment, the length of the linear actuator 190 is 11.75 inches and the fetal model 106 is configured to move 8.75 inches. In this configuration, the rotational motion generated by the motor 182 is transferred to the actuator 190 through a transmission, e.g., pulley system 210. The actuator assembly 180 includes the pulley system 210, which comprises a timing belt and at least one timing pulley 208/214 mounted on the frame 184. One of the at least one timing pulley 208 is mounted on an end portion of the motor shaft, and another of the at least one timing pulley 214 is mounted on an end portion of the linear actuator 190. The pulley system 210 is configured to effectively transfer motion generated by the motor 182 to the actuator 190, which is configured to rotate along the rotation axis (FIG. 10B). In particular, the motor 182 is connected to the at least one timing pulley 208/214 and when the motor 182 is activated, the at least one timing pulley 208/214 is configured to rotate, thereby driving the actuator 190 to rotate along the rotation axis (FIG. 10B). The rotation of the actuator 190 thereby moves the sliding carriage 196 along the length of the actuator 190 and along the grooves 188 defined by the at least one guide rail 186. More specifically, the at least one linear bearing pads 206 of the sliding carriage 196 slide or glide along the grooves 188 of the at least one guide rail 186 for the predetermined length of the actuator 190.

In an example, as seen in FIGS. 10B-10C, the motor 182 and one or more components of the pulley system 210 are mounted to the second plate 194 of the frame 184. Specifically, the motor 182 is mounted to one or more openings 216 (FIG. 10C) defined by the second plate 194. The size and shape of the one or more openings 216 allow for the timing belt to be loaded onto the at least one timing pulleys 208/214. Subsequently, the size and shape of the openings 216 allow for lateral movement of the motor 182 relative to the at least one guide rail 186, thereby eliminating the slack in the timing belt after the timing belt is loaded onto the at least one timing pulleys 208/214. Fastening mechanisms, such as screws 218, may extend through the one or more corresponding openings 216 defined by the second plate 194 and the motor (not shown). In particular, the screws 218 may be fully tightened to secure at least the motor 182 to the second plate 194. Other suitable attachment mechanisms, such as for example, straps, hook-and-loop fasteners, anchors, adhesives, or double-sided tape, or combinations thereof will be known to one of ordinary skill in the art from the description herein.

Additionally or optionally, the second plate 194 may include an adjustable assembly that allows for vertical motion of a simplified pulley 220 that is configured to add tension to the timing belt. The adjustable assembly includes a protruding structure 222, such as a thumb screw, that is mounted to the second plate 194. Tension is added to the timing belt, for example, by tightening the thumb screw 222.

Although FIGS. 10A-10D illustrate the rotational motion generated by the motor 182 is transferred to the actuator 190 through the pulley system 210 having the timing belt and the at least one timing pulley 208/214, it would be understood from the description herein that the motor 182 may be connected rigidly and/or directly to the actuator 190. In other words, the motor 182 may be configured to directly drive the motion of the actuator 190 without use of a pulley system, such as pulley system 210. In such embodiments, motor 182 may be connected to actuator 190 by a transmission including one or more gears for transmitting rotary force from motor 182 to actuator 190.

Additionally or optionally, the sliding carriage 196 comprises a pushing paddle 224. The pushing paddle 224 is configured to contact the fetal model 106 when the fetal model 106 is positioned within the tube assembly 564. As the sliding carriage 196 moves along the length of the actuator 190, the pushing paddle 224 moves the fetal model 106 toward the birth canal simulator 116 for delivering the fetal model 106 outside the housing 102.

In an example, the pushing paddle 224 comprises a paddle portion 226 and a paddle support 228. As seen in FIGS. 10B-10C, the paddle support 228 has a triangular geometry, wherein the tallest point 228a of the paddle support 228 is configured to be positioned behind a surface of the paddle portion 226. The triangular geometry of the paddle support 228 is configured to increase the stability of the pushing paddle 224 in the direction where the pushing paddle 224 experiences the most force, i.e. movement of the fetal model 106 toward the birth canal simulator 116. The paddle support 228 further comprises a bottom portion 228b (FIG. 10B) defining a plurality of paddle apertures that correspond to a plurality of carriage apertures defined by the sliding carriage 196 for attaching the pushing paddle 224 to the sliding carriage 196. Fastening mechanisms, such as screws 230, extend through the plurality of paddle apertures and the plurality of carriage apertures for securing the pushing paddle 224 to the sliding carriage 196. Other suitable attachment mechanisms, such as for example, straps, hook-and-loop fasteners, anchors, adhesives, or double-sided tape, or combinations thereof will be known to one of ordinary skill in the art from the description herein. Although the pushing paddle 224 is illustrated in FIG. 10A-10B as comprising the paddle portion 226 and the paddle support 228 as separate components, the paddle portion 226 and the paddle support 228 may optionally be integrally formed as a single body of unitary construction. Likewise, while paddle 224 is depicted as a separate structure from carriage 196, it will be understood that carriage 196 and paddle 224 may be formed as a single body of unitary construction.

Referring now to FIGS. 11A-11E, the tube assembly 564 comprises more durable or rigid material configured to provide support or a mounting surface to one or more components of the simulator 100, such as the fetal model 106. Thus, the removable fetal model 106 is configured to be positioned within tube assembly 564 to simulate a childbirth scenario, such as at least one of a normal and an abnormal labor childbirth scenario. In another example, the uterus simulator 128 may comprise an elastic membrane configured to enclose and secure the removable fetal model 106.

The tube assembly 564 has a size and shape that corresponds with the overall size and shape of at least the birthing device 104, as seen in FIG. 9, and one or more components of the birthing simulator 100. The tube assembly 564 comprises a base 568 and a plurality of legs 570 extending downwardly from the base 568. The base 568 is configured to position the fetal model 106 above the moving parts of the birthing device 104, such as the actuator assembly 180. In this configuration, the moving parts of the birthing device 104 is also protected from movement of the fetal model 106 during a simulated childbirth scenario. Further, the tube assembly 564 is configured to be stationary relative to at least the actuator assembly 180 and the fetal model 106, thereby providing a stabilizing feature to the simulator 100. This stability is facilitated by each leg 570 comprising at least one connection point 566 configured for attaching and/or securing at least the base 568 of the tube assembly 564 to the bottom portion 114 of the housing 102.

The base 568 has a generally tubular geometry and has a shape and/or size configured to stabilize and secure the fetal model 106 within the uterus simulator 128. Further, the base 568 is configured to place the fetal model 106 in a position corresponding to the intended childbirth scenario to be simulated. For example, the fetal model 106 may be loaded within the tube assembly 564 in one alignment for the occiput or cephalic posterior position birthing position and another alignment for the breech birthing position. However, it should be understood that without departing from the spirit and scope of the invention, the base 568 may be further configured to facilitate one or more specific alignments by preventing unwanted movement of the fetal model 106 that detracts from the intended childbirth scenario to be simulated, based on the fetal model's 106 birthing position. In other words, in addition to providing stability for the fetal model 106, the tube assembly 564 may be further configured to guide movement of the fetal model 106. In one example, the base 568 or the tube assembly 564 generally may have a tapered shape at one end portion and a non-tapered opposite end portion. This configuration may allow for selective restriction of the fetal model's 106 movement, at certain stages of labor. For example, the tapered end portion, i.e. tighter region, of the uterus simulator 128 helps ensure the limbs of the fetal model 106 are held in the proper position, particularly as the fetal model 106 transitions into the birth canal simulator 116.

Additionally or optionally, as shown in FIGS. 11B-11E, a cover or lid 574 may be engageably coupled to the base 568 via a pair of hinges 578 and a latch 576. The cover or lid 574 may have a size and shape that corresponds to the size and shape of the base 568, such that together, the cover 574 and the base 568 together define a cavity or space 584 through which the fetal model 106, and additionally a simulated umbilical cord 282 and a simulated placenta 280, may be positioned within the simulator 100. The cover 574 may be moveable relative to the base 568, as the latch 576 moves between an unlatched state and a latched state. In operation, when the latch 576 is in the unlatched state, the cover 574 is moveable relative to the base 568 and the cover 574 is moveable between a partially open position (FIG. 11D) and a fully open (FIG. 11E) position. When the cover 574 is in the partially open or fully open position, one or more components of the simulator 100, such as the fetal model 106, may be positioned within space 584, according to a simulated childbirth scenario as discussed above. Still further, the cover 574 may have a relatively shorter length than a length of the base 568, such that a mounting surface 586 is formed based on the difference in length. The mounting surface 586 is configured to receive and/or secure at least a portion of the birth canal simulator 116 within the housing 102 (as best shown in FIG. 1C).

Turning now to FIGS. 11B and 12A-12C, with respect to positioning and/or securing the at least one of the simulated placenta 280 within the tube assembly 564, the cover 574 may include a placenta holder 580. The placenta holder 580 may include a pocket 582 in which at least the simulated placenta 280 may be received and/or secured. The pocket 582 may have a size and shape to restrict or limit the movement of the placenta when the fetal model 106 is stationary within the tube assembly 564. However, when the fetal model 106 is moved out of the tube assembly 564 and toward the birth canal simulator 116, the pocket 582 may be configured to permit movement of the simulated placenta 280 along with movement of the fetal model 106. With respect to positioning and/or securing the simulated umbilical cord 282 within the tube assembly 564, a trench 572 having a serpentine geometry is formed along an interior surface of the base 568. The trench 572 is configured to receive and/or secure a simulated umbilical cord 282 (discussed further below), such that movement of the simulated umbilical cord 282 and/or disengagement of the simulated umbilical cord from the tube assembly 564 is restricted or limited when the fetal model 106 is stationary within the tube assembly 564. However, the simulated umbilical cord 282 may be releasably removed from the trench 572 after an application of force is exerted by movement of the fetal model 106 toward the birth canal simulator 116.

Although the tube assembly 564 is illustrated and discussed above as being comprised of separate components, e.g. cover 574 and base 568, one of ordinary skill in the art would understand from the description herein that the tube assembly 564 may be integrally formed as a single body of unitary construction.

Figure 13:
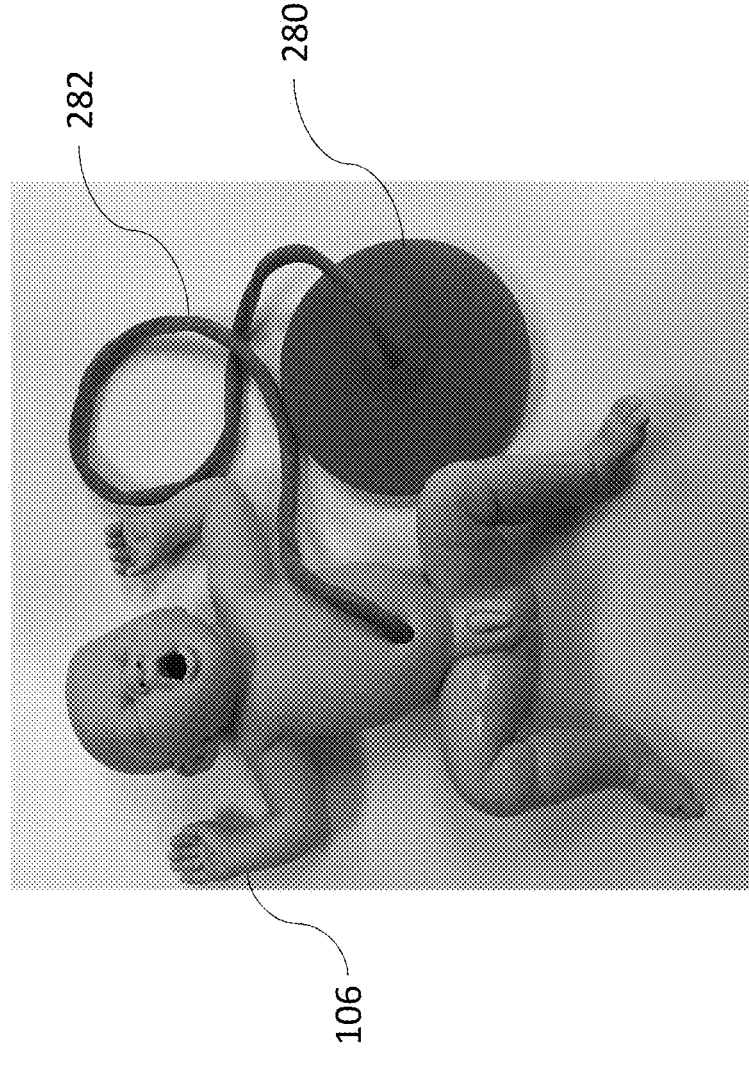
FIG. 13 is an image showing an exemplary fetal model.
Figures 14A, 14B, 14C:
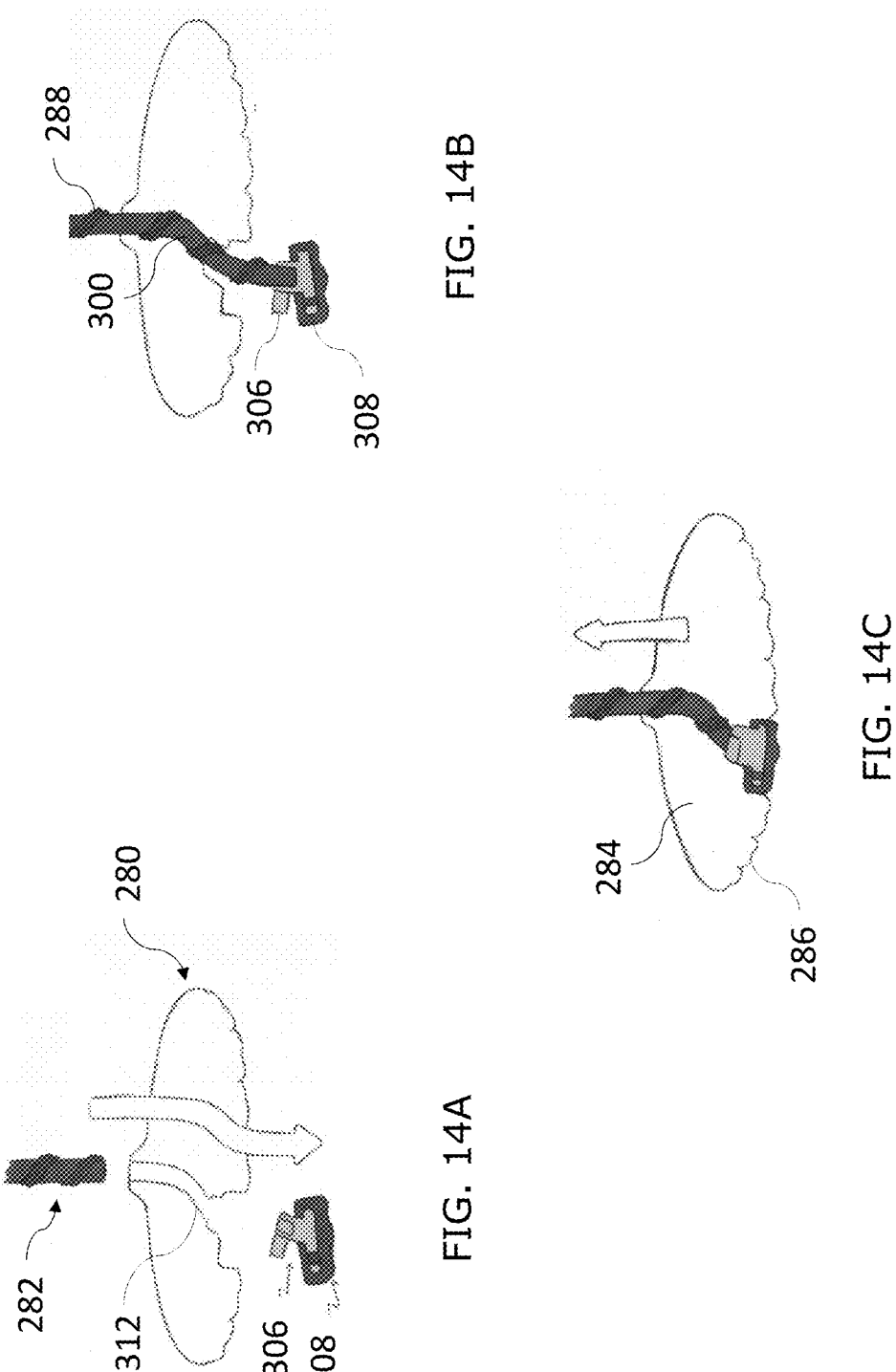
FIGS. 14A-14C depict an exemplary simulated umbilical cord connected to an exemplary simulated placenta.

Referring now to FIGS. 13 and 14A-14C, the simulator 100 further includes the simulated placenta 280 and the simulated umbilical cord 282, both of which are positioned within the uterus simulator 128. The simulated placenta 280 comprises a fetal surface 284 and a maternal surface 286 opposite the fetal surface 284. The simulated umbilical cord 282 includes one or more tubes 288/300, each of the one or more tubes 288/300 having an end portion coupled to the simulated placenta 280 and another end portion coupled to the fetal model 106 (FIG. 13). As illustrated in FIG. 14B, the one or more tubes 288/300 comprises a simulated vein 300 that carries oxygen and nutrients from the placenta to the baby and at least one simulated artery 288 that carry waste from the baby to the placenta. The simulated arteries 288 are adapted to wrap around the simulated vein 300.

In an exemplary embodiment (as illustrated in FIGS. 14A-14C), the one or more tubes 288/300 may be attached to the fetal surface 284 of the simulated placenta 280 via engagement between a removeable simulated cotyledon 308 and a locker 306. Other suitable attachment mechanisms, such as for example, straps, hook-and-loop fasteners, screws, anchors, adhesives, or double-sided tape, or combinations thereof will be known to one of ordinary skill in the art from the description herein. In another embodiment, an end portion of the one or more tubes 288/300 are coupled to a plug for attaching the one or more tubes 288/300 to the fetal surface 284 of the placenta 280. The one or more tubes 288/300 may be attached to the plug via fastening means, such as a zip tie.

The simulated umbilical cord 282 is configured to be releasable from at least one of the simulated placenta 280 and the fetal model 106. For example, and as seen in FIG. 14B, the one or more tubes 288/300 of the simulated umbilical cord 282 are removable from the simulated placenta 280 via the removeable simulated cotyledon 308. In particular, the one or more tubes 288/300 are configured to be removable from a mating cavity 312 extending through the fetal surface 284 and the maternal surface 286 of the simulated placenta 280. This facilitates easy cleaning, removal, reuse, and replacement of the simulated umbilical cord 282, which may be desirable based on the simulated childbirth scenario. The removeable cotyledon 308 may be connected to or received in cavity 312 through a friction fit, through engagement surfaces, detents, or other known structures.

Further, the simulated umbilical cord 282 may be of any length, such as a sufficient length to simulate a childbirth scenario wherein the simulated umbilical cord 282 is wrapped around the fetal model's 106 neck, i.e. a nuchal cord complication. Additionally or optionally, the simulated umbilical cord 282 may be of a sufficient length and of a material such that the simulated umbilical cord 282 may be cut, at any desired position along the length of the umbilical cord 282 to simulate cutting/tying of the umbilical cord following birth.

Finally, the material of the one or more tubes 288/300 of the simulated umbilical cord 282 is customizable in coloring and texturing. In one example, the material selected to simulate the look and feel of the simulated umbilical cord 282 comprises an elastic material such as silicone. In a further example, the simulated vein 300 is configured to be red in color and the simulated arteries 288 are configured to be blue in color.

As stated above, the simulated placenta 280 comprises the fetal surface 284 and the maternal surface 286 opposite the fetal surface 284. The maternal surface 286 is configured to define a surface to which the uterus simulator 128 or pocket 582 of the cover 574 may optionally be attached. The fetal surface 284 is configured to define a surface to which the simulated umbilical cord 282 is adapted to connect. Further, the fetal surface 284 is configured to have at least one visual difference relative to the maternal surface 286. For example, the fetal surface 284 is adapted to include one or more of a glossy or shiny surface, or a translucent surface, such that underlying villous tissue may be visually perceptible. In another example, the fetal surface 284 may be gray in color.

Figure 15A:
FIGS. 15A-15B depict the simulated placenta having an exemplary removeable simulated cotyledon.
Figure 15B:
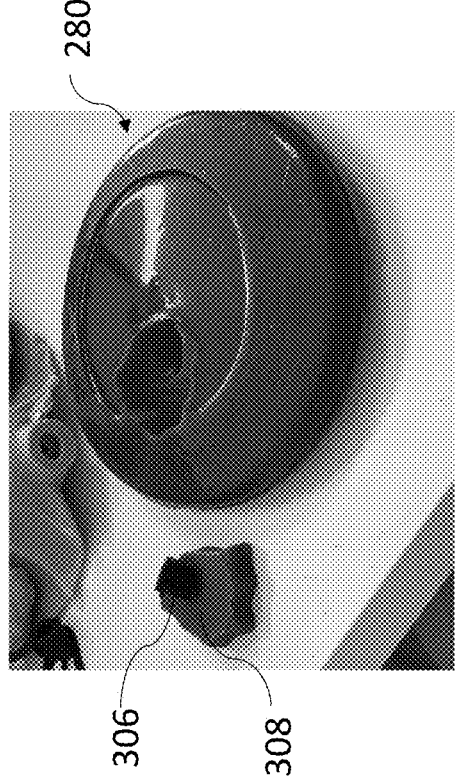

In another example, the visual difference may comprise the maternal surface 286 having a plurality of simulated cotyledons 308. As illustrated in FIG. 14A, the simulated cotyledon 308 has a size and shape that is configured to correspond to a mating cavity 312 defined by the simulated placenta 280. As seen in FIGS. 15A-15B, the simulated cotyledons 308 comprise a plastic locker 306 and a silicone material of removeable cotyledon 308. The silicone material allows for a more realistic look and feel of the maternal surface 286 of the simulated placenta 280. The locker 306 may have a geometry that correspond to the mating cavity 312 of the simulated placenta 280. In an alternative embodiment, the simulated cotyledons 308 comprise a plastic plug insert and a silicone cover. The plug insert may have a geometry that correspond to the mating cavity.

Figures 25A, 25B, 25C:
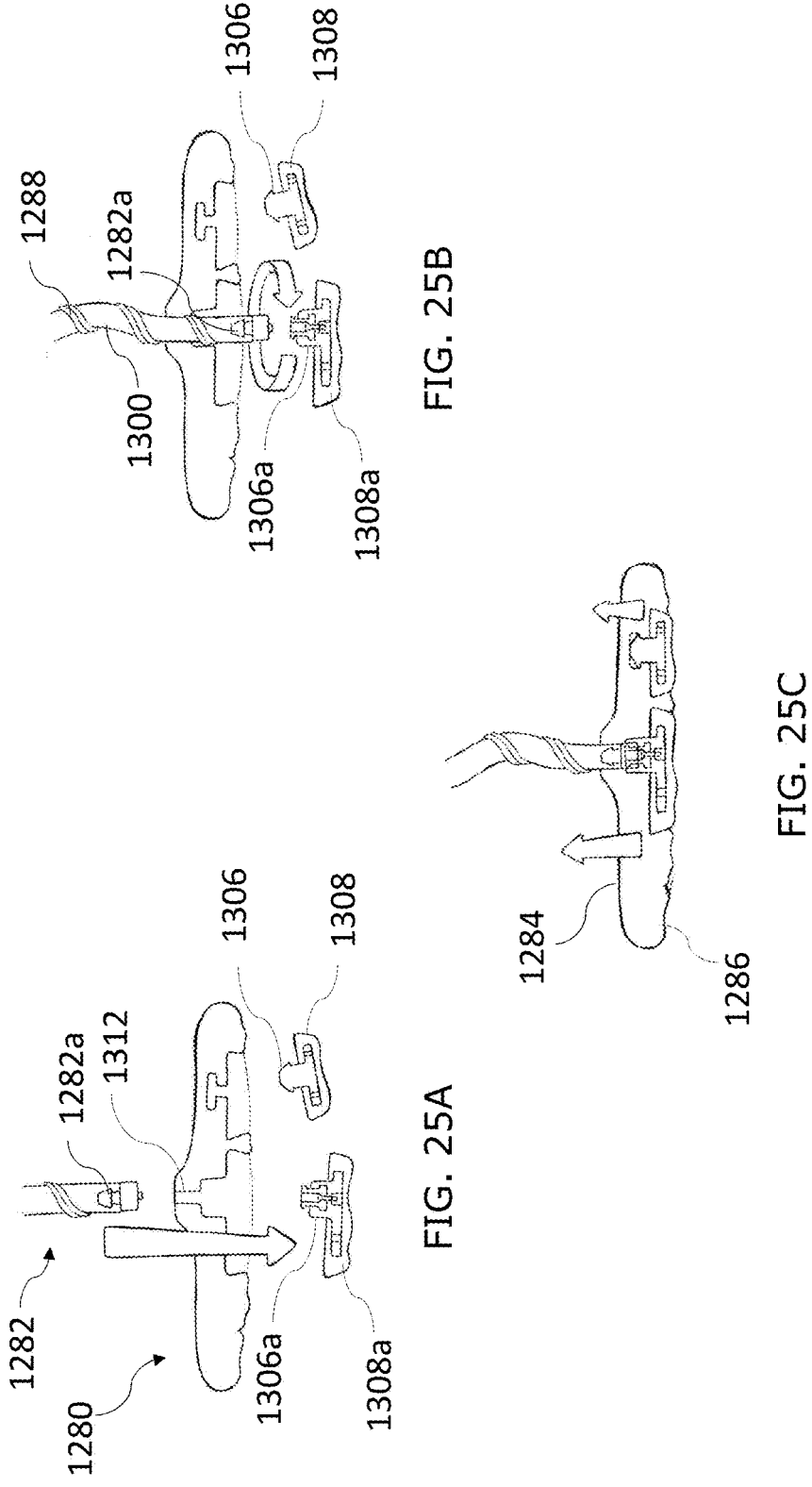
Figure 25G:
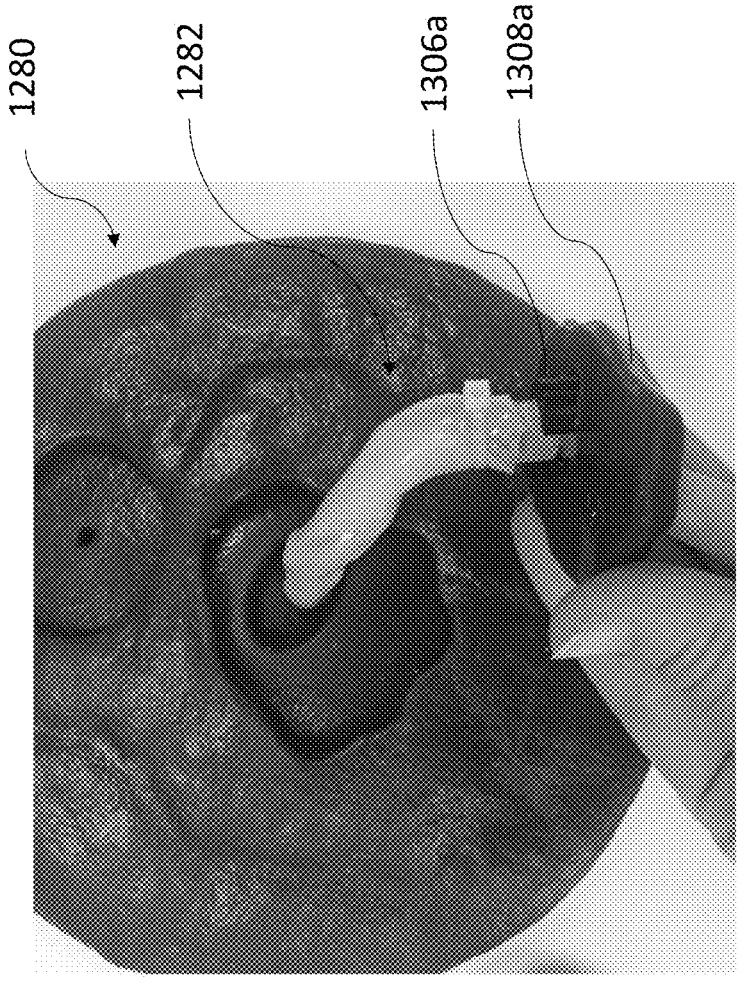
Figure 25I:
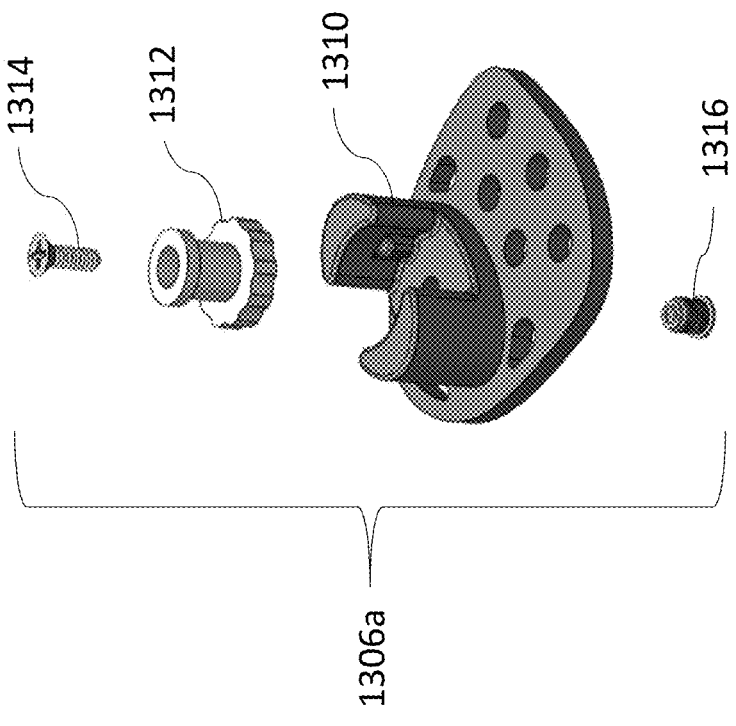
Figure 25H:
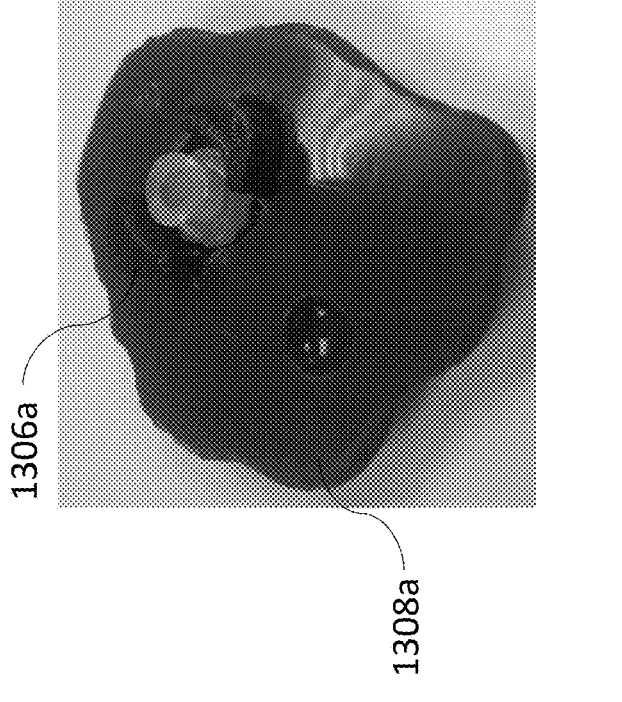
Figure 25J:
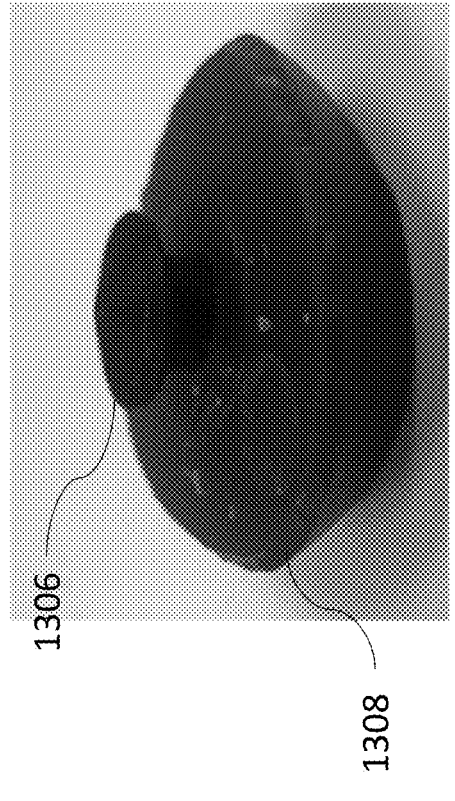

As illustrated in FIGS. 25A-25J, another exemplary embodiment of one or more tubes 1288/1300 may be attached to the fetal surface 1284 of the simulated placenta 1280 via engagement between a removeable simulated cotyledon 1308 and a locker 1306a. This embodiment is generally similar to the embodiment described above in relation to FIGS. 14A-14C, except in some respects. For example, the removeable simulated cotyledon 1308a and a locker 1306a are respectively separate and distinct from the removeable simulated cotyledon 308 and locker 306. In a non-limiting example, the locker 1306a is configured for engagement with connector 1282a of simulated umbilical cord 1282 (as best shown in FIGS. 25B and 25G). To facilitate this connection, as best shown in FIGS. 25H-25I, locker 1306a comprises a plastic cotyledon insert 1310 disposed at least partially within a body of the cotyledon 1308a, a lock cap 1312 (e.g. a Female Luer Cap) coupled to the plastic insert 1310 via a fastening means such as screw 1314 and heat-set threaded insert 1316. The lock cap 1312 is adapted to be engaged to connect 1282*a* of the umbilical cord 11282. Further, the one or more tubes 1288/1300 may be attached to the removeable simulated cotyledon 1308*a* via fastening means, such as a zip tie. Other suitable attachment mechanisms, such as for example, straps, hook-and-loop fasteners, screws, anchors, adhesives, or double-sided tape, or combinations thereof will be known to one of ordinary skill in the art from the description herein.

As discussed above, at least one of the plurality of simulated cotyledons 308 is configured to be removable. According to one childbirth scenario, such as postpartum hemorrhage (PPH) caused by retained placental fragments (RPF), one or more simulated cotyledon 308 is configured to be detached from the simulated placenta 280 and remains inside the uterus simulator 128, e.g., through attachment of the removable cotyledon 308 to an interior of the uterus simulator or any of the structures contained therein, such as the pocket 582. The detachment of the one or more simulated cotyledon 308 indicates an incomplete placenta and represents to the care provider that there is a high risk for PPH. Identification of a PPH may signify to a trainee or student that the uterus must be massaged externally until the trainee or student feels a tactile difference perceptible through human touch, as described above with reference to FIGS. 26A-26D. For example, the subject 108 may be instructed to manually inflate the inflatable bag 1158, such that the massaged portion of the birthing simulator 100 may feel relatively more rigid or "boggy" to the trainee or student. This massaging technique used on PPH patients may also help the maternal body to deliver or evacuate blood clots, which may be simulated by evacuating simulated biological fluid, the details of which are further discussed below), such that simulated blood clots may be delivered during or after the massaging technique is performed. The blood clots may be identified when they come in contact with an external pad, configured to provide a visual or tactile difference/confirmation of the delivery of blood clots.

The simulator 100 comprises a fluid handling system 318, which comprise a fluid driver 314 and a fluid reservoir 316. The fluid driver 314 includes at least one fluid driver, such as a pump 323, configured to drive fluid into or out of the fluid reservoir 316. The fluid driver 314 includes pump housing 326 and pump cover 328. The individual components of the fluid handling system 318 are discussed below.

Figure 16A:
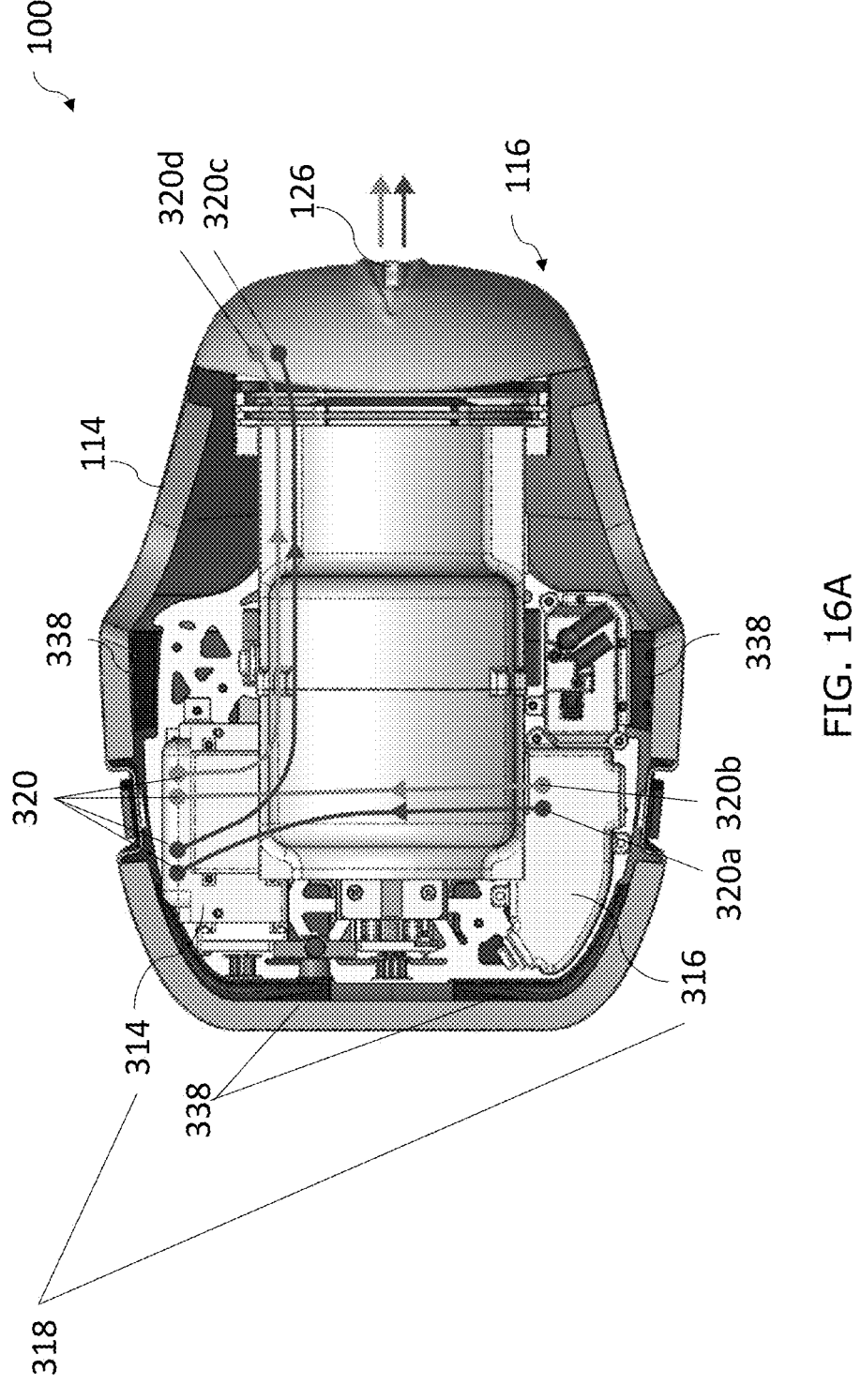
FIGS. 16A-16L depict an exemplary fluid handling system.
Figure 16C:
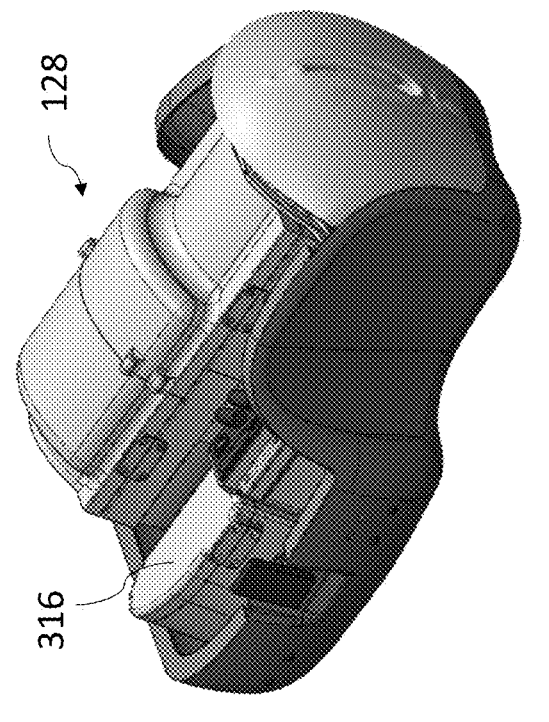
Figure 16B:
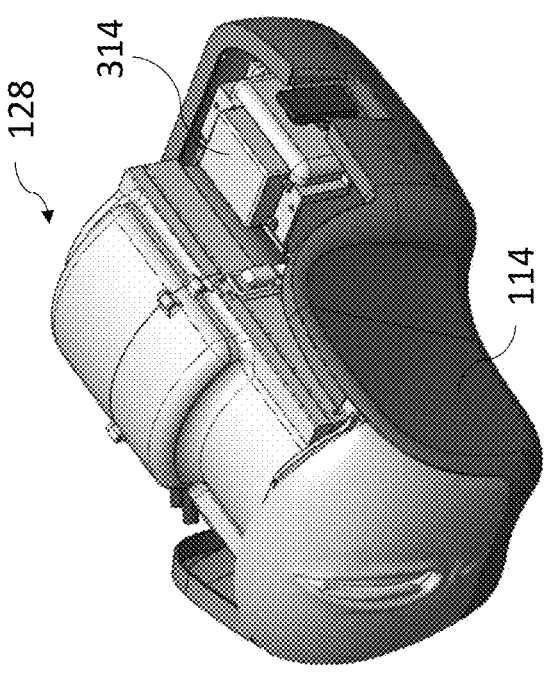

Referring now to FIGS. 16A-16F, the fluid driver 314 and the fluid reservoir 316 are disposed within housing 102. In one embodiment, as shown in FIG. 16A, the fluid driver 314 and the fluid reservoir 316 are mounted on or secured to bottom portion 114 of the housing 102. In particular, the fluid driver 314 is positioned adjacent motor 182. The fluid reservoir 316 is positioned opposite fluid driver 314.

Figure 16E:
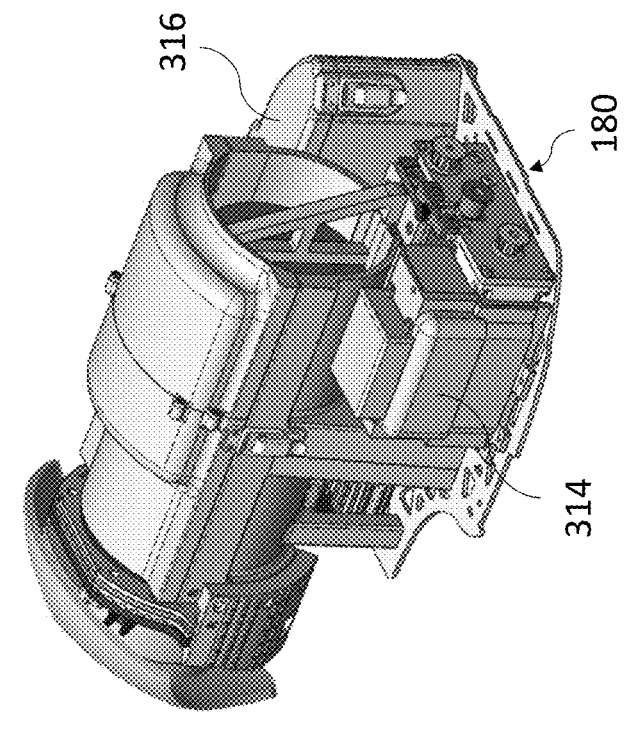
Figure 16D:
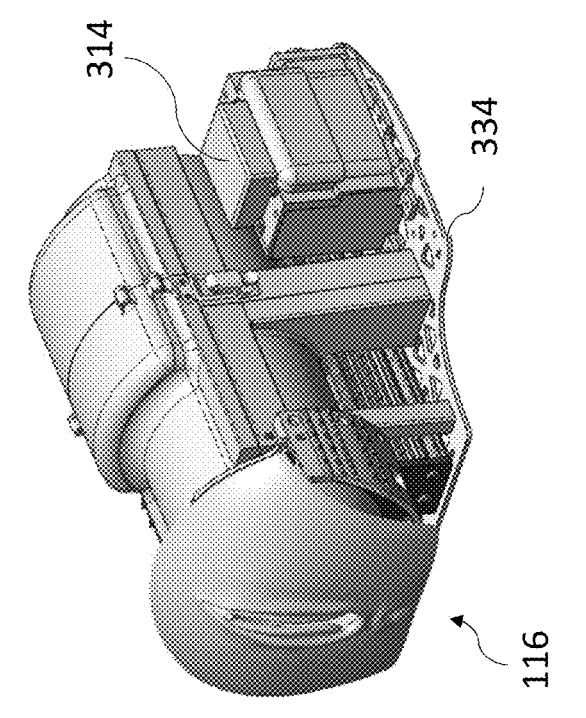

Certain components of simulator 100 are mounted on or secured to bottom portion 114 of the housing 102 via base plate 334 (FIG. 16G), such that base plate 334 provides a stabilizing feature for at least one other component of the simulator 100. Base plate 334 may be relatively thin compared to other components of simulator 100. In an exemplary embodiment, base plate 334 may have a thickness between 1/16 inches to 1/8 inches. Base plate 334 comprises more durable or rigid material (e.g. metal) configured to provide a mounting and/or supporting surface for at least one other component of simulator 100. Accordingly, base plate 334 has a generally irregular geometry that is configured to correspond to the size and shapes of at least one other component of simulator 100, e.g. bottom portion 114, fluid driver 314, and/or fluid reservoir 316. Specifically, base plate 334 has a generally rounded (i.e. non-sharp) corners to accommodate the contours of bottom portion 114. This configuration may also avoid undesirable interference by base plate 334 with other components enclosed within housing 102. In addition, base plate 334 includes a bespoke design of a plurality of openings 336, with the design corresponding to mounting surfaces defined by at least one other component of simulator 100, as best shown in FIGS. 16D and 16E.

Figure 16F:
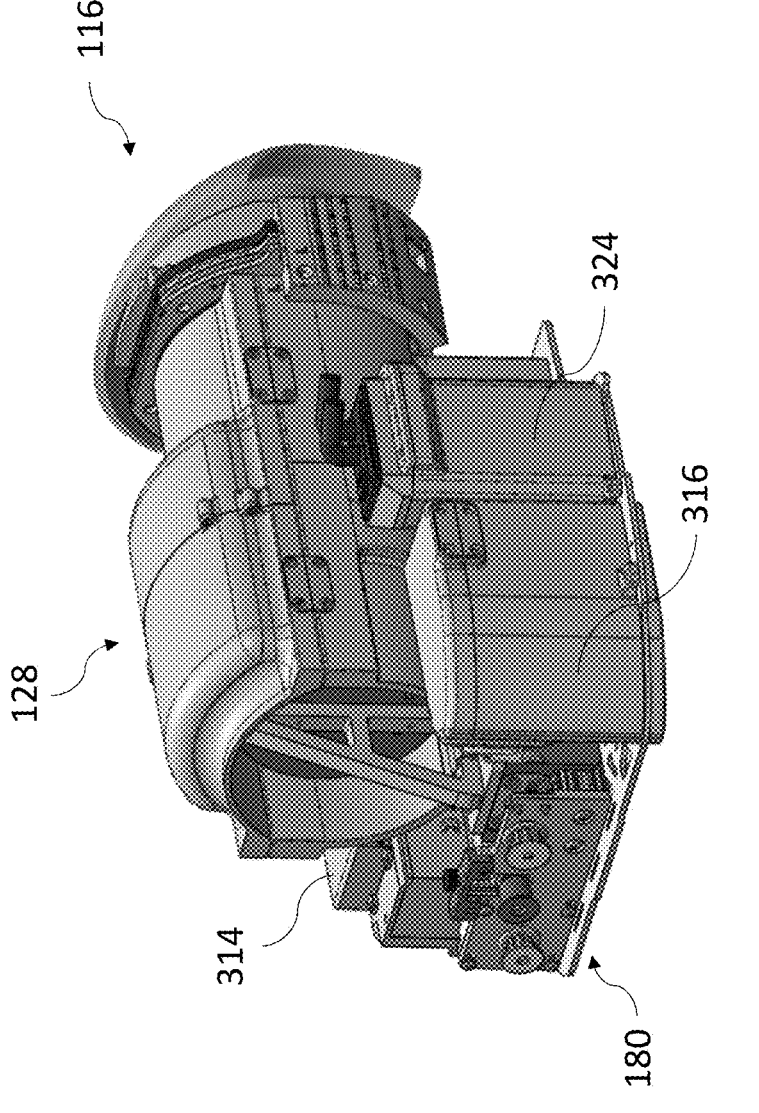
Figures 16G, 16H:
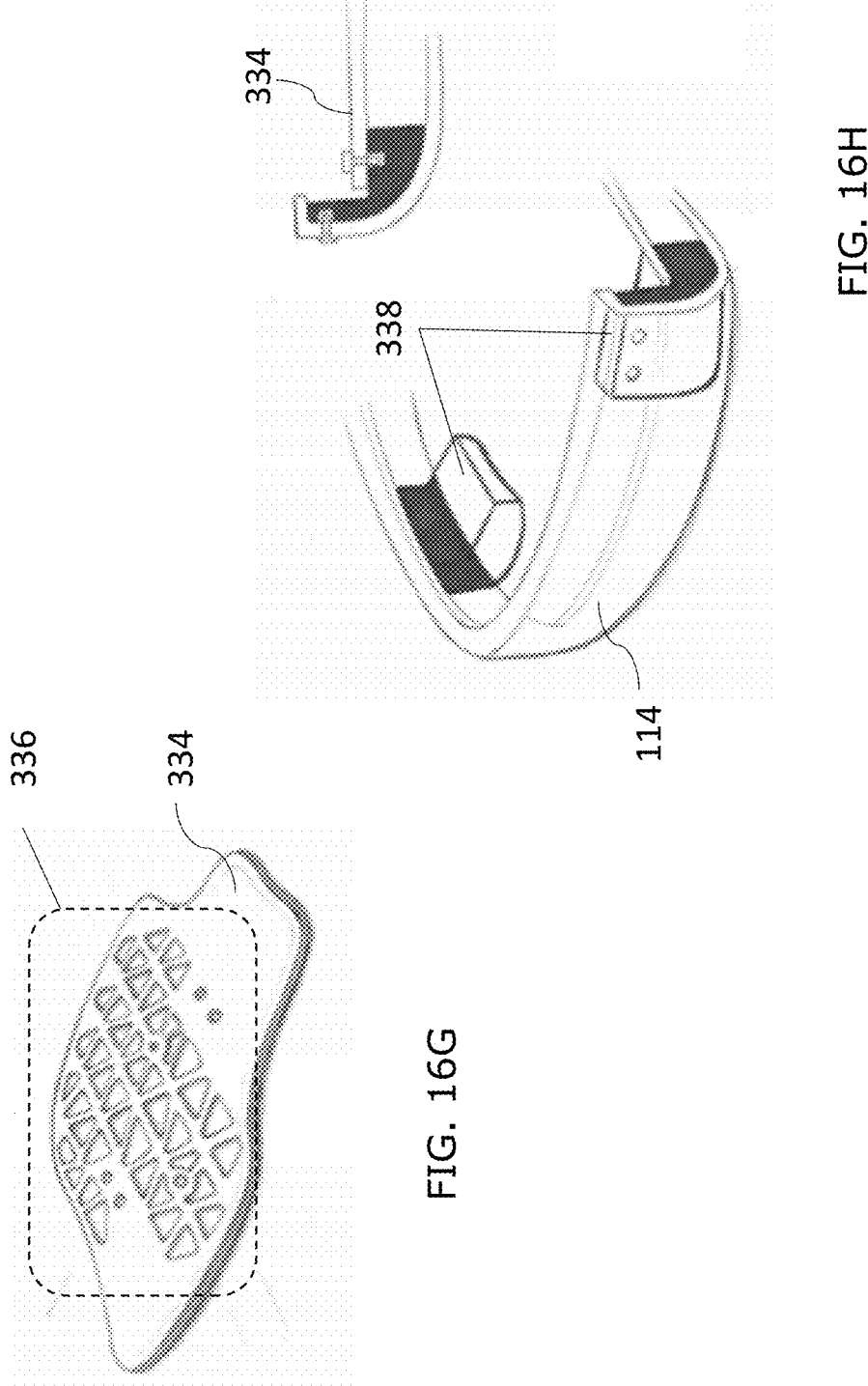

Further, base plate 334 is configured to be secured to bottom portion 114 via a plurality of connectors 338 disposed along an inner perimeter of bottom portion 114. As shown in FIGS. 16A and 16H, connectors 338 may be secured to bottom portion 114 via known attachment mechanisms, such as screws. Further, connectors 338 comprise a planar surface on which a portion of base plate 334 may rest. Base plate 334 may be secured to the connectors 338 via known attachment mechanism, such as screws.

Figure 16J:
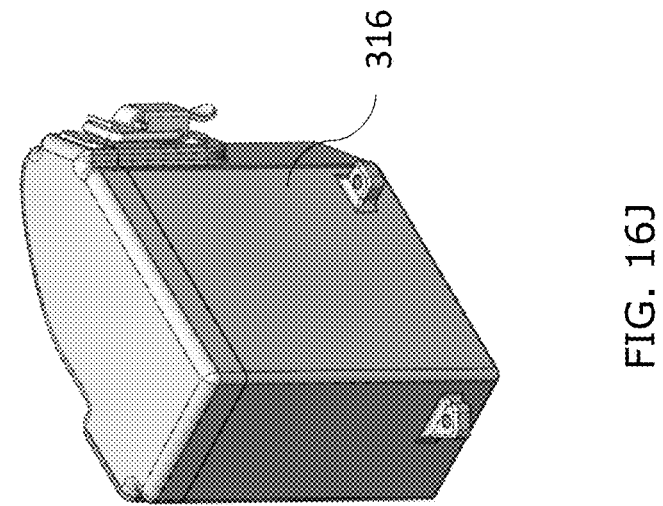
Figure 16I:
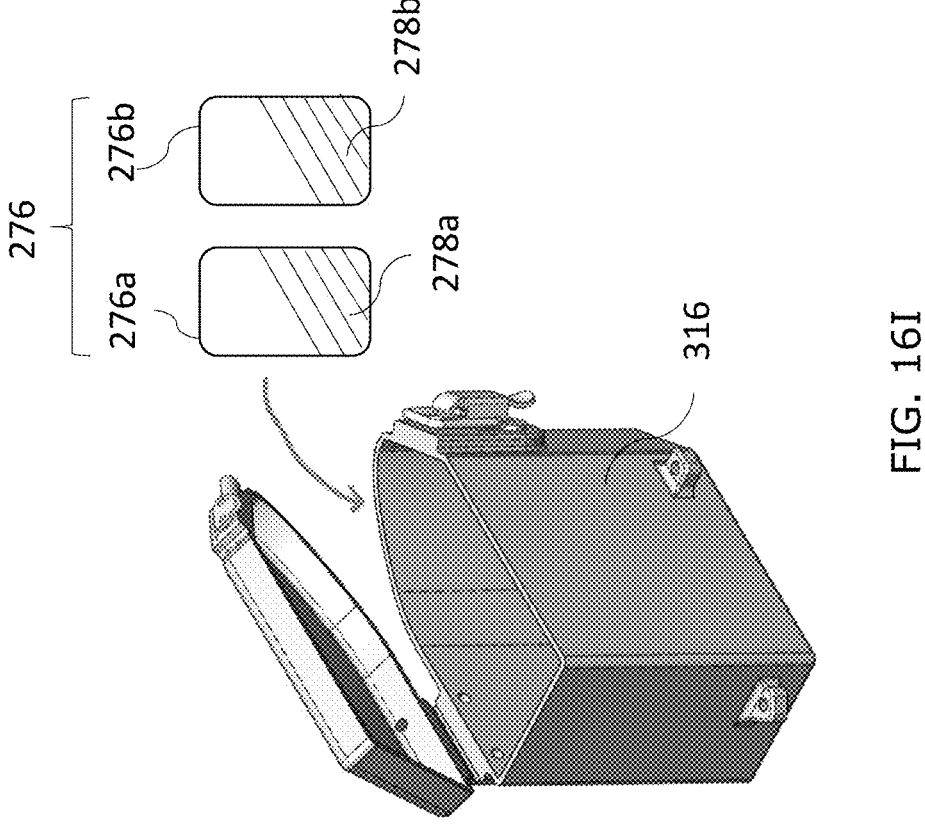

As shown in FIGS. 16I-16J, the one or more fluid containers 276 are configured to be stored within the fluid reservoir 316. The containers 276*a*, 276*b* each store a respective simulated biological fluid 278*a*, 278*b*. The containers 276*a*, 276*b* may be adapted to store fluid having a volume adapted for a simulated childbirth scenario. In a non-limiting example, the containers 276*a*, 276*b* each have a volume capacity of 500 milliliters and are each filled with up to 250 milliliters of respective simulated biological fluid 278*a*, 278*b*. The fluid storage 316 may have a volume capacity corresponding to the volume capacity of the fluid containers 276. Further, the containers 276*a*, 276*b* may be adapted to store fluid having a viscosity corresponding to one or more simulated biological fluids 278*a*, 278*b* found in a maternal or fetal patient. In one example, the first container 276*a* stores a first simulated biological fluid 278*a* having a first viscosity and the second container 276*b* stores a second simulated biological fluid 278*b* having a second viscosity that is different from the first viscosity. The first container 276*a* stores simulated blood and the second container 276*b* stores one or more of simulated amniotic fluid or other bodily fluids and discharges related to labor and delivery. For example, the simulated blood 278*a* and amniotic fluid 278*b* may be each formed from a combination of water and one or more viscous gels, lubricants, or dyes to achieve the desired viscosity, flow, and color to simulate blood and amniotic fluid, respectively.

As shown in FIGS. 16I-16L, the fluid driver 314 comprises at least one pump 323 configured to drive fluid into or out of the fluid containers 276. In an exemplary embodiment, as illustrated in FIGS. 16I-16L, a pair of pumps 323 are configured to drive simulated biological fluid 278*a*, 278*b* out of fluid containers 276*a*, 276*b* and into fluid driver 314 via a tubing system 320 disposed beneath base plate 334. In particular, the first and second fluid containers 276*a*, 276*b* are each coupled to one or more input tubes 320*a*, 320*b* in order to provide the simulated blood and amniotic fluid respectively, to one or more output tubes, each of which may be coupled to a connector on one end and to a fluid port 532 (FIG. 5D) on another end. In an exemplary embodiment, the one or more output tubes 320*c*, 320*d* are routed from beneath the base plate 334 and connects to the fluid port 532. The fluid port 532 comprises a fluid connector insert disposed within or adjacent the birth canal simulator 116. In one non-limiting example, as shown in FIG. 5D, the fluid connector insert is coupled to or disposed on the pelvic ring 146. Along this fluid pathway defined by tubing system 320, simulated biological fluid 278*a*, 278*b* flows from fluid reservoir 316, toward the birth canal simulator 116, and out of aperture 126 of simulated genitalia 122.

Figure 16L:
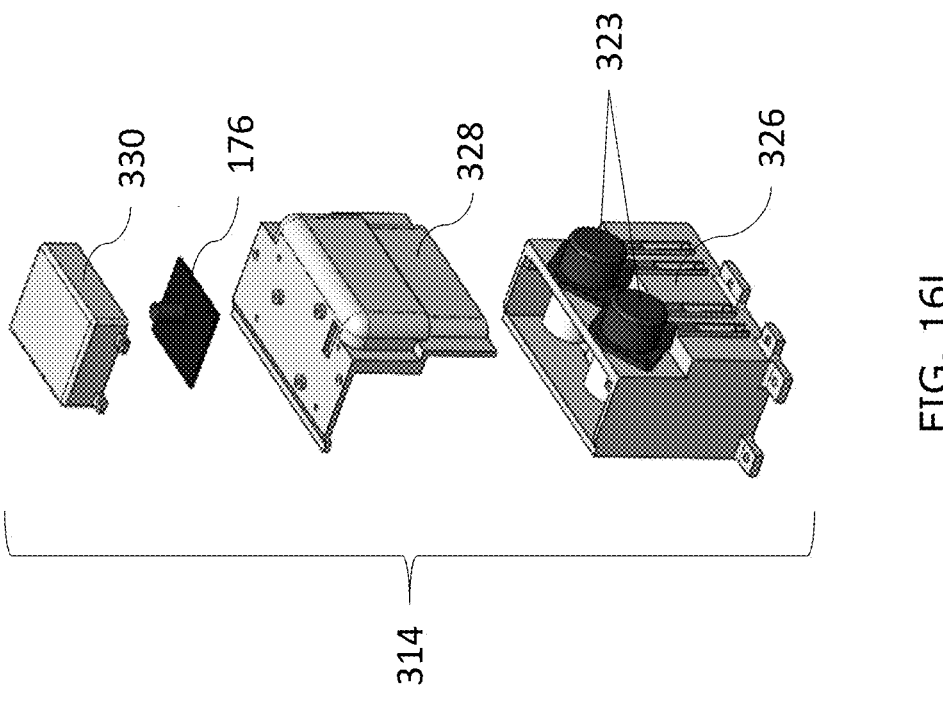
Figure 16K:
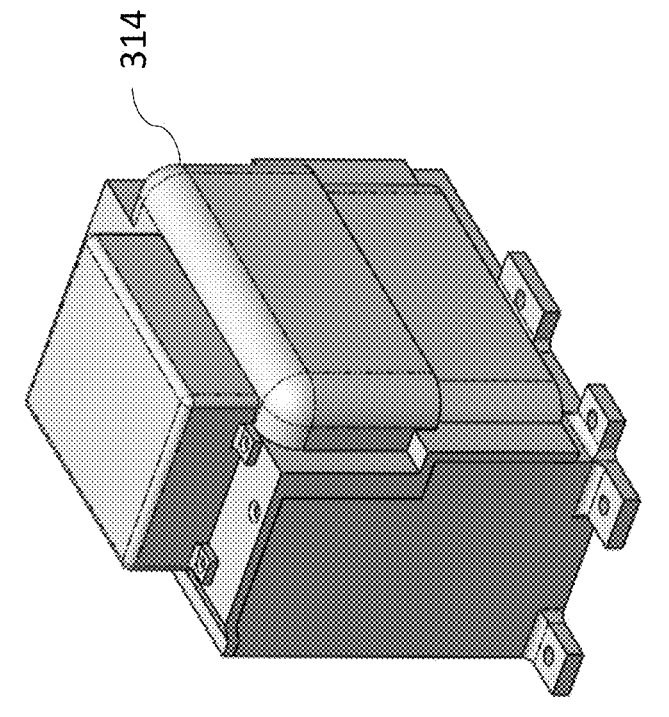

In operation, the fluid handling system 318 comprises at least one fluid driver, such as a pump 323, configured to drive fluid into and out of the fluid reservoir 316. The at least one pump 323 may be driven by a common power supply, or by individual power supplies, and the one or more power supplies for driving the pump, motor, or other electronic components of the simulator may be stored within receptacle 324 (FIG. 16F). The pump 323 may be disposed on pump housing 326 and concealed by pump cover 328. The one or more input tubes 320a, 320b may be respectively coupled to one or more pumps 323 for pushing fluid 278a, 278b through the one or more input tubes 320a, 320b and into the one or more output tubes 320c, 320d. The one or more pumps 323 may be driven by a common power supply or by individual power supplies. In one example, as shown in FIGS. 16K-16L, a pair of pumps 323 are each adapted to apply pressure to the respective simulated biological fluid 278a, 278b in the respective fluid containers 276a, 276b in order to cause the respective simulated biological fluid 278a, 278b to flow into and through the one or more input tubes 320a, 320b. The pumps 323 may further apply pressure through the one or more output tubes 320c, 320d, so that the simulated biological fluid 278a, 278b is evacuated through simulated birth canal 120 and out of aperture 126 of simulated genitalia 122 during a simulated childbirth scenario.

Figure 17:
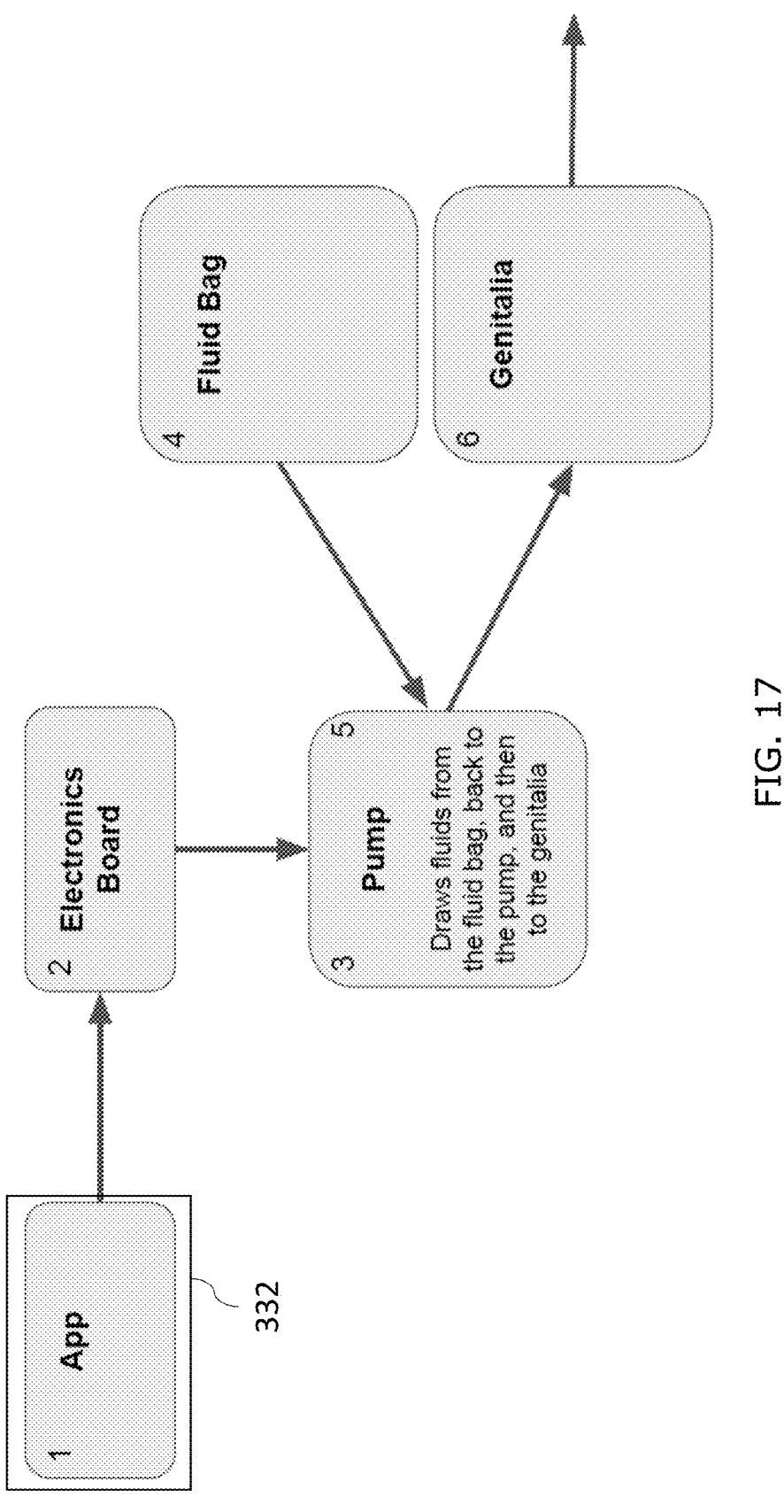
FIG. 17 is a schematic showing operation of the fluid handling system.

To facilitate the operation of the fluid handling system 318, a schematic of the operation of discharging simulated biological fluids (e.g. fluids 278a/278b) related to labor and delivery is disclosed in FIG. 17. First, the external device 332 (FIG. 17) is in communication with a controller 176 disposed within housing 102. In the exemplary embodiment shown in FIGS. 16K-16L and 18, the controller 176 is disposed on pump cover 328 and concealed by circuit board cover 330. Relative to other components adjacent the fluid driver 314, controller 176 may be positioned above pumps 323 and/or behind or above motor 182. Controller 176 may store (e.g. in an associated memory) one or more items of information for use in controlling one or more components of the simulator 100, such as the pumps 323. Controller 176 is configured to process signals wirelessly received from the external device 332 in order to operate the pumps 323. In one example, when the fetal model 106 is at a predetermined location relative to the birth canal simulator 116 (i.e. as determined by one or more sensors 174 discussed above), the external device 332 may be used to control a volume and flow rate of simulated biological fluids 278a, 278b into the simulated birth canal 120 and out of aperture 126 of the simulated genitalia 122. In operation, controller 176 wirelessly receives a signal from the external device 332 and activates the pumps 323 to evacuate the respective simulated biological fluid 278a, 278b from the containers 276a, 276b as the fetal model 106 moves towards the birth canal simulator 116 and out of the aperture 126 of the simulated genitalia 122. Additionally or optionally, controller 176 may be configured to hydraulically control the release of fluids from containers 276a, 276b (generically referred to as a Fluid Bag in FIG. 17) through control of one or more valves. Fluids may further be released from containers 276a, 276b either due to the fluids being stored under pressure, or due to the application of pressure through one or more pumps 323, substantially as described above. Controller 176 may further send signals for operating the birthing device 104 to simulate the childbirth scenario according to a predefined algorithm programmed in controller 176 or an associated memory (discussed below).

According to a simulated childbirth scenario, labor and delivery of the fetal model 106 comprises at least one simulated complication. In one example, the at least one simulated complication comprises shoulder dystocia, wherein movement of the fetus is impeded by one or more its shoulders contacting the pubic bone of the mother. In an exemplary embodiment, the controller 176 may send signals to actuator assembly 180 for operating the birthing device 104 to simulate a childbirth scenario involving shoulder dystocia. In particular, the controller 176 may send signals for operating the birthing device 104 according to a predefined algorithm programmed in controller 176 or an associated memory. The predefined algorithm may comprise the sliding carriage 196 moving along a portion of the length of the actuator 190, such that the pushing paddle 224 moves the fetal model 106 toward the birth canal simulator 116. Then, at a predetermined location prior to complete delivery of the fetal model 106 out of simulated genitalia 122, the sliding carriage 196 retreats and moves away from the birth canal simulator 116, such that a later subsequent movement of the shoulder portion of the fetal model 106 toward the birth canal simulator 116 is blocked. In a non-limiting example, at least one limit switch is utilized to define the predetermined location. Specifically, at least one limit switch is disposed adjacent both ends of actuator 190 or both end portions of a travel path of sliding carriage 196. In this way, contact between sliding carriage 196 or paddle 224 and the at least one limit switch provides a signal to the controller 176 to cease operation or movement of sliding carriage 196 or paddle 124. In this embodiment, the housing 102 may include a gap between the outer layer of top portion 112 and operational components of housing 102 (e.g. birthing device 104, birth canal simulator 116, etc.), such that the care provider may apply suprapubic pressure to the top portion 112 of housing 102 for releasing the blocked shoulder portion of the fetal model 106.

Another embodiment of the simulator according to the present invention is illustrated in FIGS. 19A-23C. The components of this embodiment generally correspond to the components of simulator 100 as discussed above.

However, this embodiment is different from the first embodiment described above in several respects. The fetal model 106 is positioned on a support structure 648 (FIGS. 19A-19B) and thus, the pushing paddle 224 has a shape intended to correspond to the internal geometry of a support structure 648. As the sliding carriage 196 moves along the length of the actuator 190, the pushing paddle 224 moves the fetal model 106 toward the birth canal simulator 116 for delivering the fetal model 106 outside the housing 102.

Figure 19B:
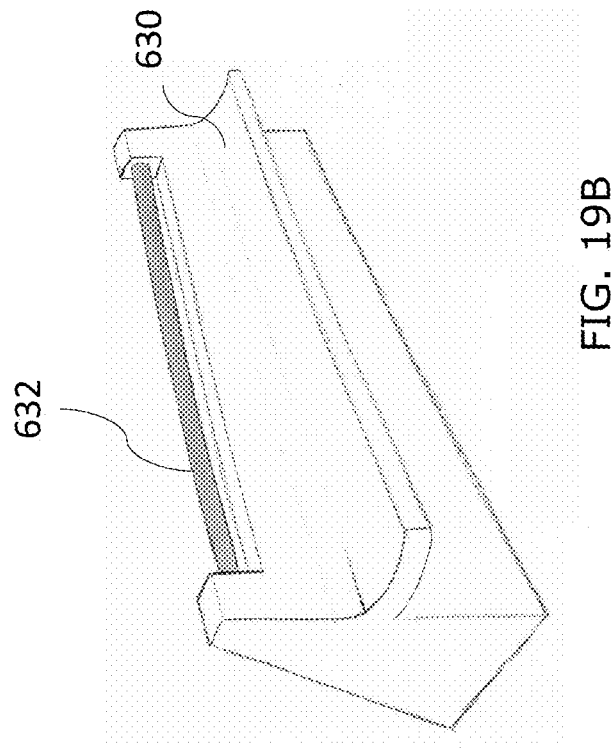
FIG. 19A-19B depict an exemplary support structure.
Figure 19A:
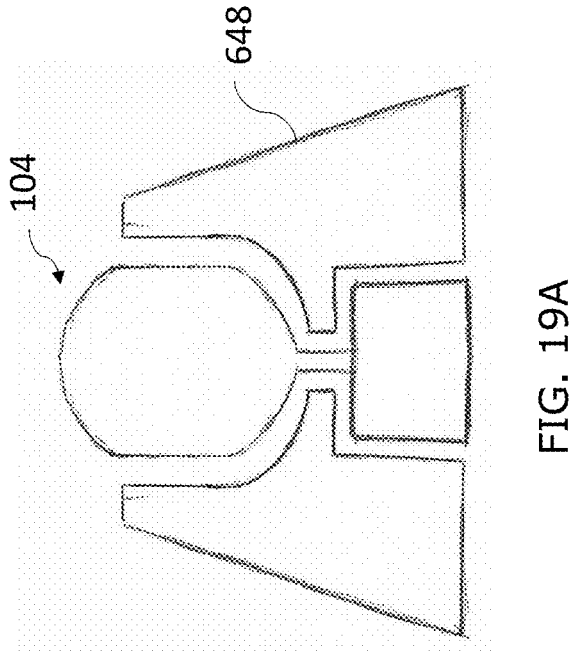

The support structure 648 is configured to provide support to at least the fetal model 106 while the fetal model 106 is disposed within the housing 102. The support structure 648 has a size and shape that corresponds with the overall size and shape of at least the birthing device 104, as seen in FIG. 19A, and one or more components of the birthing simulator. In an example, the support structure 648 comprises a rigid platform 630 that is configured to position the fetal model 106 above the moving parts of the birthing device 104, such as the actuator assembly 180. In this configuration, the moving parts of the birthing device 104 is also protected from movement of the fetal model 106 during a simulated childbirth scenario.

The support structure 648 is configured to be stationary relative to at least the actuator assembly 180 and the fetal model 106, thereby providing a stabilizing feature to the simulator 500 (FIG. 18A). This stability is facilitated by one or more rails 632 (FIGS. 20A-20C) configured to be coupled to the uterus simulator 628 (FIGS. 22, 23A-23C). The one or more rails 632 are used to secure the fetal model 106 within the uterus simulator 628. In an example, the uterus simulator 628 comprises an elastic membrane 634 and the removable fetal model 106 is configured to be positioned within the elastic membrane 634 to simulate a childbirth scenario, such as at least one of a normal and an abnormal labor childbirth scenario. In another example, the uterus simulator 628 may comprise a solid structure or non-elastic membrane configured to enclose and secure the removable fetal model 106.

Figures 23A, 23B, 23C:
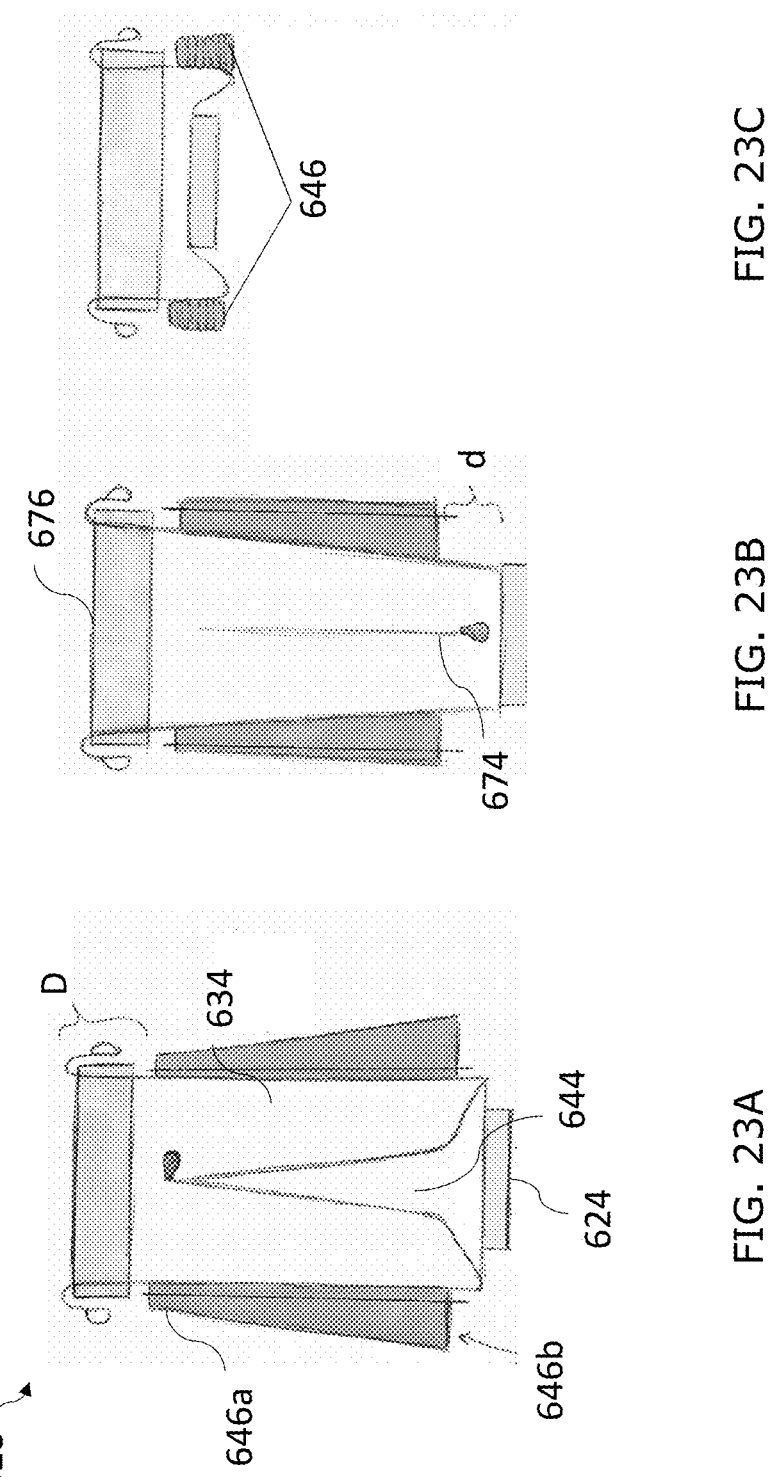
FIG. 23A-23C depict the uterus simulator of FIG. 22 and the support structure, showing attachment and contraction of the uterus simulator.

As seen in FIGS. 20A-20C, the one or more rails 632 are coupled to the support structure 648 via one or more connectors 636/638. Each of the one or more connectors 636/638 define at least one aperture 640/642, through which a fastening mechanism, such as screws (not shown), extend to secure the one or more rails 632 to the support structure 648. Further, the connectors 636/638 each define blind holes 648/650 through which the one or more rails 632 is configured to extend. In an example, the elastic membrane 634 of the uterus simulator 628 defines at least one opening 644 (FIG. 23A) through which each of the one or more rails 632 are configured to extend, In another example, as seen in FIG. 22, the at least one opening 644 comprises one or more pockets 646 that may be formed from an exterior surface of the elastic membrane 634 and each of the one or more pockets 646 is configured to receive a respective one of the one or more rails 632. In yet another example, the one or more pockets 646 may be tapered in one end portion 646a and the tapered end portion 646a (as seen in FIGS. 23A-23C) is adjacent the birth canal simulator 116. In particular, the tapered end portion 646a is positioned a distance, D, from the birth canal simulator 116 comprising the pelvic ring 676 and the non-tapered opposite end portion 646b, is positioned a distance, d, from the pushing paddle 624.

Although FIGS. 20B-20C indicate that more than one type of connector 636/638 may be used, it would be understood from the description herein that the same type of connector, or any other combinations thereof may be used. Other suitable attachment mechanisms for attaching the one or more rails 632 to the support structure 648, such as for example, straps, hook-and-loop fasteners, anchors, adhesives, or double-sided tape, or combinations thereof will be known to one of ordinary skill in the art from the description herein. Optionally, the one or more rails 632 and the support structure 648 may be integrally formed as a single body of unitary construction. As another alternative, the one or more rails 632, the support structure 648 and the elastic membrane 634 may be integrally formed as a single body of unitary construction.

Referring now to FIGS. 21A-21E, a simulated childbirth scenario comprises a labor and delivery of the fetal model 106 with at least one simulated complication. In one example, the at least one simulated complication comprises shoulder dystocia, wherein movement of the fetus is impeded by one or more its shoulders from making contact with the pubic bone of the mother. In this childbirth scenario, the one or more rails 632 comprise inflatable rails 652 configured to elevate the fetal model 106 relative to the actuator assembly 180, moving the fetal model 106 out of alignment with the birth canal simulator 116, and causing forward movement of the fetal model 106 to be blocked. In particular, the forward movement of the fetal model 106 is blocked because the elevation of the fetal model 106 caused by the one or more inflatable rails 652 causes a portion of the fetal model 106, such as at least a shoulder, to be blocked by a portion of the birth canal simulator 116, such as the pelvic ring 676. In the example shown in FIG. 21D, the one or more inflatable rails 652 is attached to a plastic layer 654 via an elastic attachment 656.

Figures 21A, 21B, 21C:
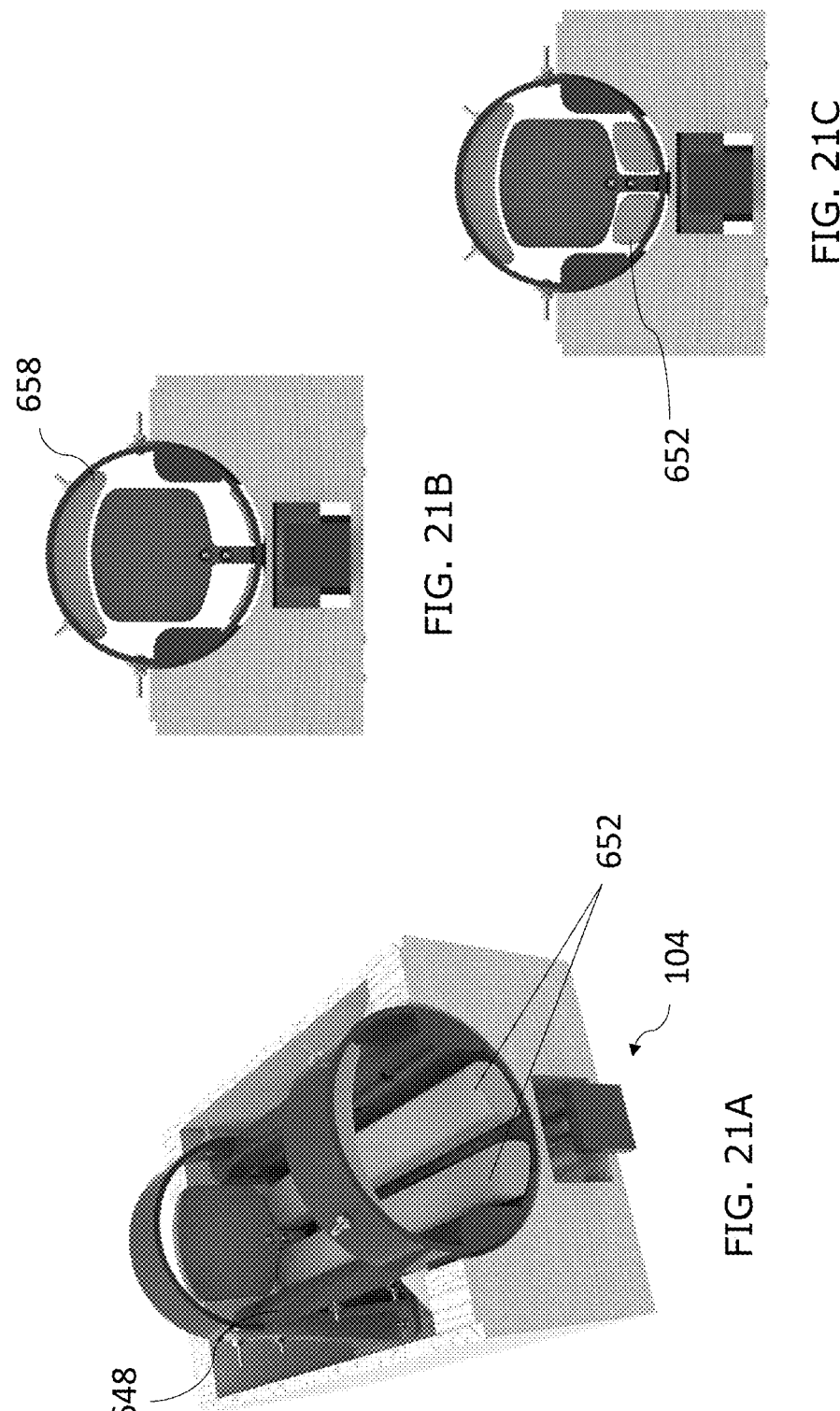
FIG. 21A-21C are images illustrating the support structure, showing one or more inflatable rails.

In an example, a pelvic insert 658 that is positioned adjacent to the birth canal simulator 116 facilitates blocking the forward movement of the fetal model 106. The pelvic insert 658 is intended to simulate a mother's pubic bone, against which the baby's shoulder makes contact in a shoulder dystocia simulation. In an example, as seen in FIG. 21B, the pelvic insert 658 is attached to a top portion of the pelvic ring 676. Although FIGS. 21A-21C illustrate that the pelvic insert 658 is attached via fastening means, such as screws, other suitable attachment mechanisms, such as for example, straps, hook-and-loop fasteners, anchors, adhesives, or double-sided tape, or combinations thereof will be known to one of ordinary skill in the art from the description herein. Optionally, the pelvic insert 658 is removable to facilitate easy cleaning and replacement, as well as allow for a simulation of a normal childbirth scenario without at least a shoulder dystocia complication.

Figures 21D, 21E:
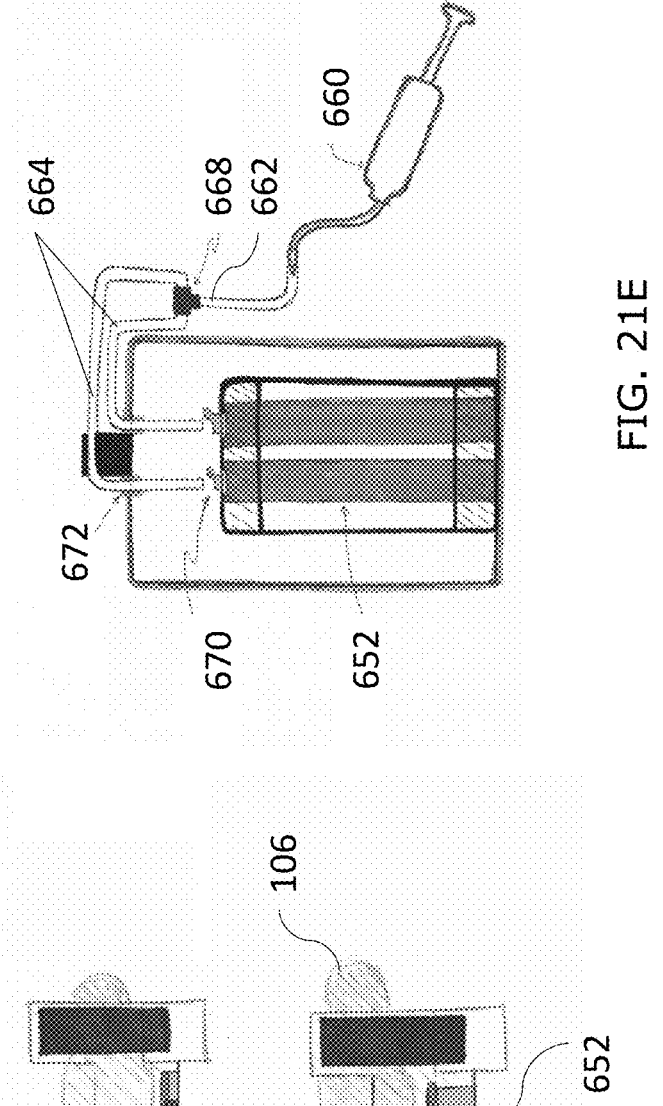
FIG. 21D-21E are diagrams illustrating the one or more inflatable rails for simulating shoulder dystocia.

As illustrated in FIG. 21D, the fetal model 106 is configured to rest on one or more inflatable rails 652 disposed above the actuator assembly 180 of the birthing device 104. The one or more inflatable rails 652 have a deflated state (FIG. 21B) and an inflated state (FIG. 21C). The one or more inflatable rails 652 may be positioned within the housing 102, particularly within the uterus simulator 628. As seen in FIG. 21A, the one or more inflatable rails 652 comprise at least one inflatable rail 652 that correspond to the length of the actuator assembly 180. However, one of ordinary skill in the art would understand from the description herein that the one or more inflatable rails 652 may have any size necessary to permit the intended simulation of shoulder dystocia. For example, the one or more inflatable rails 652 may have a shorter length relative to the actuator 190 and are positioned adjacent to the birth canal simulator 116. Although FIGS. 21A-21C illustrate that the at least one inflatable rail 652 is attached via fastening means, such as screws, other suitable attachment mechanisms, such as for example, straps, hook-and-loop fasteners, anchors, adhesives, or double-sided tape, or combinations thereof will be known to one of ordinary skill in the art from the description herein.

To accommodate the inflated state of the one or more inflatable rails 652, the shape of the birthing device 104 and its components, such as the pushing paddle 224, is configured to allow for the one or more inflatable rails 652 to increase in size when they are in the inflated state (FIGS. 21B-21C). The one or more inflatable rails 652 may be inflated by a pump 660 via one or more tubes 662/664, as illustrated in an exemplary layout of FIG. 21E. The pump 660 may be configured to be automatically actuated, e.g., by signal from controller 176, or may be manually actuated by the maternal subject 108, e.g., in response to a feedback signal. The one or more tubes 662/664 include an input tube 662 and a pair of output tubes 664 that extend from a connector 668, such as T connector. The pair of output tubes 664 are configured to connect to the at least one inflatable rail 652 via inflation valves 670. In this layout, the pair of output tubes 664 are connected to the at least one inflatable rail 652 from a posterior portion 672 of the birthing device 104 relative to the birth canal simulator 116. Additionally or optionally, the pump 660, input tube 662, T connector 668, and a portion of the pair of output tubes 664 may be positioned outside of the housing 102.

Referring now to FIGS. 22 and 23A-23C, the one or more rails 632 are further configured to guide movement of the fetal model 106. As the fetal model 106 is moved toward the birth canal simulator 116 by activation of the actuator assembly 180, the elastic membrane 634 is configured to be in a compressed or contracted condition. As seen in FIGS. 22 and 23A, when at least the fetal model 106 (not shown) is positioned within the elastic membrane 634 and secured via fastening means, such as a zipper 674 (FIG. 23B), the elastic membrane 634 is in an expanded or extended condition. As the fetal model 106 is pushed toward the birth canal simulator 116, the elastic membrane 634 automatically moves or is moved toward a compressed condition (FIG. 23C). The above described movement of the elastic membrane of the uterus simulator may assist in simulating the expulsion of the fetal model 106 from the uterus and into the birth canal simulator 116.

For each simulated childbirth scenario, the uterus simulator 628, particularly the elastic membrane 634 of the uterus simulator 628, is configured to stabilize and secure the fetal model 106 in a position corresponding to the intended childbirth scenario to be simulated. For example, the fetal model 106 may be loaded within the uterus simulator 628 in one alignment for the occiput or cephalic posterior position birthing position and another alignment for the breech birthing position. Further, the one or more rails 632 facilitate one or more specific alignments by preventing unwanted movement of the fetal model 106 that detracts from the intended childbirth scenario to be simulated, based on the fetal model's 106 birthing position. As discussed above, the tapered shape of the one end portion 646a of the one or more pockets 646 extending from the exterior surface of the elastic membrane 634 and the non-tapered opposite end portion 646b allow for selective restriction of the fetal model's 106 movement, at certain stages of labor. For example, the tapered end portion 646a, i.e. tighter region, of the uterus simulator 628 helps ensure the limbs of the fetal model 106 are held in the proper position, particularly as the uterus simulator 628 moves toward and reaches the compressed condition (FIG. 23C) and the fetal model 106 transitions into the birth canal simulator 116.

In an exemplary embodiment, the fetal model 106 comprises electronic circuitry housed within (e.g. simulated head of fetal model 106, or other simulated anatomical regions or limbs). Further, some or all of the electronic circuitry of the fetal model 106 may have protective coating (e.g. acrylic coating) and/or additional protective layers for safeguarding the electronic circuitry from damage or contaminants. Additionally or optionally, the electronic circuitry housed within the fetal model 106 is powered by an integrated power source (e.g. a battery, such as an NiMH battery) and/or an external power source via a charging port disposed in a simulated anatomical region of the fetal model 106 (e.g. simulated foot). Still further, the electronic circuitry comprises a sound chip (e.g. VS1010 sound chip as manufactured and designed by VLSI Solution of Tampere, Finland), an audio amplifier, and at least one sound file and at least one audio exciter. The electronic circuitry further comprises a Bluetooth® chip to enable wireless communication protocol, such as Bluetooth®, between the electronic circuitry of fetal model 106 and the compatible external device 332 (FIG. 17), which may be controlled by an instructor or a professional that is different from the care provider/trainee/ student.

Moreover, one or more items of information or algorithms related to the fetal model 106 may be optionally programmed in the electronic circuitry of the fetal model 106 or stored in an associated memory. Execution of the one or more items of information or algorithms causes at least the fetal model 106 to perform predefined functions. According to one childbirth scenario, the integrated power source may be activated to supply power to the electronic circuitry of fetal model 106 via an actuator (e.g. a button) housed in a simulated foot of the fetal model 106, or may be controlled remotely by external device 332 (FIG. 17) through known wireless communication means. According to another childbirth scenario, the external device 332 may be used to control a duration, pitch, frequency, and/or volume of simulated cries from the fetal model 106 at certain stages of labor and delivery.

Referring now to FIG. 24, a method of using the wearable birthing simulator is provided. The method 400 includes one or more steps including positioning a fetal model in a uterus simulator, activating an actuator to automatically move the fetal model out of the uterus simulator and toward a birth canal simulator activating a feedback device to provide haptic feedback to the subject based on the position of the fetal model, and evacuating a simulated biological fluid out of the housing as the fetal model moves towards the birth canal simulator. Optionally, method 400 includes detecting a position of the fetal model relative to the birth canal simulator. Additional details of method 400 are set forth below with respect to the elements of simulator 100.

In step 402, a fetal model is positioned in a uterus simulator. In an example, uterus simulator 128 is positioned within a housing 102 configured to be securable to a maternal subject 108. In this example, the uterus simulator 128 includes a tube assembly 564 adapted to contain at least the fetal model 106 therein. In a preferred example, the fetal model 106 is secured within the space 584 defined by the base 568 and the cover 574 of the tube assembly 564. Optionally, the uterus simulator 128 includes an elastic membrane having a zipper to secure the fetal model 106 therein. Step 402 may further include securing the fetal model 106 connected to a simulated placenta 280 via a simulated umbilical cord 282, within the uterus simulator 128.

In step 404, an actuator is activated to automatically move the fetal model out of the uterus simulator and toward a birth canal simulator. In an example, a birthing device 104 is configured to move the fetal model 106 towards a birth canal simulator 116. The birthing device 104 comprises an actuator assembly 180 that is configured to be in communication with a controller 176 for automatically moving the fetal model 106 towards the birth canal simulator 116 and out of the uterus simulator, e.g., in accordance with an algorithm or programmed stored in a memory associated with controller 176.

In an optional step 406, a position of the fetal model relative to the birth canal simulator is detected. In an example, one or more sensors 174 are mounted to the housing 102 and are electrically connected to the controller 176. The one or more sensors are configured to detect movement of the fetal model 106 by the birthing device 104 relative to the birth canal simulator 116.

In step 408, a feedback device is actuated to provide haptic feedback to the subject based on the detected or determined position of the fetal model. In an example, feedback device 178 is in communication with an external device and is configured to provide haptic feedback to the subject 108. Additionally or optionally, the feedback device 178 is in communication with the controller 176, which is configured to activate the feedback device 178 to provide the haptic feedback to the subject 108 in response to sensing e.g., the movement or position of the fetal model 106 relative to the birth canal simulator 116.

In step 410, a simulated biological fluid is evacuated out of the housing as the fetal model moves towards the birth canal simulator. In an example, the uterus simulator 128 comprises one or more containers 276a/276b, the one or more containers 276a/276b each storing a respective simulated biological fluid 278a/278b. The external device is configured to evacuate the respective simulated biological fluid 278a/278b from the one or more containers 276a/276b, into the simulated birth canal 120, and out of the aperture 126, as the fetal model 106 towards the birth canal simulator 116. Optionally, the controller 176 is configured to evacuate the respective simulated biological fluid 278a/278b from the one or more containers 276a/276b and out of the opening of the housing 102, as the sensors detect movement of the fetal model 106 to the birth canal simulator 116.

FIG. 24 depicts an example method comprising steps that are performed sequentially in the order recited. However, it should be understood from the description herein that one or more steps may be omitted and/or performed out of the described sequence of the process while still achieving the desired result. Additionally, additional operations of simulator 100 described herein (e.g., with respect to simulating contractions or complications during the birth process) may be included within the steps of method 400.

Turning now to the operation of birthing simulator 100 with the external device 332 (FIG. 17), an exemplary embodiment of the birthing simulator 100 includes electronic circuitry having a controller 176 and a wireless transmitter/receiver for transmitting/receiving wireless signals (e.g. WiFi or Bluetooth®) to/from external device 332, which may be controlled by an instructor or a professional that is different from the care provider/trainee/student. Further, external device 332 may comprise an electronic device, such as a computer, laptop, a mobile device (e.g. smart phone, tablet, or similar device configured for connection via a wireless connection described above), or a compatible display device. As already discussed above, one or more items of information or algorithms related to components of birthing simulator 100 may be programmed in controller 176 or stored in an associated memory.

Execution of the one or more items of information or algorithms causes one or more components of birthing simulator 100 to perform predefined functions. According to one childbirth scenario, the external device 332 (FIG. 17) may be used to control a volume and flow rate of simulated biological fluids 278a, 278b into the simulated birth canal 120 and out of aperture 126 of the simulated genitalia 122. Specifically, controller 176 wirelessly receives a signal from the external device 332 and activates the pumps 323 to evacuate the respective simulated biological fluid 278a, 278b from the containers 276a, 276b to push the simulated biological fluid 278a, 278b toward the simulated genitalia 122, in preparation for movement of the fetal model 106 towards the birth canal simulator 116 and out of the aperture 126. Additionally or optionally, controller 176 may be configured to hydraulically control the release of fluids from containers 276a, 276b (generically referred to as a Fluid Bag in FIG. 17) through control of one or more valves.

According to another childbirth scenario (i.e. "Prebuilt scenario"), controller 176 is configured to process signals wirelessly received from the external device 332 (FIG. 17) in order to automatically operate pumps 323 to evacuate a predefined volume and rate of respective simulated biological fluid 278a, 278b from the containers 276a, 276b. Additionally or optionally, external device 332 automatically activates the actuator 178 to provide haptic feedback to the subject 108 at a predefined time during the simulation period and for a predefined duration. The haptic feedback may discreetly instruct subject 108 to manually inflate the inflatable bag 158 to simulate a contraction and/or provide realistic feedback based on the position of the fetal model 106 relative to the birth canal simulator 116. Additionally or optionally, controller 176 is configured to process signals wirelessly received from the external device 332, to operate actuator assembly 180 for operating the birthing device 104 to simulate a normal childbirth scenario or abnormal childbirth scenario (e.g. involving shoulder dystocia). In particular, controller 176 may cause sliding carriage 196 to move along a portion of the length of the actuator 190, such that the pushing paddle 224 moves the fetal model 106 toward the birth canal simulator 116 in accordance with predefined parameters (e.g. rate, start/stop, etc.). In the case of a normal childbirth scenario, the fetal model 106 is delivered out of aperture 126 of the simulated genitalia 122. Then, in the case of shoulder dystocia complication, at a predetermined location prior to complete delivery of the fetal model 106 out of simulated genitalia 122, the sliding carriage 196 retreats and moves away from the birth canal simulator 116, and a later subsequent movement of the sliding carriage 196 toward the aperture 126 causes the shoulder portion of the fetal model 106 to be blocked by the simulated cervix 118. Other childbirth scenarios include, but are not limited to PPH (as described above), a water break scenario, etc. Simultaneously, the external device 332 is configured to display information related to the childbirth scenario, including but not limited to, elapsed time of the simulation, percentage of total travel completed by the fetal model 106, current contraction state (low/beginning, mid/rising, high/peak, mid/falling, low/ending), etc.

According to still another childbirth scenario (i.e. "Custom built scenario"), controller 176 is configured to process signals wirelessly received from the external device 332 (FIG. 17) in a similar manner as discussed above regarding the "prebuilt scenario," except that the instructor may customize parameters of the labor and delivery, including but not limited to, length of contraction, rate of contraction, volume and rate of simulated biological fluid (e.g. blood and amniotic fluid) evacuation.

According to yet another childbirth scenario (i.e. "Direct control of device"), controller 176 is configured to process signals wirelessly received from the external device 332 (FIG. 17) in a similar manner as discussed above, except that the instructor may exert greater control or customization of one or more parameters of the labor and delivery, including but not limited to, speed and direction of motor 182 for driving actuator 190, length of contraction, rate of contraction, volume and rate of simulated biological fluid 278a, 278b (e.g. blood and amniotic fluid) evacuation. This scenario may be particularly helpful for test/demo purposes, troubleshooting, or assessment of tech support requirements.

According to another childbirth scenario (i.e. "iSimulate scenario"), controller 176 is configured to process signals wirelessly received from the external device 332 (FIG. 17) in a similar manner as discussed above, except that external device 332 comprises a device powered by the iOS operating system, such as an iSimulate iPad.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A wearable birthing simulator comprising: a housing configured to be secured to a subject, the housing defining an opening and an outer layer; a uterus simulator positioned within the housing, the uterus simulator configured to contain a removable fetal model; a birth canal simulator positioned within the housing and coupled to the uterus simulator; a controller; a birthing device configured to move the removable fetal model towards the birth canal simulator, the birthing device comprising an actuator assembly in communication with the controller for automatically moving the removable fetal model towards the birth canal simulator; and a feedback device in communication with an external device, the feedback device being configured to provide haptic feedback, wherein the actuator assembly comprises a frame positioned within the housing, a guide rail mounted to the frame, the guide rail defining one or more grooves, and an actuator mounted to the frame and extending along a rotation axis that is parallel to the guide rail, and a sliding carriage coupled to the actuator and the guide rail, and wherein the actuator assembly further includes a pulley system comprising a timing belt and at least one timing pulley mounted on the frame, wherein rotation of the at least one timing pulley drives the actuator to rotate, thereby moving the sliding carriage along a length of the actuator and along the one or more grooves of the guide rail.

2. The wearable birthing simulator of claim 1, further comprising one or more containers, the one or more containers each storing a respective simulated biological fluid.

3. The wearable birthing simulator of claim 2, wherein the controller is configured to evacuate the respective simulated biological fluid from the one or more containers and out of the opening of the housing as the removable fetal model moves towards the birth canal simulator.

4. The wearable birthing simulator of claim 1, wherein the uterus simulator comprises a tube assembly and the removable fetal model is configured to be positioned within the tube assembly to simulate at least one of a normal and an abnormal labor simulations.

5. The wearable birthing simulator of claim 4, wherein the tube assembly is stationary relative to the removable fetal model, as the removable fetal model moves towards the birth canal simulator.

6. The wearable birthing simulator of claim 1, wherein the birthing device further comprises a motor mounted parallel to the actuator assembly and connected to the at least one timing pulleys, the motor being configured to drive the actuator.

7. The wearable birthing simulator of claim 6, wherein the sliding carriage comprises a pushing paddle, the pushing paddle configured to contact the removable fetal model when the removable fetal model is positioned within the uterus simulator.

8. The wearable birthing simulator of claim 6, wherein the controller causes the actuator assembly to automatically move the removable fetal model toward the birth canal simulator for a predetermined distance, then moves the removable fetal model away from the birth canal simulator for another predetermined distance, thereby causing a subsequent forward movement of the removable fetal model to be blocked for simulating shoulder dystocia.

9. The wearable birthing simulator of claim 1, wherein the birth canal simulator comprises a simulated cervix coupled to a simulated birth canal, wherein a portion of the simulated cervix is configured to be coupled to a portion of the uterus simulator and the simulated birth canal is positionable adjacent to the opening of the housing.

10. The wearable birthing simulator of claim 9, wherein the simulated birth canal comprises a simulated genitalia, the simulated genitalia being positionable adjacent to the opening of the housing.

11. The wearable birthing simulator of claim 9, wherein the birth canal simulator further comprises a vise assembly, the vise assembly being configured to attach the simulated cervix to the simulated birth canal, the vise assembly further defining connection points to secure the portion of the simulated cervix to the portion of the uterus simulator.

12. The wearable birthing simulator of claim 9, wherein the simulated cervix is removable from the housing.

13. The wearable birthing simulator of claim 1, further comprising a simulated placenta positioned within the uterus simulator, a simulated umbilical cord having one or more tubes, the one or more tubes having an end portion coupled to the simulated placenta and another end portion coupled to the removable fetal model.

14. The wearable birthing simulator of claim 13, wherein the simulated placenta comprises a fetal surface and a maternal surface opposite the fetal surface, the fetal surface having at least one visual difference relative to the maternal surface.

15. The wearable birthing simulator of claim 14, wherein the maternal surface comprises a plurality of simulated cotyledons, wherein at least one of the plurality of simulated cotyledons is configured to be removable.

16. The wearable birthing simulator of claim 13, wherein the simulated umbilical cord is configured to releasable from at least one of the simulated placenta and the removable fetal model.

17. The wearable birthing simulator of claim 1, further comprising one or more sensors that are operable to determine a position of the removable fetal model relative to the birth canal simulator.

18. The wearable birthing simulator of claim 1, further comprising an inflatable bag having an inflated state and a deflated state, inflation and deflation of the inflatable bag generating a tactile change at a surface of the housing to simulate a labor contraction.

19. The wearable birthing simulator of claim 18, wherein the feedback device is configured to provide the haptic feedback when the inflatable bag is in the inflated state to indicate a simulated labor contraction.

20. The wearable birthing simulator of claim 19, wherein the feedback device is secured to the subject.

21. A method for using a wearable birthing simulator, the method comprising: positioning a fetal model in a uterus simulator, the uterus simulator being positioned within a housing configured to be securable to a subject; activating an actuator to automatically move the fetal model out of the uterus simulator and toward a birth canal simulator, the birth canal simulator being coupled to the uterus simulator, the activating comprising rotating at least one timing pulley mounted to a frame of the uterus simulator, wherein rotation of the at least one timing pulley drives the actuator to rotate, thereby moving a sliding carriage supporting the fetal model along a length of the actuator and along one or more grooves of a guide rail within the uterus simulator; determining a position of the fetal model relative to the birth canal simulator; activating a feedback device to provide haptic feedback to the subject based on the determined position of the fetal model; and evacuating a simulated biological fluid out of the housing as the fetal model moves towards the birth canal simulator.

* * * * *